(12) United States Patent
Ebcioglu et al.

(10) Patent No.: US 11,645,099 B2
(45) Date of Patent: *May 9, 2023

(54) PARALLEL HARDWARE HYPERVISOR FOR VIRTUALIZING APPLICATION-SPECIFIC SUPERCOMPUTERS

(71) Applicant: Global Supercomputing Corporation, Yorktown Heights, NY (US)

(72) Inventors: Kemal Ebcioglu, Cheshire, CT (US); Atakan Dogan, Eskisehir (TR)

(73) Assignee: GLOBAL SUPERCOMPUTING CORPORATION, Yorktown Heights, NY (US)

( * ) Notice: Subject to any disclaimer, the term of this patent is extended or adjusted under 35 U.S.C. 154(b) by 148 days.

This patent is subject to a terminal disclaimer.

(21) Appl. No.: 17/343,982

(22) Filed: Jun. 10, 2021

(65) Prior Publication Data

US 2021/0303323 A1 Sep. 30, 2021

Related U.S. Application Data

(63) Continuation of application No. 16/280,125, filed on Feb. 20, 2019, now Pat. No. 11,068,293, which is a
(Continued)

(51) Int. Cl.
*G06F 9/455* (2018.01)
*G06F 15/78* (2006.01)
*G06F 9/50* (2006.01)

(52) U.S. Cl.
CPC ...... *G06F 9/45533* (2013.01); *G06F 9/45558* (2013.01); *G06F 9/5077* (2013.01);
(Continued)

(58) Field of Classification Search
None
See application file for complete search history.

(56) References Cited

U.S. PATENT DOCUMENTS 6,034,538 A 3/2000 Abramovici
6,826,615 B2 11/2004 Barrall et al.
(Continued)

FOREIGN PATENT DOCUMENTS

EP 1574965 9/2005

OTHER PUBLICATIONS

EPO application EP 12867516.2 interlocutory decision refusing the refund of further search fees paid according to Rule 164(1) EPC, dated Nov. 14, 2018.
(Continued)

*Primary Examiner* — Wynuel S Aquino
(74) *Attorney, Agent, or Firm* — Mark Malek; Widerman Malek, PL

(57) ABSTRACT

A parallel hypervisor system for virtualizing application-specific supercomputers is disclosed. The hypervisor system comprises (a) at least one software-virtual hardware pair consisting of a software application, and an application-specific virtual supercomputer for accelerating the said software application, wherein (i) The virtual supercomputer contains one or more virtual tiles; and (ii) The software application and the virtual tiles communicate among themselves with messages; (b) One or more reconfigurable physical tiles, wherein each virtual tile of each supercomputer can be implemented on at least one physical tile, by configuring the physical tile to perform the virtual tile's function; and (c) A scheduler implemented substantially in hardware, for parallel pre-emptive scheduling of the virtual tiles on the physical tiles.

3 Claims, 15 Drawing Sheets

An example of the operation of the hypervisor, part 3 of 8

Related U.S. Application Data continuation of application No. 16/105,741, filed on Aug. 20, 2018, now Pat. No. 10,514,939, which is a continuation of application No. 15/137,268, filed on Apr. 25, 2016, now Pat. No. 10,120,704, which is a continuation of application No. 13/366,318, filed on Feb. 4, 2012, now Pat. No. 9,465,632.

(52) U.S. Cl.
CPC .. *G06F 15/7871* (2013.01); *G06F 2009/4557* (2013.01); *Y02D 10/00* (2018.01)

(56) References Cited

U.S. PATENT DOCUMENTS

| | | | |
|---|---|---|---|
| 7,409,670 | B1 | 8/2008 | Pritchard et al. |
| 7,555,566 | B2 | 6/2009 | Blumrich et al. |
| 7,603,540 | B2 | 10/2009 | Doering et al. |
| 7,734,894 | B1 | 6/2010 | Wentzlaff |
| 7,761,687 | B2 | 7/2010 | Blumrich et al. |
| 7,814,486 | B2 | 10/2010 | Papakipos et al. |
| 8,020,163 | B2 | 9/2011 | Nollet et al. |
| 2004/0049672 | A1 | 3/2004 | Nollet et al. |
| 2009/0287571 | A1 | 11/2009 | Fujioka |
| 2010/0153966 | A1 | 6/2010 | Arimilli et al. |
| 2011/0307663 | A1 | 12/2011 | Kultursay et al. |
| 2013/0005068 | A1 | 1/2013 | Nickel et al. |

OTHER PUBLICATIONS

Shimada, Toshio, Toda, Kenji, Nishida, Kenji. "Real-Time Parallel Architecture for Sensor Fusion" Journal of Parallel and Distributed Computing 15, 143-152 (1992) http://dx.doi.org/10.1016/0743-7315(92)90106-W.

Ming Liu, Wolfgang Kuehn, Zhonghai Lu, and Axel Janisch, "Run-time Partial Reconfiguration Speed Investigation and Architectural Design Space Exploration", In Proceedings of the International Conference on Field Programmable Logic and Applications 2009 (FPL'09), Prague, Czech Republic, Aug. 2009.

Fabrizio Ferrand!, Marco D. Santambrogio, Donatella Sciuto, "A Design Methodology for Dynamic Reconfiguration: The Caronte Architecture," ipdps, vol. 4, pp. 163b, 19th IEEE International Parallel and Distributed Processing Symposium (IPDPS'05)—Workshop 3, 2005.

Mateusz Majer, Juergen Teich, Ali Ahmadinia, and Christophe Bobda. 2007. The Erlangen Slot Machine: A Dynamically Reconfigurable FPGA-based Computer. J. VLSI Signal Process. Sys!. 47, 1 (Apr. 2007), 15-31. DOI=10.1007/s11265-006-0017-6 http://dx.doi.org/10.1007/s11265-006-0017-6.

Chun-Hsian Huang and Pao-Ann Hsiung. "Software-Controlled Dynamically Swappable Hardware Design in Partially Reconfigurable Systems," EURASIP Journal on Embedded Systems, vol. 2008, pp. 1-11, 2008, doi:10.1155/2008/231940.

Vincenzo Rana, Marco Santambrogio, Donatella Sciuto, Boris Kettelhoit, Markus Koester, Mario Porrmann, Ulrich Rucker!, "Partial Dynamic Reconfiguration in a Multi-FPGA Clustered Architecture Based on Linux," ipdps, pp. 173, 2007 IEEE International Parallel and Distributed Processing Symposium, 2007.

Klaus Danne and Marco Platzner. Periodic real-time scheduling for FPGA computers. Third IEEE International Workshop on Intelligent Solutions in Embedded Systems (WISES'05), Hamburg University of Technology, May 2005. http://dx.doi.org/10.1109/WISES.2005.1438720.

H. Simmler and L. Levinson and R. Manner. Multitasking on FPGA Coprocessors. Proceedings of the 1oth International Workshop on Field Programmable Gate Arrays (FPL). pp. 121-130. 2000. Springer.

Miljan Vuletic, Laura Pozzi, and Paolo Ienne. 2005. Seamless Hardware-Software Integration in Reconfigurable Computing Systems. IEEE Design and Test of Computers, vol. 22, No. 2 (Mar. 2005), pp. 102-113. DOI=10.1109/MDT.2005.44 http://dx.doi.org/10.1109/MDT.2005.44.

Hayden Kwok-Hay So, Artem Tkachenko, Robert Brodersen. "A Unified Hardware/Software Runtime Environment for FPGA-Based Reconfigurable Computers using BORPH". Proceedings of the 4th International Conference on Hardware/Software Codesign and System Synthesis, 259-264, 2006.

Eray Ozkural, A two-dimensional ISA, service invention report, Erendiz Superbilgisayar Ltd., Eskisehir, Turkey, Jan. 6, 2009.

Co-owned, co-pending U.S. Appl. No. 13/296,232, filed Nov. 15, 2011, Ebcioglu et al., Method and system for converting a single-threaded software program into an application-specific supercomputer.

Wikipedia,"Reconfigurable Computing" article, Sep. 24, 2019. https://en.wikipedia.org/w/index.php?title=Reconfigurable_computing&oldid=917632607 (10 pages).

Nikolaos Voros, Alberto Rosti, Michael Hubner (editors): Dynamic System Reconfiguration in Heterogeneous Platforms—The Morpheus Approach; Springer Verlag, Lecture Notes in Electrical Engineering 40, 2009. DOI: 10.1007/978-90-481-2427-5 (277 pages).

Tarek El-Ghazawi, Esam El-Araby, Miaoqing Huang, Kris Gaj, Volodymyr Kindratenko, Duncan Buell, "The Promise of High-Performance Reconfigurable Computing", Computer ( vol. 41 , Issue: 2 , Feb. 2008), pp. 69-76, https://doi.org/10.1109/MC.2008.65 (8 pages).

Applicant's response dated Feb. 5, 2020 to EPO summons to oral proceedings pursuant to Rule 115(1) EPC dated Nov. 28, 2019, Appeal No. T0923/19-3.5.06, EPO application No. EP12867516, claiming priority of U.S. Appl. No. 13/366,318 (49 pages).

Minutes of EPO oral proceedings held on Jul. 15, 2020, issued on Jul. 23, 2020, Appeal No. T0923/19-3.5.06, EPO application No. EP12867516, claiming priority of U.S. Appl. No. 13/366,318 (4 pages).

European Patent Office, Extended European Search Report dated Apr. 29, 2016 for application EP12867516 PCT/US2012072200, claiming priority of U.S. Appl. No. 13/366,318.

Marescaux T et al: "Networks on Chip as Hardware Components of an OS for Reconfigurable Systems" International Conference on Field-Programmable Logic, FPL 2003, Lecture Notes in Computer Science, vol. 2778, Sep. 1, 2003 (Sep. 1, 2003 ), pp. 595-605, XP002319855, ISBN: 978-3-540-45234-8.

Rosti E et al: "Robust partitioning policies of multiprocessor systems", Performance Evaluation, Amsterdam, NL, vol. 19, No. 2-3, Mar. 1994 (Mar. 1994), pp. 141-165, XP026655278, ISSN: 0166-5316, DOI: 10.1016/0166-5316 (94)90037-X.

Japan Patent Office, "Decision to Grant a Patent" dated May 24, 2016 for application JP 2014-555553 PCT/US2012072200 claiming priority of U.S. Appl. No. 13/366,318.

EPO summons to oral proceedings pursuant to Rule 115(1) EPC dated Nov. 28, 2019, Appeal No. T0923/19-3.5.06, application No. EP12867516, claiming priority of U.S. Appl. No. 13/366,318 (18 pages).

Revised resubmission dated Jul. 20, 2020, of Applicant's response dated Feb. 20, 2019 to Communication pursuant to Rule 94(3) EPC received from the EPO dated Dec. 12, 2018 for application U.S. Appl. No. 13/366,318, claiming priority of U.S. Appl. No. 13/366,318 (23 pages).

EPO Communication pursuant to Article 94(3) EPC dated Dec. 22, 2020 for application U.S. Appl. No. 13/366,318, claiming priority of U.S. Appl. No. 13/366,318 (4 pages).

Applicant's response dated May 24, 2021 to Communication pursuant to Rule 94(3) EPC received from the EPO dated Dec. 22, 2020 for application U.S. Appl. No. 13/366,318, claiming priority of U.S. Appl. No. 13/366,318 (12 pages).

EPO Communication pursuant to Article 94(3) EPC dated Jun. 21, 2022 for application U.S. Appl. No. 13/366,318, claiming priority of U.S. Appl. No. 13/366,318 (3 pages).

Applicant's response dated Sep. 19, 2022 to Communication pursuant to Rule 94(3) EPC received from the EPO dated Jun. 21, 2022 for application U.S. Appl. No. 13/366,318, claiming priority of U.S. Appl. No. 13/366,318 (13 pages).

(56) References Cited

OTHER PUBLICATIONS

Nishida, Kenji, Toda, Kenji, Takahashi, Eiichi, Yamaguchi, Yoshinori. "An Architecture of the Real-Time Parallel Processor CODA," Journal of Institute of Electronics, Information and Communication Engineers, vol. J78-D-I No. 8, Aug. 1995, pp. 777-787.
Marescaux, T., Nollet, V., Mignolet, J.Y., Bartic, A., Moffat, W., Avasarc, P., Coene, P., Verkest, D., Vernalde, S., Lauwereins, R . . . "Run-time support for heterogenous multitasking on reconfigurable SoCs" Integration, The VLSI Journal, North-Holland Publishing Company. Amsterdam, NL, vol. 38, No. 1, Oct. 1, 2004, pp. 107-130. North Holland. XP004641567. ISSN: 9167-9260. DOI: 10.1016/J.VLSI.2004.03.002.
Japan Patent Office, First Office Action for application JP 2014-555553, dated Nov. 26, 2015. From PCT version of present application PCT/US2012/072200.
European Patent Office, Supplementary Partial European Search Report for application EP 12867516.2, dated Nov. 27, 2015. From PCT version of present application PCT/US2012/072200.
EPO Communication pursuant to Article 94(3) EPC dated Dec. 12, 2018, for application EP12867516 PCT/US2012072200, claiming priority of U.S. Appl. No. 13/366,318 (4 pages).
Applicant's statement of grounds of appeal dated Feb. 15, 2019, against EPO application EP 12867516 interlocutory decision dated Nov. 14, 2018 (28 pages).
Applicant's response dated Feb. 20, 2019 to EPO Communication pursuant to Article 94(3) EPC dated Dec. 12, 2018, for application EP12867516 PCT/US2012072200, claiming priority of U.S. Appl. No. 13/366,318 (13 pages).
Applicant's response dated Oct. 12, 2016 to EPO Extended European Search Report dated Apr. 29, 2016 for application EP12867516 PCT/US2012072200, claiming priority of U.S. Appl. No. 13/366,318 (53 pages).
EPO communication pursuant to Article 94(3) EPC dated Feb. 6, 2017, for application EP12867516 PCT/US2012072200, claiming priority of U.S. Appl. No. 13/366,318 (5 pages).
Applicant's response dated May 10, 2017 to EPO communication pursuant to Article 94(3) EPC dated Feb. 6, 2017, for application EP12867516 PCT/US2012072200, claiming priority of U.S. Appl. No. 13/366,318 (67 pages).
EPO Communication pursuant to Article 94(3) EPC dated Dec. 1, 2017, for application EP12867516 PCT/US2012072200, claiming priority of U.S. Appl. No. 13/366,318 (6 pages).
Applicant's response dated Mar. 22, 2018 to the EPO Communication pursuant to Article 94(3) EPC dated Dec. 1, 2017, for application EP12867516 PCT/US2012072200, claiming priority of U.S. Appl. No. 13/366,318 (24 pages).
EPO communication pursuant to Rule 137(4) EPC and Article 94(3) EPC dated Jul. 24, 2017, for application EP12867516 PCT/US2012072200, claiming priority of U.S. Appl. No. 13/366,318 (1 page).
Applicant's response dated Aug. 25, 2017 to EPO communication pursuant to Rule 137(4) EPC and Article 94(3) EPC dated Jul. 24, 2017, for application EP12867516 PCT/US2012072200, claiming priority of U.S. Appl. No. 13/366,318 (21 pages).
Withdrawal of EPO appeal dated Jul. 16, 2020, Appeal No. T0923/19-3.5.06, EPO application No. EP12867516, claiming priority of U.S. Appl. No. 13/366,318 (1 page).
Applicant's arguments and amendments before the EPO dated Jul. 20, 2020, EPO application No. EP12867516, claiming priority of U.S. Appl. No. 13/366,318 (31 pages).
Nishida, Kenji, Toda, Kenji, Shimada, Toshio, Yamaguchi, Yoshinori. "The Hardware Architecture of the CODA Real-Time Processor", Proceedings of PARCO 93, Parallel Computing: Trends and Applications, G.R. Joubert, D. Trystram, F.J. Peters, D.J. Evans (editors), 1994 Elsevier Science B.V.

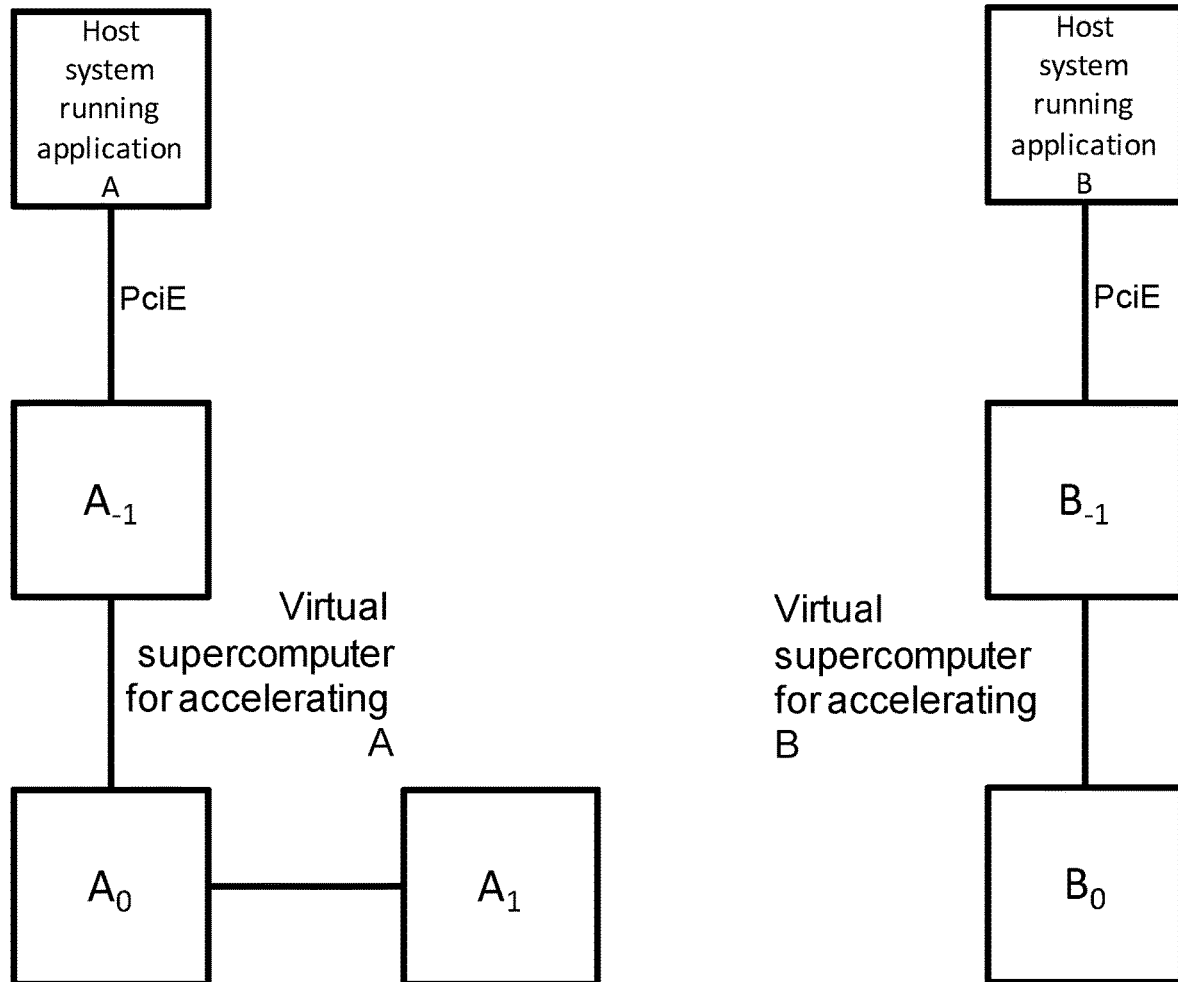
FIG 1   Two software application, each accelerated by an application-specific virtual supercomputer (illustrative small example)

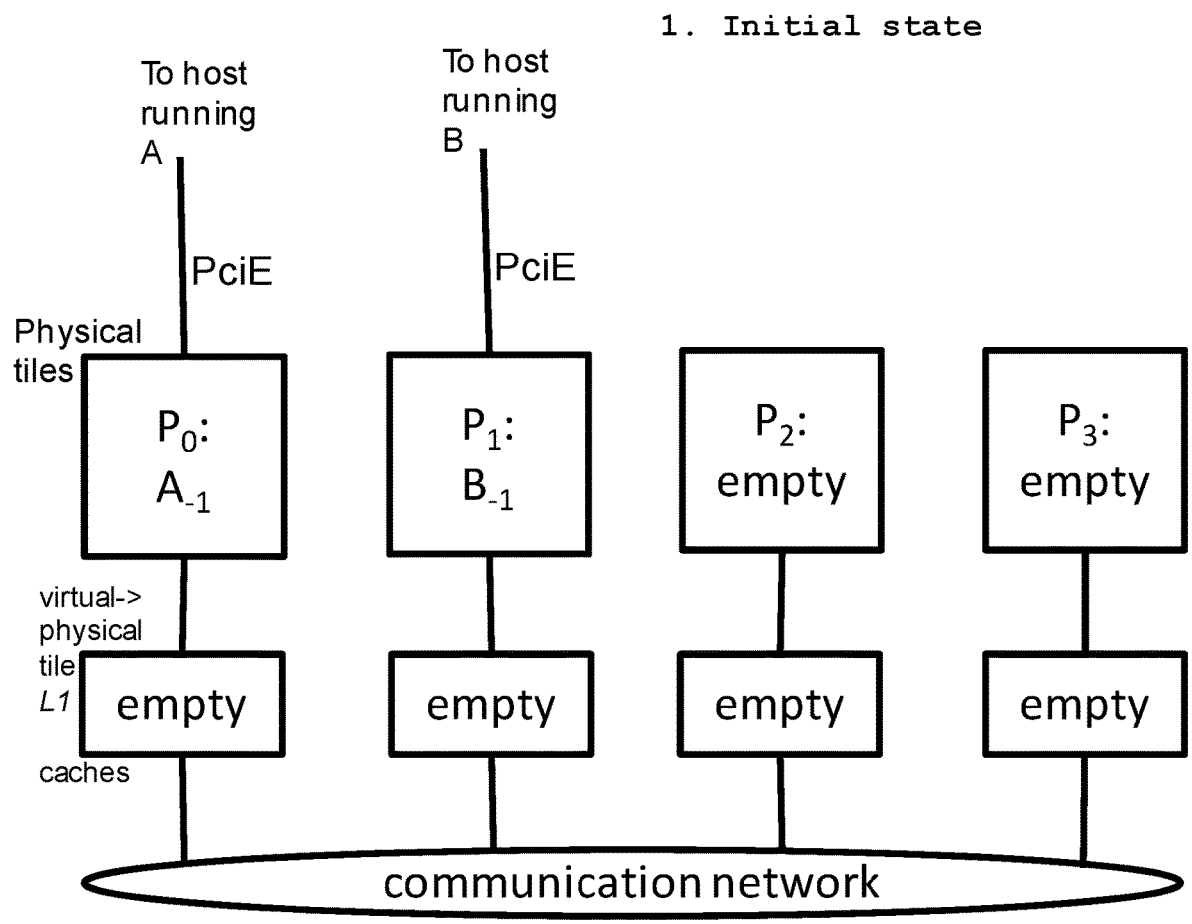
FIG 2  An example of the operation of the hypervisor, part 1 of 8

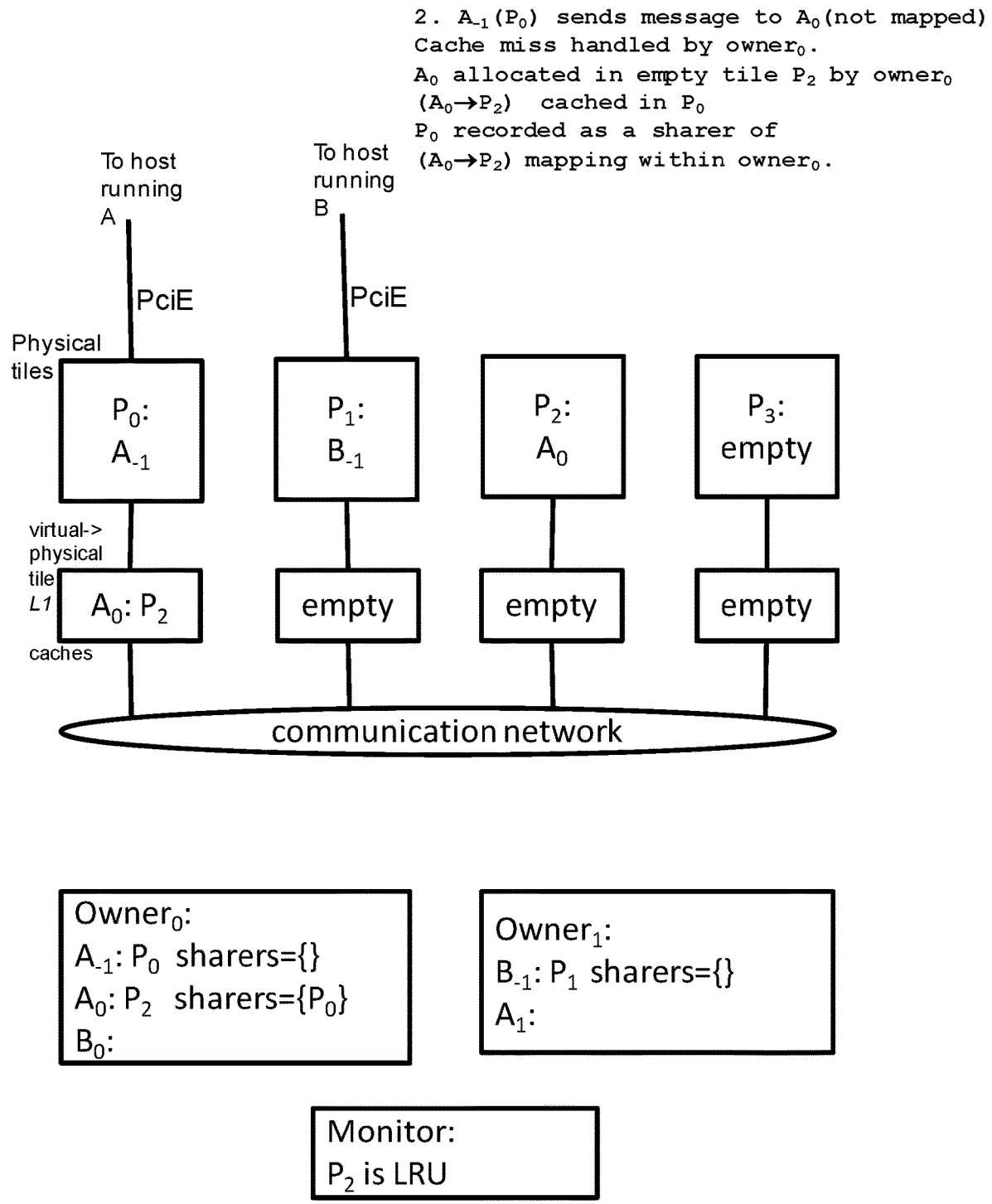
FIG 3  An example of the operation of the hypervisor, part 2 of 8

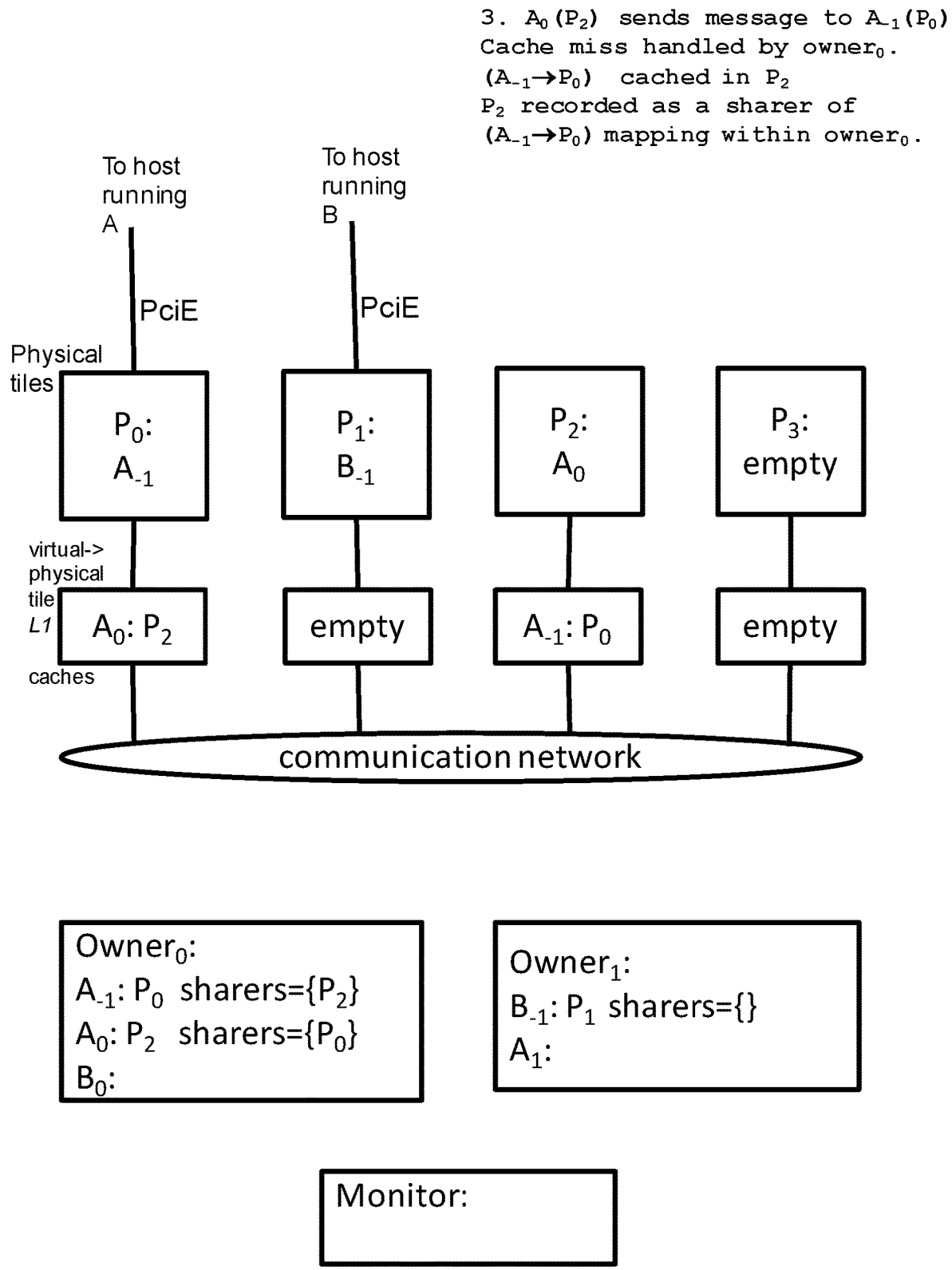
FIG 4  An example of the operation of the hypervisor, part 3 of 8

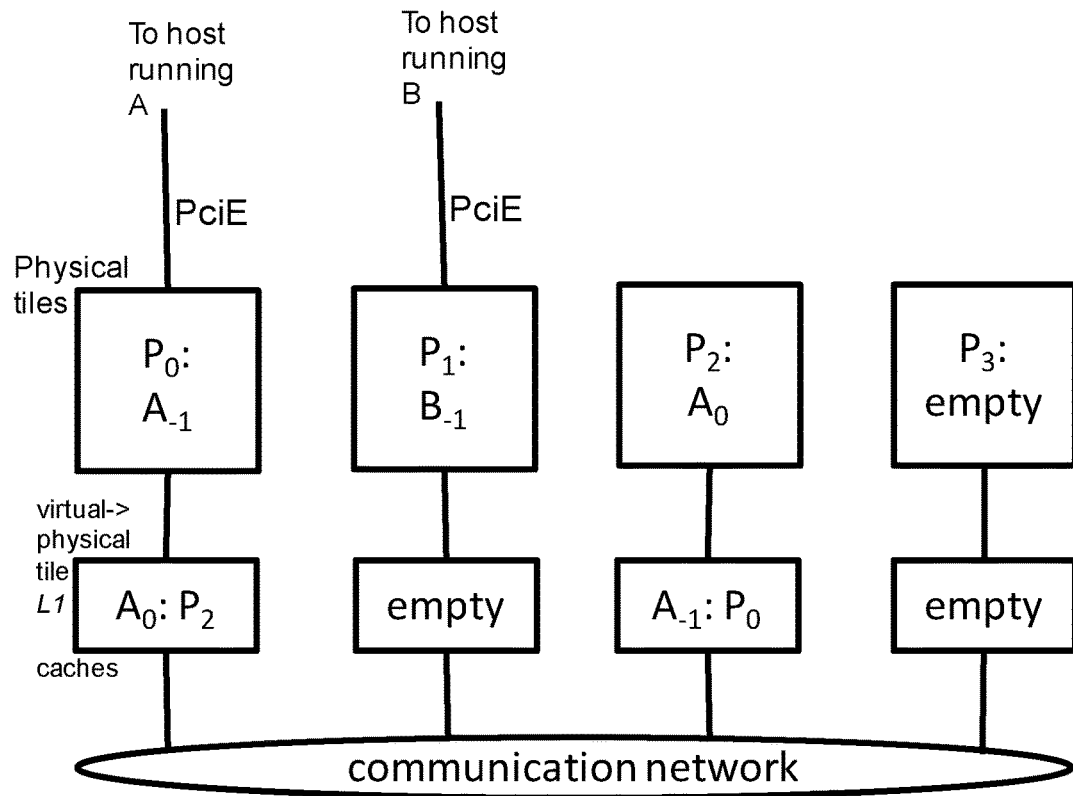
FIG 5  An example of the operation of the hypervisor, part 4 of 8

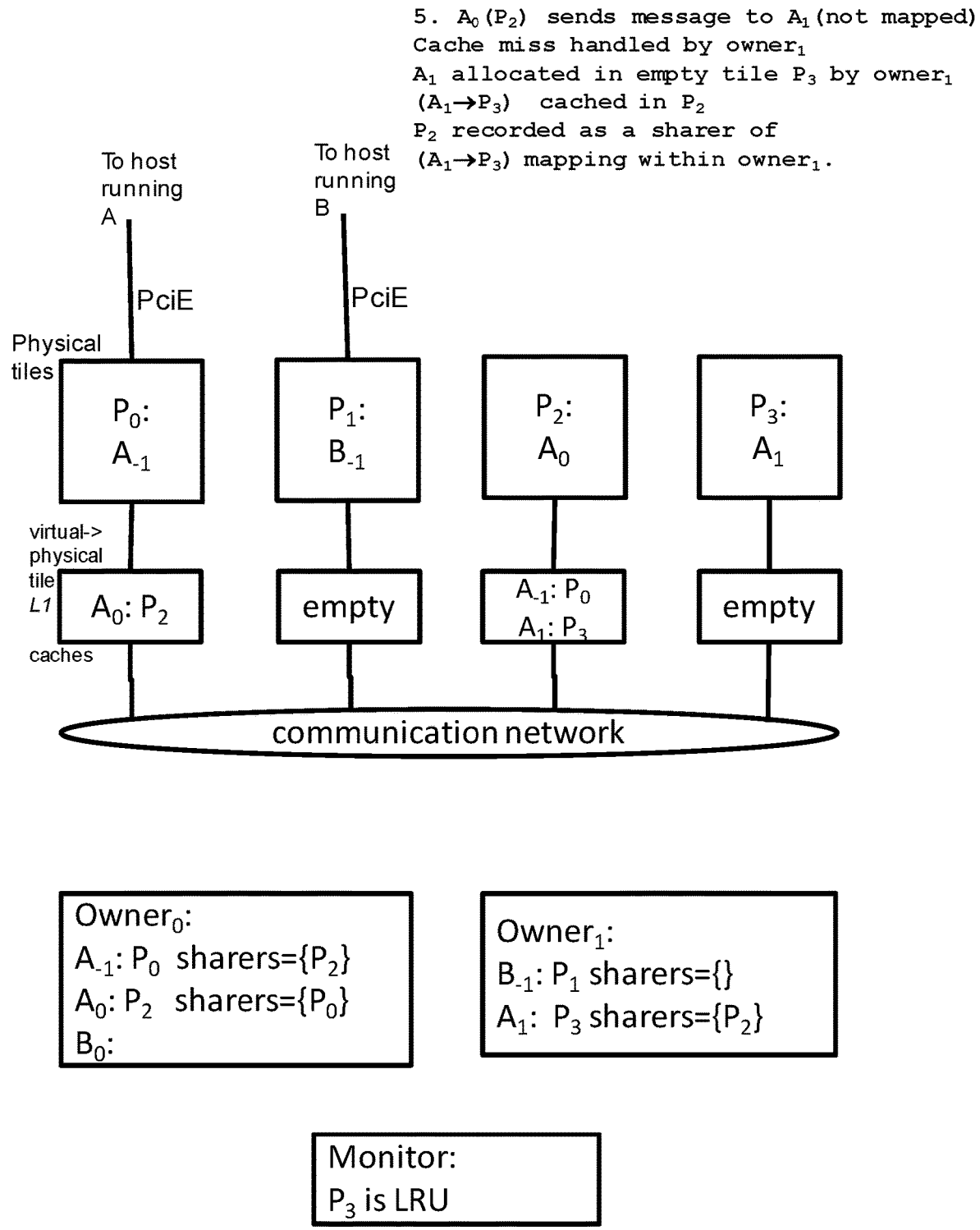
FIG 6 An example of the operation of the hypervisor, part 5 of 8

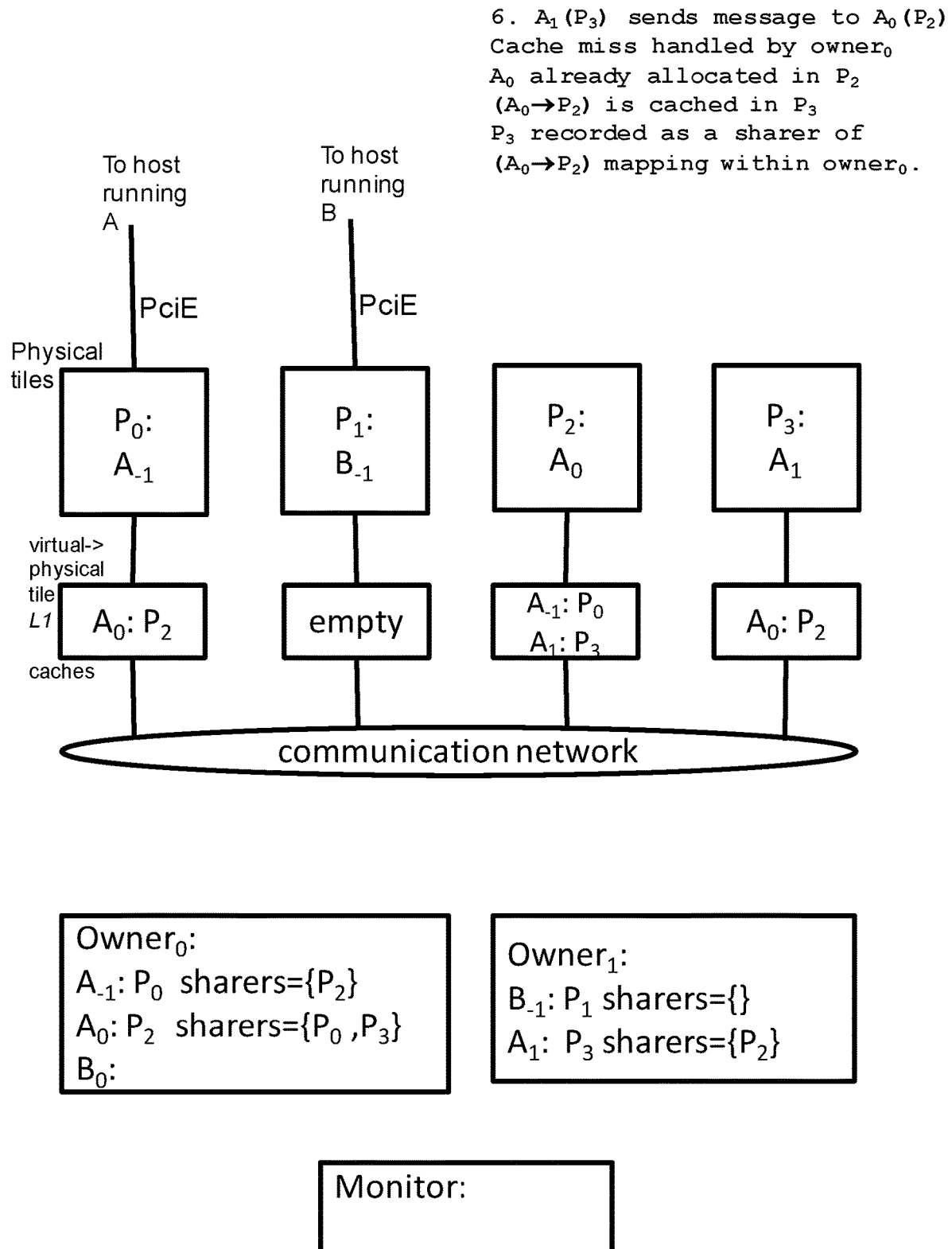
FIG 7 An example of the operation of the hypervisor, part 6 of 8

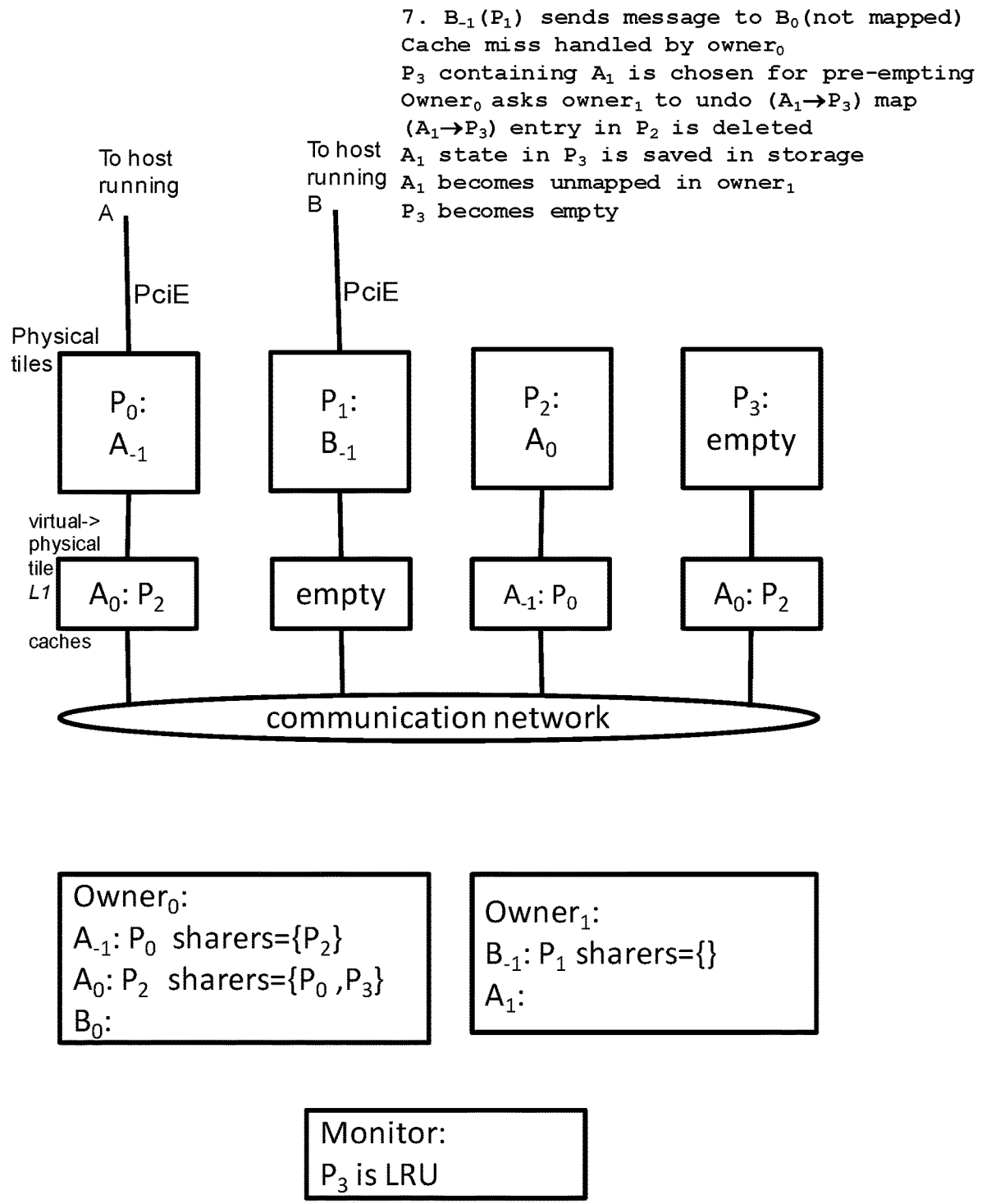
FIG 8  An example of the operation of the hypervisor, part 7 of 8

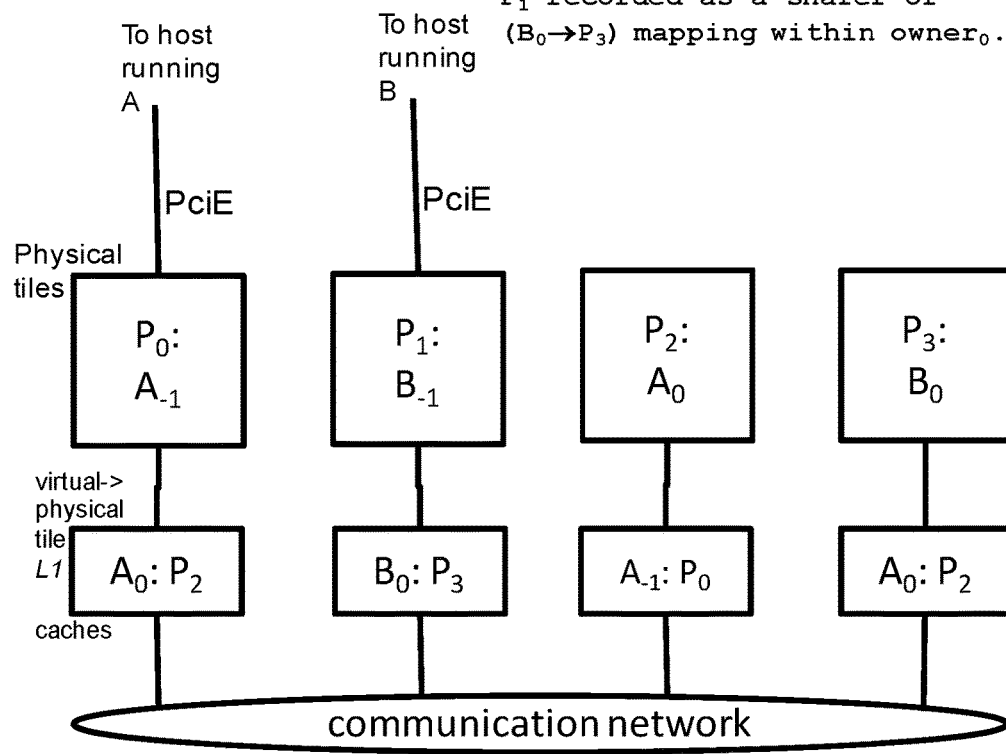
FIG 9  An example of the operation of the hypervisor, part 8 of 8

Legend for schematics
 Component
 Network
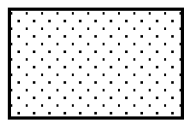 External communication device
 Master port of component
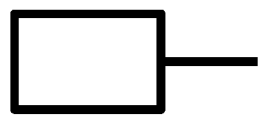 Slave port of component
FIG 10 Legend for schematic symbols

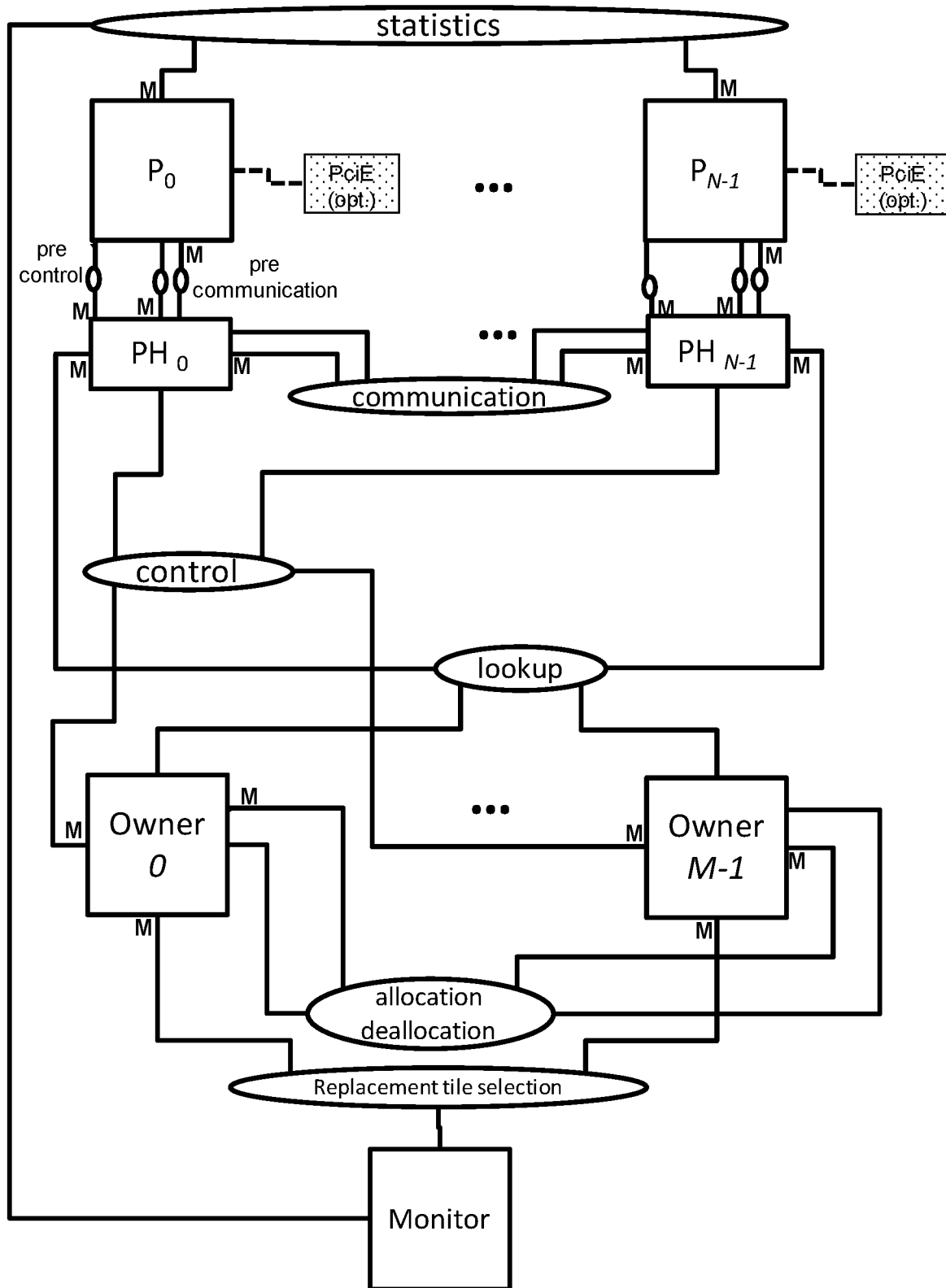
FIG 11 Flat, non-partitioned hardware design of the hypervisor

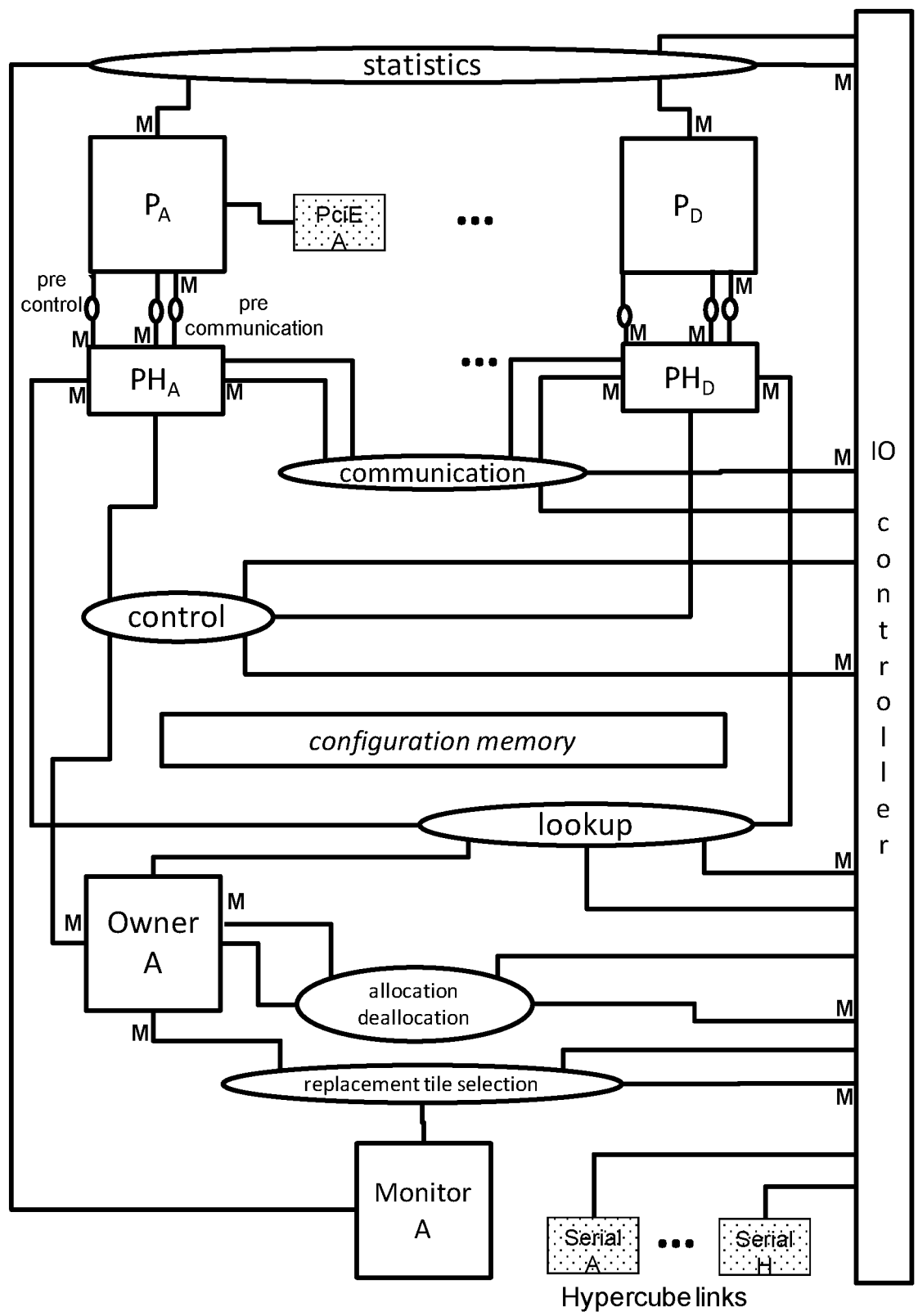
FIG 12 Hardware design of the hypervisor after partitioning and chip unioning (cloud building block chip)

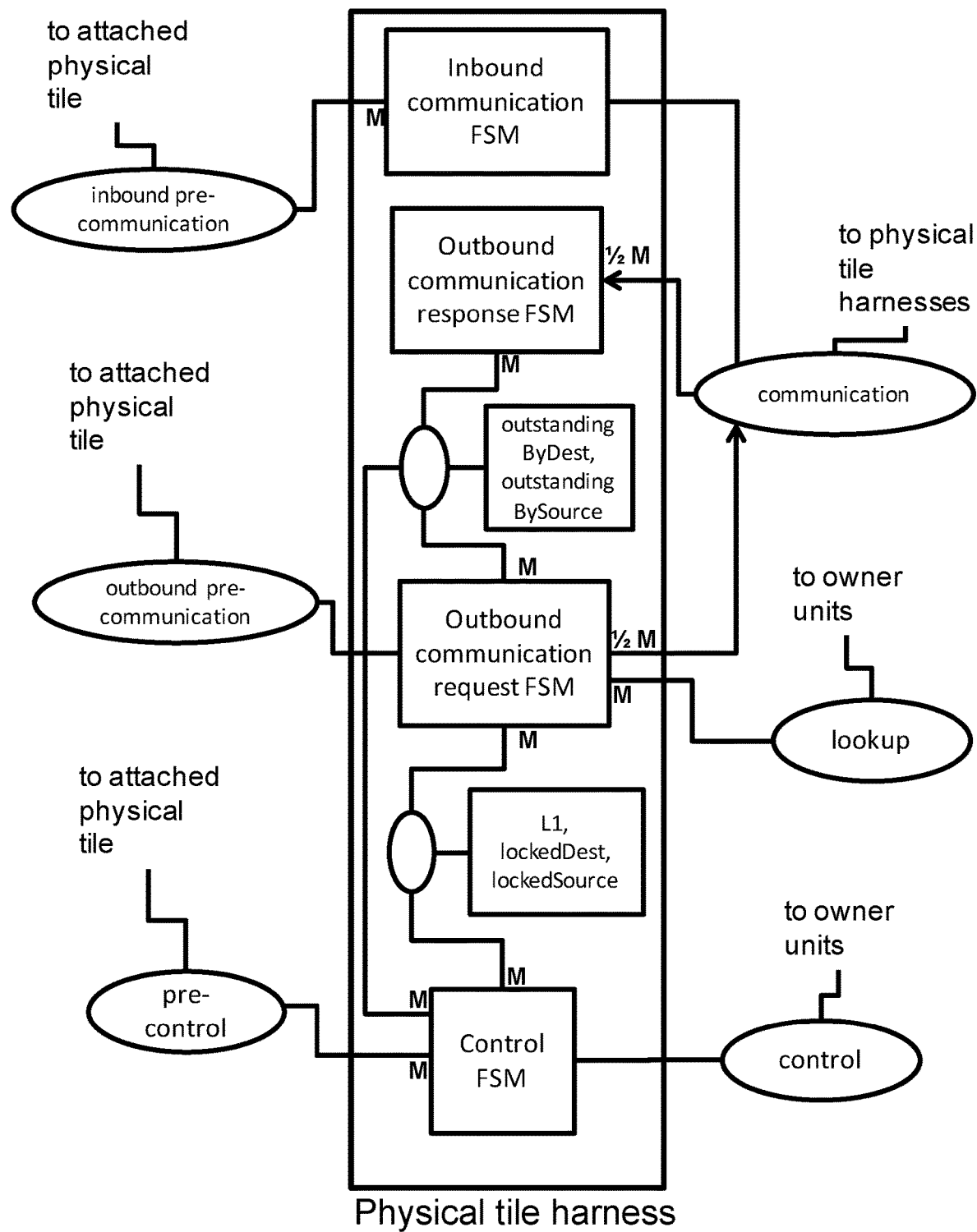
FIG 13 Internal organization of a physical tile harness

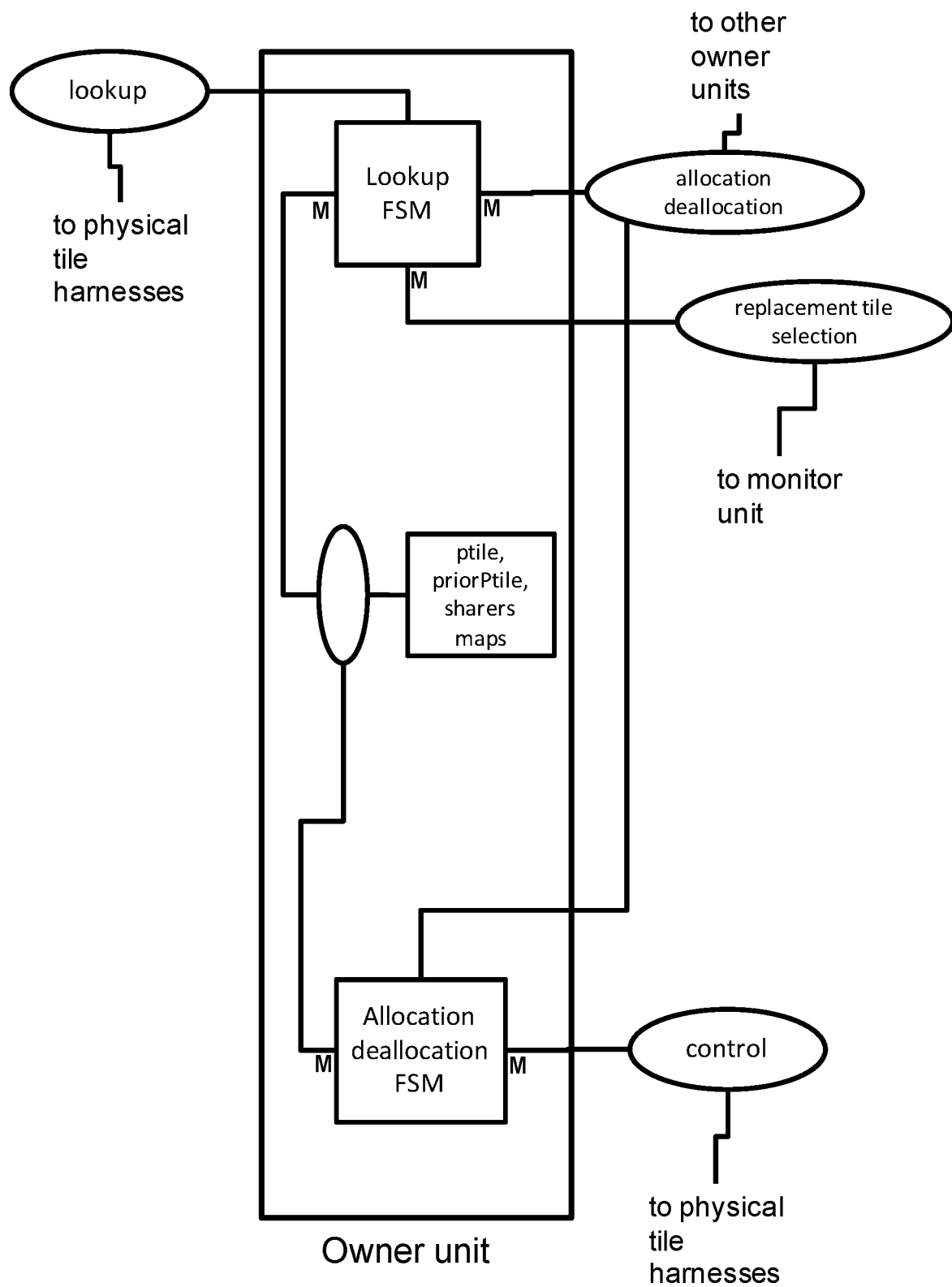
FIG 14 Internal organization of an owner unit

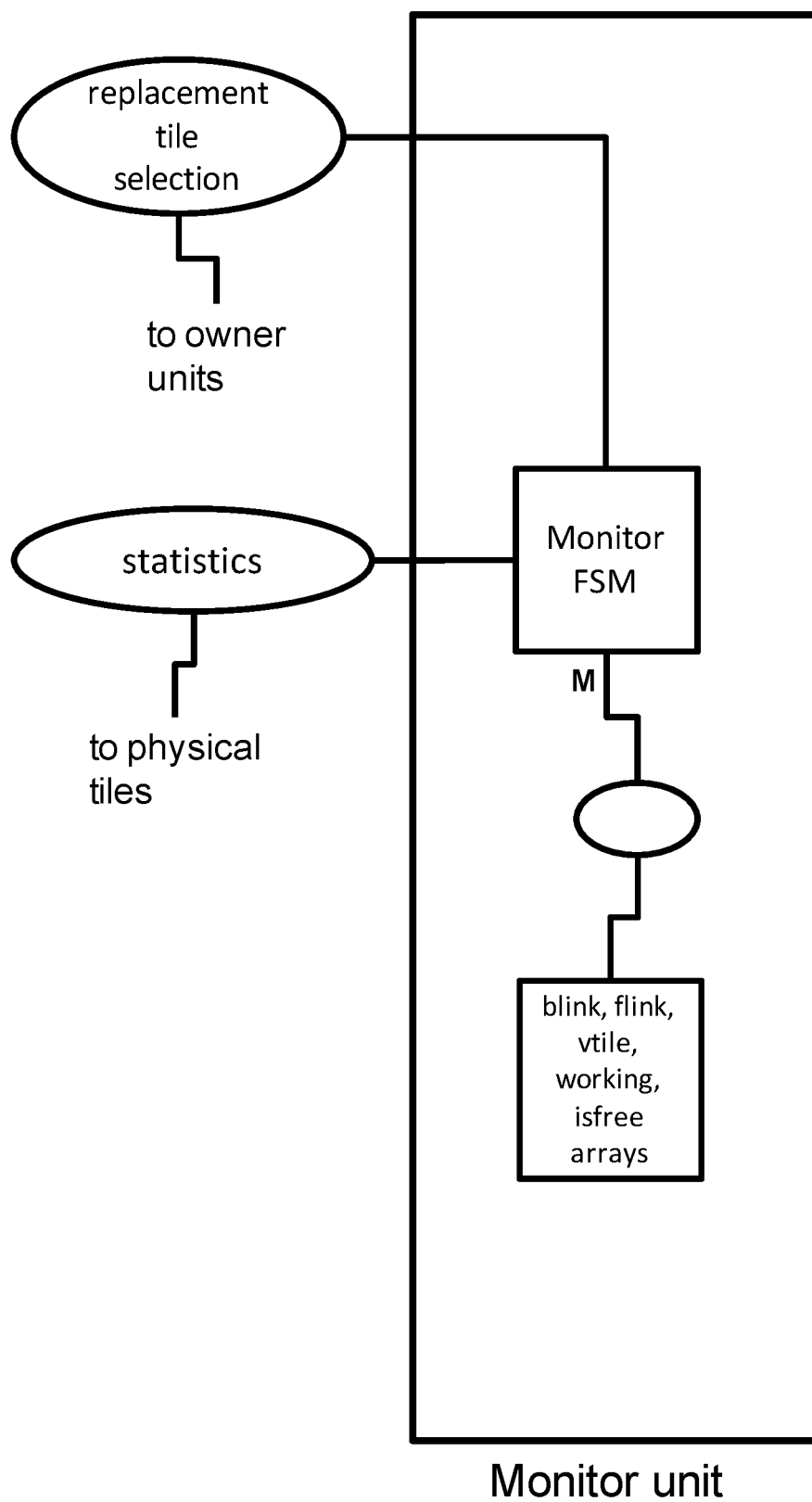
FIG 15 Internal organization of the monitor unit

PARALLEL HARDWARE HYPERVISOR FOR VIRTUALIZING APPLICATION-SPECIFIC SUPERCOMPUTERS

This application claims priority, as a continuation application, to U.S. patent application Ser. No. 16/280,125 filed on Feb. 20, 2019, which claims priority, as a continuation application, to U.S. patent application Ser. No. 16/105,741 filed on Aug. 20, 2018, now U.S. Pat. No. 10,514,939, which claims priority, as a continuation application to U.S. patent application Ser. No. 15/137,268 filed on Apr. 25, 2016, now U.S. Pat. No. 10,120,704, which claims priority, as a continuation application, to U.S. patent application Ser. No. 13/366,318 filed on Feb. 4, 2012, now U.S. Pat. No. 9,465,632. Ser. Nos. 16/280,125, 16/105,741, 15/137,268, 13/366,318 and U.S. Pat. Nos. 10,514,939, 10,120,704, 9,465,632 are hereby incorporated by reference.

REFERENCES CITED

Related co-pending, co-owned U.S. patent applications:

| U.S. non-provisional patent application no. | Date Filed | Title | Inventors | Assignee |
|---|---|---|---|---|
| 13/156,881 | Jun. 9, 2011 | Storage unsharing | Kultursay et al. | Global Supercomputing Corporation |
| 13/296,232 (referred to in this document as [Supercomputer]) | Nov. 15, 2011 | Method and system for converting a single-threaded software program into an application-specific supercomputer | Ebcioglu et al. | Global Supercomputing Corporation |

U.S. Patents

| U.S. Pat. No. | Issue Date | Title | Inventors | Assignee |
|---|---|---|---|---|
| 6,826,615 B2 | Nov. 9, 2004 | Apparatus and method for hardware implementation or acceleration of operating system functions | Barrall et al. | BlueArc UK Limited |
| 7,603,540 B2 | Oct. 13, 2009 | Using field-programmable gate array (FPGA) technology with a microprocessor for reconfigurable, instruction level hardware acceleration | Doering et al. | International Business Machines Corporation |
| 7,409,670 B1 | Aug. 5, 2008 | Scheduling logic on a programmable device implemented using a high-level language | Pritchard et al. | Altera Corporation |
| 7,555,566 B2 | Jun. 30, 2009 | Massively parallel supercomputer | Blumrich et al. | International Business Machines Corporation |
| 7,761,687 B2 | Jul. 20, 2010 | Ultrascalable petaflop parallel supercomputer | Blumrich et al. | International Business Machines Corporation |
| U.S. patent application 2004/0049672 A1 | Published Mar. 11, 2004 | System and method for hardware software multitasking on a reconfigurable platform | Nollet et al. | |
| 8,020,163 B2 | Sep. 13, 2011 | Heterogeneous multiprocessor network-on-chip devices, methods and operating systems for control thereof | Nollet et al. | IMEC, Xilinx, Inc. |
| 6,034,538 | Mar. 7, 2000 | Virtual logic for reconfigurable hardware | Abramovici | Lucent Technologies Inc. |

OTHER PUBLICATIONS

[1] R. J. Creasy, "The origin of the VM/370 time-sharing system", IBM Journal of Research & Development, Vol. 25, No. 5 (September 1981), pp. 483-90. http://www.research.ibm.com/journal/rdi255/ibmrd2505M pdf

[2] Geoffrey Blake, Ronald G. Dreslinski, Krisztian Flautner, Trevor Mudge. Evolution of thread-level parallelism in desktop applications. Proceedings of the $37^{th}$ Annual International Symposium on Computer Architecture. St. Malo, France. ACM Press.June 2010.

[3] Wikipedia article. Cloud Computing. http://en.wikipedia.org/wiki/Cloud_computing. Retrieved November 2011.

[4] VmWare. Virtualization Overview White Paper. 2006. http://www.vmware.com/pdf/virtualization.pdf

[5] J. Held, J. Bautista, Sean Koehl. "*From a Few Cores to Many: A Tera-scale Computing Research Review*," Intel White Paper, 2006. http://download.intel.com/research/platform/terascale/terascale_overview_paper.pdf

[6] P. N. Glaskowsky, "*NVDIA's Fermi: The First Complete GPU Computing Architecture,*" NVDIA White Paper, 2009. http://www.nvidia.com/content/PDF/fermi_white_paners/P.Glaskowsky_NVIDIA's F ermi-The_First_Complete_GPU_Architecture.pdf

[7] *The Convey HC-1 Computer Architecture Overview*, Convey White Paper, 2008. http://www.conveycomputer com/Resources/ConveyArchitectureWhiteP. pdf

[8] SGI-RASC RC100 Blade, SGI Data Sheet, 2006.

[9] Partial Reconfiguration User Guide. Xilinx, 2011. http://www.xilinx.com/support/docunenation/sw_manuals/xilinx13_1/ug702 pdf

[10] M. Liu, W. Kuehn, Z. Lu, A. Jantsch, "*Run-time Partial Reconfiguration Speed Investigation and Architectural Design Space Exploration,*" International Conference on Field Programmable Logic and Applications, 2009.

[11] F. Ferrandi, M. D. Santambrogio, D. Sciuto, "*A Design Methodology for Dynamic Reconfiguration: the Caronte Architecture,*" International Parallel and Distributed Processing Symposium, p. 4, 2005.

[12] M. Majer, J. Teich, A. Ahmadinia, Christophe Bobda, "The Erlangen Slot Machine: A Dynamically Reconfigurable FPGA-Based Computer," Journal of VLSI Signal Processing 47, 15-31, 2007.

[13] H. Simmler, L. Levinson, R. Manner, "*Multitasking on FPGA Coprocessors,*" Lecture Notes in Computer Science, vol. 1896, pp. 121-130, 2000.

[14] C.-H. Huang, P.-A. Hsiung, "*Software-Controlled Dynamically Swappable Hardware Design in Partially Reconfigurable Systems,*" EURASIP Journal on Embedded Systems, vol. 2008, pp. 1-11, 2008.

[15] V. Rana, M. Santambrogio, D. Sciuto, B. Kettelhoit, M. Koester, M. Porrmann, U. Ruckert, "*Partial Dynamic Reconfiguration in a Multi-FPGA Clustered Architecture Based on Linux,*" International Parallel and Distributed Processing Symposium, 2007.

[16] Klaus Danne and Marco Platzner. Periodic real-time scheduling for FPGA computers. Third International Workshop on Intelligent Solutions in Embedded Systems. 2005. http:/dx.doi.org/10.1109/WISES.2005.1438720

[17] H. Simmler and L. Levinson and R. Männer. Multitasking on FPGA Coprocessors. Proceedings of the 10th International Workshop on Field Programmable Gate Arrays (FPL). Pp. 121-130. 2000. Springer.

[18] M. Vuletic, L. Pozzi, P. Ienne, "*Seamless Hardware-Software Integration in Reconfigurable Computing Systems,*" IEEE Design and Test of Computers, vol. 22, no. 2, pp. 102-113, 2005.

[19] H. K.-H. So, A. Tkachenko, R. Brodersen, "*A Unified Hardware Software Runtime Environment for FPGA-Based Reconfigurable Computers Using BORPH,*" International Conference on Hardware-Software Codesign and System Synthesis, pp. 259-264, 2006.

[20] J. Duato, S. Yalamanchili, L. M. Ni. *Interconnection Networks: An Engineering Approach*. IEEE Press, 1997.

[21] Lynn Conway. The M.I.T. 1978 VLSI System Design Course. http://ai.eecs.umich.edu/people/conway/VLSI/MIT78/MIT78.pdf

[22] Wikipedia article. Multi-project wafer service. http://en.wikipedia.org/wiki-Multi-project_wafer_service

[23] Ilija Hadzic and Sanjay Udani and Jonathan M. Smith. FPGA Viruses. In 9th International Workshop on Field Programmable Logic and Applications. 1999, pp. 291-300, Springer-Verlag. http://citeseerx.ist psu.edu/viewdoc/summary?doi:=10.1.1.43.9135

FIELD OF THE INVENTION

The invention relates to a parallel hardware hypervisor system for virtualizing application-specific supercomputers.

BACKGROUND OF THE INVENTION

Maturity of processor architecture research: The general-purpose processor architecture research field has matured, with attempts to further increase the performance of general-purpose processors presently encountering (i) frequency, (ii) power, (iii) design complexity, and (iv) memory wall barriers. However, the need for increased performance and reduced power continues to exist.

Difficulty of parallel programming: Abandoning the extremely convenient, easy-to-use sequential programming model and programming explicitly for parallel processors constitute one way for increasing performance. Recent multi-core processor architectures [5] that are enabled by increasing VLSI densities indeed encourage this approach. However, programming a parallel multi-core processor system is not a natural and easy task, due to, e.g., race conditions, deadlocks, and non-deterministic bugs that are hard to track. Increased parallelism in general-purpose processors has in fact increased the difficulty of programming and using them [2].

Inefficiencies of the hypervisor and the operating system: Sharing of computing resources among different independent applications and virtual machines has been emphasized at least since the days of early mainframes [1]. This emphasis on resource sharing continues to this day. Recently, Cloud Computing [3] and Virtualization [4] have emerged as preferred methods of offering computing and application services with resource sharing. By breaking the barriers of the traditional in-house IT shop approach, cloud computing offers centralized high performance computing resources, economies of scale, and radically higher degrees of efficiency. For example, a large cloud computing data center, along with a fast and reliable encrypted network, can greatly amplify the performance of an inexpensive client device, while preserving the security properties of an in-house IT shop.

However, cloud computing today relies on operating systems or hypervisors that are designed in software, and that lack scalability. For example, the cost of an interrupt may involve substantial overhead (e.g., ten thousand instructions) in today's operating systems. Moreover, the transition between privilege levels (as in an interrupt or system call) requires a global serialization/pipeline flush in general-purpose processors. The schedulers within operating systems and hypervisors alike are not designed in an algorithmically parallel scalable way, to handle massively parallel systems. At the extreme performance levels that will be needed in the future, such serialization overheads will become important. To alleviate the severe performance slowdown consequences of Amdahl's law, the slowdown effects due to both the OS and the hypervisor must be reduced.

Prevailing solutions: Current computer industry focus areas include two prevailing approaches, namely: energy-efficient multi-core processors [5] and hybrid computing architectures [6], which, while not directly addressing the significant problems mentioned above (namely, the difficulty of parallel programming, and the inefficiency of the OS and hypervisor), do promise to increase performance and to reduce power. We will review the hybrid computing architectures, since they are most relevant to application-specific supercomputers, the subject of the present document.

In general-purpose hybrid computing architectures, the acceleration unit consists of graphics processing units (GPUs) with their own specialized Instruction Set Architecture [6]. These acceleration units are capable of accelerating graphics applications, as well as a range of additional high performance computing applications, provided that suitable parts of the applications are re-coded to expose explicit parallelism and to take advantage of the massively parallel architecture of specialized processors.

By contrast, reconfigurable hybrid computing architectures (reconfigurable computers) deploy field programmable gate arrays (FPGAs) as the acceleration unit, and offer more flexibility. Typically, a collection of one or more FPGAs acts as a co-processor to each general-purpose host processor [7][8]. While arbitrary code in general cannot take advantage of the FPGAs using today's tools, suitable code fragments can again be recoded to expose explicit parallelism and then compiled with a high-level tool to run on the FPGAs.

Even though the commercial systems with FPGAs are very promising in boosting the application performance with less power than traditional servers, they suffer from a few shortcomings:

Lack of scalable pre-emptive scheduling: Many of today's reconfigurable computer systems do not implement pre-emptive scheduling of accelerators: they instead allow a hardware accelerator to keep its share of hardware resources as long as it runs. As a consequence, even when an accelerator is idle, e.g., waiting for an input, it occupies hardware resources until it finishes. This potentially leads to the underutilization of the system. Where pre-emptive hardware task scheduling is indeed done [15][16][17], it is done in a non-scalable way, with software involvement. Existing pre-emptive schedulers may also impose restrictions on inter-task communication, for example, task dependences may be in the form of a DAG (Directed Acyclic Graph) [U.S. Pat. No. 6,034,538].

Lack of scalability of hardware-accelerated applications: Today's software and hardware design tools do not virtualize application-specific, custom hardware accelerators at the supercomputer scale.

Low programmer productivity: Using a reconfigurable hardware platform is complex at present, because of the general difficulty of parallel programming, mentioned earlier, and the general difficulty of hardware design with today's tools.

Missing semi-reconfigurable ASICs: An FPGA is an interpreter of arbitrary circuits specified at the Register Transfer Level, and is therefore very flexible and general, while an ASIC implementation of a given RTL circuit is in fact a compiled version of that circuit, which has performance and power advantages over the corresponding FPGA implementation. To benefit from the lower power and higher performance advantages of an ASIC within a reconfigurable system, a systematic solution to utilize ASICs for application acceleration (beyond the solution of implementing only one function on a given kind of ASIC) is desirable. The existing reconfigurable computer systems do not systematically support application-specific integrated circuits (ASICs) in addition to FPGAs, as a source of hardware acceleration.

Our approach: The present document's system does address the two significant problems (difficulty of parallel programming, inefficiency of the OS and hypervisor) mentioned above. It also distinguishes itself from the cited art in at least the following ways:

Scalable pre-emptive scheduling: The present document's system introduces a scalable parallel hardware hypervisor system, where the hypervisor functions related to the allocation, de-allocation, and relocation of hardware supercomputing tasks with unrestricted inter-task communication, are achieved with parallel algorithms implemented in hardware. The resources allocated to a virtual application-specific supercomputer can increase or decrease on demand, at the virtual tile granularity. The parallel implementation of such hypervisor functions is a difficult problem, giving rise to several race conditions, which have been addressed in the present document.

Scalability of hardware-accelerated applications: The present document's system virtualizes application-specific, custom hardware accelerators at the supercomputer scale.

Programmer productivity: The present document's system establishes a hardware acceleration programming model and automated compilation method, which achieves 100% compatibility between the original single-threaded software application and the virtual supercomputer created from it. This is a model that allows better programmer productivity.

Semi-reconfigurable ASICs: The present document's system establishes a systematic method to create semi-reconfigurable ASIC modules, allowing the same ASIC module to realize multiple functions, while retaining the ASIC advantages of lower power and/or higher performance.

SUMMARY OF THE INVENTION

We describe a parallel hypervisor system for virtualizing application-specific supercomputers, where the system comprises:

At least one software-virtual hardware pair consisting of a software application, and an application-specific virtual supercomputer for accelerating the said software application, where:
  The virtual supercomputer contains one or more virtual tiles; and
  The software application and the virtual tiles communicate among themselves with messages;
One or more reconfigurable physical tiles, wherein each virtual tile of each virtual supercomputer can be implemented on at least one physical tile, by configuring the physical tile to perform the virtual tile's function; and
A scheduler implemented substantially in hardware, for parallel pre-emptive scheduling of the virtual tiles on the physical tiles.

A virtual or physical tile contains arbitrary digital circuits. The hypervisor system can be used to implement cloud computing with software applications accelerated by application-specific virtual supercomputers. Physical hardware resources can be incrementally increased or decreased on-demand for each application, at the physical tile granularity. Features of the hypervisor system include:

A globally coherent virtual tile to physical tile map, which is cached locally near each physical tile, allowing the message source physical tile containing the message source virtual tile to send a message directly and efficiently to the message destination physical tile containing the message destination virtual tile whenever there is a hit in the local virtual tile to physical tile cache near the message source physical tile.

Scalable on-chip and cross-chip networks that allow massively parallel transmission of messages.

A compiler technique whereby an arbitrary code fragment from a sequential software application can be converted to a virtual application-specific supercomputer automatically, for use within the hypervisor system.

A semi-reconfigurable ASIC module, designed to realize one among a finite number of virtual tiles with resource sharing. The identity of the virtual tile is determined by the contents of the configuration memory of the union physical tile, which offers ASIC advantages within a reconfigurable system.

Guaranteed isolation among the hardware-accelerated applications belonging to different customers.

The hypervisor design avoids system-wide serialization points, through the parallel handling of cache misses and coherence actions within the local virtual tile to physical tile caches described above, by using the following key hardware units:

Multiple owner units: the set of all virtual tiles in the system is partitioned, and one owner unit is assigned to each partition. An owner unit maintains the map from each virtual tile in its partition to a physical tile (if the virtual tile is mapped) or to NULL (if the virtual tile is not mapped). Using multiple owner units simultaneously allows parallel, independent search and tile pre-emption activities.

A monitor unit continuously obtains statistics about activity in the system. It then analyzes the statistics and provides replies to requesting owner units, in a parallel manner, to suggest a new physical tile to pre-empt to each owner unit, according to a tile replacement policy.

BRIEF DESCRIPTION OF THE DRAWINGS

FIG. 1 Illustrates a couple of software applications each accelerated by a virtual supercomputer (small illustrative example)

FIG. 2 Illustrates an example of the operation of the hypervisor. Step 1 of 8.

FIG. 3 Illustrates an example of the operation of the hypervisor. Step 2 of 8.

FIG. 4 Illustrates an example of the operation of the hypervisor. Step 3 of 8.

FIG. 5 Illustrates an example of the operation of the hypervisor. Step 4 of 8.

FIG. 6 Illustrates an example of the operation of the hypervisor. Step 5 of 8.

FIG. 7 Illustrates an example of the operation of the hypervisor. Step 6 of 8.

FIG. 8 Illustrates an example of the operation of the hypervisor. Step 7 of 8.

FIG. 9 Illustrates an example of the operation of the hypervisor. Step 8 of 8.

FIG. 10 Provides a legend for the symbols used in hardware schematics of the present document.

FIG. 11 Illustrates the hardware design of the flat, non-partitioned hypervisor.

FIG. 12 Illustrates the hardware design of the hypervisor after partitioning and chip unioning (cloud building block chip).

FIG. 13 Illustrates the internal organization of a physical tile harness.

FIG. 14 Illustrates the internal organization of an owner unit.

FIG. 15 Illustrates the internal organization of the monitor unit.

DESCRIPTION OF THE PREFERRED EMBODIMENT

We will now describe the details of a parallel hypervisor system for virtualizing application-specific supercomputers, where the system comprises:

At least one software-virtual hardware pair consisting of a software application, and an application-specific virtual supercomputer for accelerating the said software application, where:

The virtual supercomputer contains one or more virtual tiles; and

The software application and the virtual tiles communicate among themselves with messages;

One or more reconfigurable physical tiles, wherein each virtual tile of each virtual supercomputer can be implemented on at least one physical tile, by configuring the physical tile to perform the virtual tile's function; and A scheduler implemented substantially in hardware, for parallel pre-emptive scheduling of the virtual tiles on the physical tiles.

The preferred embodiment of the hypervisor consists of the following major parts:

The overall hardware structure of the hypervisor system
FPGA or ASIC chips containing one or more physical tiles, on-chip network, owner unit and monitor components
19 inch rack modules
19 inch racks each containing multiple rack modules
The whole reconfigurable system containing multiple racks An example illustrating the operation of the hypervisor
Primitive hardware building blocks of the hypervisor
Key hardware components of the hypervisor
The reconfigurable physical tile
The physical tile harness unit attached to each physical tile for virtualizing the routing of incoming and outgoing of messages
The owner units for implementing parallel searching of the table mapping virtual tiles to physical tiles and parallel pre-emption
The monitor unit for collecting statistics about the system and suggesting physical tiles to pre-empt
Discussion of potential race conditions in the hypervisor system and their solutions
This completes the description of the operation of the baseline reconfigurable system and hypervisor.

Optimizations: We then describe various optimizations and other applications of the hypervisor system.

The Overall Hardware Structure of the Hypervisor System

We will first describe the overall hardware structure of the preferred embodiment of the hypervisor system. The hypervisor system is organized in hierarchical enclosures, very much like a non-virtual (real) supercomputer. It comprises the following, starting from the leaves of the hierarchy and going towards the root:

An FPGA or ASIC chip (called a cloud building block chip), containing several physical tiles, an owner unit, possibly a monitor unit, and a number of internal on-chip networks, with I/O pins including Optional PCI Express interface for communicating with an attached host processor system;

DDRn interface to DRAM units (e.g., organized as Dual Inline Memory Modules) on the same rack module;

Several incomplete hypercube links implemented with copper or optical high-speed serial communication cables; and Wide high speed busses connected to neighboring FPGA/ASIC chips on the same rack module, with differential signaling;

A rack module containing several cloud building block chips and DRAM modules;

19 inch racks each containing several rack modules;

The entire hypervisor system containing several 19 inch racks.

"Incomplete hypercube" is used in the sense that the total number of chips in the system need not be a power of two. The total number of chips in the system can be any number greater than or equal to one. Although we will stick to the incomplete hypercube topology in this document, for systems with a very large number of chips, a cube-connected cycles topology (where a communicating group of chips serves a single hypercube node, therefore effectively increasing the number of hypercube links of each node) can be used.

An Example Illustrating the Operation of the Hypervisor

To motivate the forthcoming detailed hardware description of the hypervisor system, we will start by describing the operation of the hypervisor system on a small example. FIG. 1 illustrates two software applications running on traditional commodity host microprocessor systems, which are each accelerated by an application-specific virtual supercomputer (small illustrative examples shown; typical virtual supercomputers will have many more virtual tiles). Each virtual supercomputer comprises one or more virtual tiles that communicate with messages among themselves and with the software application. The objective of the hypervisor system is to make each virtual tile believe it is communicating with other virtual tiles of the same virtual supercomputer, as if they were all part of a non-virtual supercomputer, while in reality those virtual tiles which remain idle for some time will likely be pre-empted by other virtual tiles that become active.

When we say "cache" within the following text, we do not mean a data cache or instruction cache. The caches of the hypervisor system implement a mapping from virtual tiles to physical tiles; they do not contain data. These caches help speed up the transmission of messages within a virtual supercomputer.

The key to fast sending of messages within the virtual supercomputer is a set of globally coherent first level caches mapping virtual tiles to physical tiles, such that there is a cache present right next to each physical tile. Such a local cache allows:

the message source physical tile p1 containing the message source virtual tile v
to send a message directly to
the message destination physical tile p2 containing the message destination virtual tile v2 very efficiently with a local first level cache access, by adding only a few cycles to the latency, whenever the mapping (v2→p2) is found in the local first level cache near physical tile p1. The physical destination tile number "p2" is added to the message at the time it leaves the physical tile p1, which guides the message from the physical tile p1 to the physical tile p2 within a scalable on-chip and cross-chip network. p2 is in fact the destination port number of the network, which makes routing simple, e.g., in a butterfly network where each network stage makes a routing decision based on the next bit of the destination port number. When the message reaches the physical tile p2, the physical destination tile number "p2" is deleted from the message, and the original message that emanated from v1 is recovered. In this manner, the virtual tile v2, contained in the physical tile p2, remains completely unaware of physical tiles, and believes the message came from virtual tile v1. The local first level caches containing (virtual tile→physical tile) mappings are kept globally coherent and consistent with each other.

The virtual tile numbered −1 is special within each virtual supercomputer: it is used as a message exchange gateway to the corresponding software application running on the host processor system, which is reached via a PCI Express connection. This virtual tile number −1 is permanently pinned to a physical tile during the lifetime of the application, for simplifying message routing.

Each (application, virtual supercomputer) pair in the hypervisor system is assigned a unique application id number (e.g., 0x00=application A instance 0, 0x10=application B instance 0, 0x11=application B instance 1, . . . ).

As opposed to local virtual tile numbers, which are integers in the range −1, 0, . . . maximum virtual tile number within the given virtual supercomputer, a global virtual tile uniquely identifies any virtual tile within any virtual supercomputer in the hypervisor system, and is a pair (application id, local virtual tile number within this application). In the following text, a virtual tile (when not explicitly specified as a "local virtual tile" or "global virtual tile") will mean a global virtual tile.

FIG. 2, FIG. 3, FIG. 4, FIG. 5, FIG. 6, FIG. 7, FIG. 8, FIG. 9 describe the individual steps of the hypervisor when virtual tiles of the small example virtual supercomputers send messages to each other.

FIG. 2 shows the initial state of the system before any messages are sent. Only the local virtual tiles numbered −1 within each virtual supercomputer have been mapped to physical tiles, which are capable of exchanging messages with the corresponding software application through a PCI Express connection. All local first level caches near the physical tiles are initially empty. In this example, the virtual tiles have been partitioned into two groups, and these groups have been assigned to owner units 0 ($Owner_0$) and 1 ($Owner_1$). Multiple owner units are used, so that searching and pre-emption operations on virtual tiles in different partitions can proceed independently, and in parallel. An owner unit is responsible for maintaining a partition of a table mapping each virtual tile to the physical tile containing the virtual tile (if the virtual tile is currently mapped), or to NULL (if virtual tile is not currently mapped). For each virtual tile v that is mapped to a physical tile p, the owner unit also keeps a list of sharers, i.e., the list of physical tiles (other than p) that have locally cached the mapping (v→p).

The owner unit for a virtual tile is found by computing a simple hash function of the virtual tile.

FIG. 3 shows the result when virtual tile $A_{-1}$ contained in physical tile $P_0$ sends a message to virtual tile $A_0$, which is not yet contained in any physical tile. After the message leaves $P_0$, its virtual destination tile $A_0$ is searched in the local first level cache near $P_0$; but this cache is empty, and hence a local first level cache miss occurs. The cache miss is handled by $owner_0$ which is known to be responsible for virtual tile $A_0$. The monitor unit is a hardware unit which is responsible for collecting statistics from each physical tile and implementing a Least Recently Used tile replacement policy in this example. Owner$_0$ asks the monitor unit to provide the best physical tile to allocate A$_0$ in. The monitor unit responds with P$_2$, which is an empty tile. A$_0$ is then allocated in P$_2$ by owner$_0$, i.e., owner$_0$ reads the state and configuration of virtual tile A$_0$ from hypervisor storage, and reconfigures empty physical tile P$_2$ to realize virtual tile A$_0$. The mapping (A$_0$→P$_2$) is locally cached within P$_0$. P$_0$ is also added to the sharers list of the (A$_0$→P$_2$) mapping within the owner$_0$ unit. Now, a cache miss will no longer occur, and the sending of the message from P$_0$ can continue from where it left off. The destination physical tile P$_2$ is added to the original message from virtual tile A$_{-1}$ to virtual tile A$_0$. Thanks to the presence of the destination physical tile field, the message finds its way from P$_0$ to P$_2$ through a scalable communication network (e.g., a butterfly network) connecting all physical tiles. When the message reaches the physical tile P$_2$, any extra fields in the message are deleted, and the virtual tile A$_0$ contained in the physical tile P$_2$ receives the original message, as sent by virtual tile A$_{-1}$. Note that the virtual tiles A$_{-1}$ and A$_0$ are unaware of any physical tiles, they act as if the virtual tiles were real hardware tiles connected by a real network. All these scheduling actions are done completely through scalable parallel hardware, to be described starting at the section below entitled "Primitive hardware building blocks of the hypervisor", without requiring the assistance of a software operating system or a software hypervisor.

FIG. 4 shows the activities when virtual tile A$_0$ contained in physical tile P$_2$ sends a message to virtual tile A$_{-1}$ contained in physical tile P$_0$. Since P$_2$'s local first level cache is empty, a cache miss occurs. The cache miss is handled by owner$_0$ which is known to be responsible for A$_{-1}$. In this case, the destination virtual tile A$_{-1}$ is already mapped within owner$_0$, therefore no reconfiguration activity by owner$_0$ is needed. The mapping (A$_{-1}$→P$_0$) is locally cached near the physical tile P$_2$. Also, P$_2$ is recorded as a sharer of the (A$_{-1}$→P$_0$) mapping within owner$_0$. Then, the message from A$_0$ to A$_{-1}$ is delivered.

FIG. 5 shows the activities when virtual tile A$_{-1}$ contained in physical tile P$_0$ sends a message to virtual tile A$_0$ contained in physical tile P$_2$. In this case, since the mapping (A$_0$→P$_2$) is already in the local first level cache of P$_0$, there is a cache hit; hence, the message is rapidly sent to the destination physical tile P$_2$ and then forwarded to the virtual tile A$_0$ contained in P$_2$ in its original form. There are no mapping changes at this step, which is intended to show the benefits of hitting in the local first level cache.

Notice that at this point, virtual tile A$_1$ has not been used and has not been allocated in a physical tile. If the virtual tile A$_1$ is not needed by the current inputs of the computation the virtual supercomputer for application A is engaged in (i.e., A$_0$ is sufficient for accelerating application A for its current input), then no message will be sent to A$_1$ and no physical tile will be allocated for A$_1$. The present hypervisor system therefore allows on-demand increase of hardware resources for a given virtual supercomputer, delaying the allocation of a physical tile until (if ever) it is actually needed. Similarly, we will see that physical tiles that have remained idle will be pre-empted, resulting in an incremental decrease of resources for a given virtual supercomputer. Incremental increase and decrease of resources is an essential requirement of ordinary software cloud computing; the present hardware hypervisor system provides this feature for incremental provisioning of hardware acceleration resources to applications.

FIG. 6 shows the activities when virtual tile A$_0$ contained in physical tile P$_2$ finally sends a message to virtual tile A$_1$, which is not yet contained in any physical tile. The local first level cache miss within P$_2$ is handled by owner$_1$ which is known to be responsible for A$_1$. Owner$_1$ asks the monitor unit for the best physical tile to allocate A$_1$ in; the response is the empty physical tile P$_3$. A$_1$ is then allocated in P$_3$ by owner$_1$, i.e., owner$_1$ reads the initial state of virtual tile A$_1$ from the hypervisor storage, reconfigures the empty tile P$_3$ to realize A$_1$, and gets P$_3$ running. The mapping (A$_1$→P$_3$) is cached locally within P$_2$. Also, P$_2$ is recorded as a sharer of the (A$_1$→P$_3$) mapping within owner$_1$. Then, the message from A$_0$ to A$_1$ is delivered.

FIG. 7 shows the activities when virtual tile A$_1$ contained in physical tile P$_3$ sends a message to virtual tile A$_0$ contained in physical tile P$_2$. The cache miss is handled by owner$_0$. A$_0$ is already allocated in P$_2$; hence no reconfiguration activity is needed. The mapping (A$_0$→P$_2$) is cached locally P$_3$. Also, P$_3$ recorded as a sharer of the (A$_0$→P$_2$) mapping within owner$_0$. Then, the message from A$_1$ to A$_0$ is delivered.

FIG. 8 shows the activities when virtual tile B$_{-1}$ contained in physical tile P$_1$ sends a message to virtual tile B$_0$, which is not yet contained in any physical tile. The local first level cache miss for virtual tile B$_0$ is handled by owner$_0$ which is responsible for B$_0$. Owner$_0$ asks the monitor unit for the best physical tile to allocate B$_0$ in. The monitor unit responds with the physical tile P$_3$ currently containing the virtual tile A$_1$ based on the Least Recently Used Tile replacement policy (assuming P$_3$ has been idle for some time). Owner$_0$ asks owner$_1$ to undo the (A$_1$→P$_3$) mapping, since owner$_1$ is the one responsible for virtual tile A$_1$. This is where the sharer list becomes useful: For the owner of a given virtual tile v to de-allocate/undo a mapping (v→p) to a physical tile p, the following steps are followed:

1. The owner of v invalidates the (v→p) mapping in the local first level cache of each sharer physical tile that has the (v→p) mapping locally cached, and finally deletes its own (v→p) mapping;
2. The owner of v stops the physical tile p at the next precise interruption point, and saves the state/configuration of v in hypervisor storage;

Going back to the example in FIG. 8:

P$_2$ is a sharer of the (A$_1$→P$_3$) mapping within owner$_1$. Thus, as a consequence of step 1 above, the (A$_1$→P$_3$) local first level cache entry in physical tile P$_2$ is deleted by owner$_1$. The (A$_1$→P$_3$) mapping and its sharers are also deleted within owner$_1$.

As a consequence of step 2 above, P$_3$ is stopped and virtual tile A$_1$'s state in P$_3$ is saved in hypervisor storage by owner$_1$.

Finally,

Virtual tile A$_1$ becomes unmapped in owner$_1$, and

Physical tile P$_3$ becomes empty.

Now a clean empty physical tile P$_3$ is available for allocating virtual tile B$_0$.

FIG. 9 continues to show the activities when virtual tile B$_{-1}$ contained in physical tile P$_1$ sends a message to virtual tile B$_0$, which is not yet contained in any physical tile. The virtual tile B$_0$ is allocated in empty tile P$_3$ by owner$_0$, i.e., owner$_0$ reads the state and configuration of virtual tile B$_0$ from storage, reconfigures physical tile P$_3$ to realize virtual tile B$_0$, and starts P$_3$. The mapping (B$_0$→P$_3$) is locally cached in P$_1$. Also, P$_1$ is recorded as a sharer of the (B$_0$→P$_3$) mapping within owner$_0$. Then, the message from B$_{-1}$ to B$_0$ is delivered.

Notice that the mapping ($A_0 \rightarrow P_2$) has remained in the local cache of $P_3$. If it remains unused, it will eventually be evicted from this local cache.

In the illustrative small example above, we described the effects of message transmissions on the hypervisor system, as if the each message were transmitted following a global sequential order on the message transmissions. In reality, when two messages are independent, they will be transmitted in any order or in parallel, and the tile pre-emption and cache coherence actions will also occur in parallel, thanks to the multiple owner units. We will describe the highly parallel hardware implementation of the hypervisor system in detail and also show how race condition errors are avoided, in the sections below.

Primitive Hardware Building Blocks of the Hypervisor

At this point we incorporate by reference the co-pending, co-owned non-provisional U.S. patent application Ser. No. 13/296,232, entitled "Method and system for converting a single-threaded software program into an application-specific supercomputer". This patent application will be called [Supercomputer] from this point on.

The present document describes a hypervisor system comprising virtual supercomputers, while [Supercomputer] describes a method and system for creating non-virtual (real) supercomputers; therefore, the present document's subject is different. However, referring to [Supercomputer] (i) clarifies and shortens the present hypervisor system's baseline hardware description, and also (ii) provides an important kind of preferred embodiment.

The present hypervisor system will work with any physical tiles, virtual tiles and virtual supercomputers wherein:

Each virtual tile communicates with an agreed-upon message interface and message format, through designated pre-communication I/O pins of the physical tile currently configured to realize the virtual tile;

Each virtual supercomputer operates correctly regardless of network latencies:

The hypervisor ensures that for any given pair of virtual tiles v1 and v2, the messages from v1 to v2 will not be reordered. Also, it ensures that each message that is sent from v1 to v2 is eventually received by v2; messages are not lost. But the delivery of a message from v1 to v2 may take arbitrarily long in terms of wall clock time in a hypervisor environment. Each virtual supercomputer should therefore first be unit-tested in a real environment by artificially introducing random network delays, before being deployed in the hypervisor;

Each physical tile and virtual tiles support, through designated control I/O pins of the physical tile:

Stopping the virtual tile currently being realized by the physical tile at a precise message boundary point, where no messages are only partially sent or only partially received by the virtual tile;

Reading out the state of the stopped virtual tile;

Writing the saved state of a second virtual tile into the physical tile; and

Restarting the second virtual tile from where it left off.

However, when the technology described in [Supercomputer] is combined with the present hypervisor, we obtain an important kind of specialized physical tiles, virtual tiles, and virtual supercomputers such that:

Each design partition of a compiler-generated application-specific supercomputer in [Supercomputer] becomes a virtual tile within the hypervisor; and The union chip for the design partitions in [Supercomputer] becomes a physical tile within the hypervisor.

The combination of the technology in [Supercomputer] with the present hypervisor system therefore yields a new cloud computing system, wherein each software application is accelerated by a virtual application-specific supercomputer, which is automatically obtained from the said software application.

Further details of making use of the union chips generated by [Supercomputer] as physical tiles, will be given in optimization 1 in the optimization section.

In an attempt to make the present document more self-contained, we will now also briefly summarize the features from [Supercomputer] which are re-used in the present hypervisor system. These features are specifically helpful for implementing the components of the present hypervisor at a low hardware level; although an experienced hardware designer may choose other techniques which will work equally well for the same implementation.

The hardware hypervisor system of the present document
  will use the same (non-virtual) hardware building
  blocks and the same I/O signal interface conventions,
  including the software-hardware communication protocol, as described at least in the paragraphs [0037]-[0066], [0081]-[0087], [0148]-[0154], [0155]-[0167],
  and Appendix A of [Supercomputer]. These include:
  A FIFO interface handshaking specification, causing
    the removal of a word from the front of the sending
    FIFO and the addition of the said word to the back
    of the receiving FIFO at the next rising clock edge,
    if and only if the request output signal of the sending
    FIFO (meaning the sending FIFO is not empty) and
    the acknowledge output signal of the receiving FIFO
    (meaning the receiving FIFO is not full) are both 1;
  Variable length, multi word messages, with an end-of-data bit signaling the last word;
  A hardware component's master port consisting of a
    sending FIFO interface (which sends a request) and
    a receiving FIFO interface (which receives a
    response);
  A hardware component's slave port consisting of a
    receiving FIFO interface (which receives a request)
    and a sending FIFO interface (which sends a
    response);
  On-chip customized n input, m output incomplete
    butterfly sub-networks, where messages are routed
    from a sub-network input to a sub-network output
    designated by a destination port field within the first
    word of the message (the butterfly sub-network is
    incomplete in the sense that the number of inputs and
    outputs need not be a power of two);
  On-chip customized networks connected to n master
    ports and m slave ports, formed from a pair of
    incomplete sub-networks:
    A forward sub-network for sending a request from
      the sending FIFO interface of master port to the
      receiving FIFO interface of a slave port; and
    A reverse sub-network for sending a response from
      the sending FIFO interface of a slave port to the
      receiving FIFO interface of a master port;
  Chips and hardware modules built from components,
    networks and external communication devices:
    Components include finite state machines (FSMs)
      with one or more FIFO interfaces;
    External communication devices include an interface
      to PCI Express, an interface to fast serial communication cables, an interface to wide busses between chips on the rack module, with differential signaling, and an interface to DDRn DRAM units outside the chip;

Within the conventions of the present document and [Supercomputer], a component must always go through a network to communicate with another component. But point to point networks can later be optimized as straight-through wires;

Request routing within a forward sub-network based on the destination port field (identifying the responding component) within the first word of a message;

Response routing within a reverse sub-network based on the source port field (identifying the requesting component) in the first word of a message;

Technique for accessing multiple FIFO interfaces simultaneously in a single state in a finite state machine, correctly handling the cases where one FIFO interface immediately transmits data, while another FIFO interface is delayed;

Technique for issuing multiple outstanding requests in pipelined fashion and receiving responses out of order, by using a tag field to match incoming responses to outstanding requests (as exemplified by this sequence of message transmissions of a hardware component: (i) Send request 1 with tag 1; (ii) Send request 2 with tag 2; (iii) Response 2 with tag 2 comes back; (iv) Response 1 with tag 1 comes back)

Software API routines for low-level message communication between the software application and the supercomputer which aims to accelerate it;

Incomplete hypercube cross-chip networks ("incomplete" meaning: a hypercube network where the number of nodes need not be a power of two);

Method for partitioning a flat, non-partitioned application-specific supercomputer design into multiple chips or modules;

Method for creating a union chip which is capable of realizing any of the partitions based on the configuration parameters provided to the union chip.

Starting from the flat non-partitioned design of the hypervisor, to be described in detail below, the design partitioning and chip unioning technique described at least in the paragraphs [00169]-[00190] and Appendix K of [Supercomputer] will also be used to create the "union chip" of the hardware hypervisor design, a chip that is capable of realizing any partition of the partitioned hypervisor design. This union chip will be called the cloud building block chip. The entire cloud data center will consist of copies of the cloud building block chip in hierarchical enclosures (such as rack modules and racks), wherein the copies of the cloud building block chip will possibly differ only in the types of physical tiles contained in it.

An example of design partitioning and chip unioning, as it relates to creating a scalable hypervisor, will be given in the paragraphs below beginning with the words "Let us summarize the design partitioning and chip unioning technique".

Key Hardware Components of the Hypervisor

The Networks and Components

Armed with the basic hardware building blocks of [Supercomputer], we will now describe the hardware hypervisor system in detail. FIG. 10 provides a legend for the symbols occurring in the hardware schematics within the present document. Referring to the top level hypervisor system schematic in FIG. 11, the specific networks in the flat, non-partitioned hypervisor system are listed below, in the format:

Name of network: (component type having a master port of the network) to (component type having a slave port of the network).

Allocation deallocation: Owner unit to owner unit. In order pre-empt a physical tile p, a first owner tells a second owner to de-allocate a virtual tile v already allocated to a physical tile p. Also, using the same network, an owner tells itself to allocate a virtual tile v to an empty physical tile p. In addition, using the same network, an owner tells itself to drain (ensure the delivery of) all the undelivered messages emanating from the last physical tile v was allocated to, to ensure messages from v are not re-ordered in the networks when v starts working on a different physical tile.

Control: Owner unit to physical tile harness. Using this network, an owner unit stops a physical tile and reads its state, or writes the new state of a physical tile and starts it. An owner unit can also attempt to drain (ensure the delivery of) all currently undelivered messages emanating from a virtual tile.

Lookup: Physical tile harness to owner unit. A physical tile harness requests the physical tile corresponding to a virtual tile from its owner unit, to be able to cache the mapping locally for re-use later. Using the same network, a physical tile harness also notifies the owner of virtual tile v, that it is abandoning/deleting a locally cached mapping (v→p), where p is a physical tile.

Communication: Physical tile harness to physical tile harness. This is for application-level communication messages within a virtual supercomputer itself. Each physical tile harness has one master port and one slave port attached to the communication network.

A physical tile harness accepts an outbound message from a physical tile and sends it out on the sending FIFO of its master port of the communication network. It receives an acknowledgement (confirming that the message got to its destination physical tile harness) from the receiving FIFO of the same master port. Outbound messages are sent and acknowledgements come back in pipelined manner: The physical tile harness does not wait for an acknowledgement for a first outbound message before sending a second outbound message.

A physical tile harness receives an inbound application message from the receiving FIFO of its slave port of the communication network. This message is delivered as an inbound message to the attached physical tile. The physical tile harness also sends an acknowledgement to the sending physical tile harness, using the sending FIFO of the same slave port.

The application virtual tiles are unaware of the acknowledgements, which are not used during the normal operation of the hypervisor when there are cache hits. These acknowledgements are used by the hypervisor solely to ensure that each pending, undelivered inbound and outbound message pertaining to a particular physical tile is delivered to its destination, before the virtual tile contained within the physical tile is pre-empted/deallocated from that physical tile and later reallocated to another physical tile. This mechanism is required for preventing loss or reordering of messages.

Replacement tile selection: Owner unit to monitor. An owner unit asks the monitor for a physical tile to pre-empt. The monitor will typically respond with a least recently used physical tile, assuming it is implementing an LRU replacement policy. Also, an owner notifies the monitor through this network, that a physical tile has been completely reconfigured.

Statistics: Physical tile to monitor. Each physical tile provides periodic signals about its activities (e.g., whether it was idle or working within the last time interval) to the monitor unit.

Outbound pre-communication n: (point to point), for each physical tile n. Physical tile to the attached physical tile harness.

Inbound pre-communication n: (point to point), for each physical tile n. Physical tile harness to the attached physical tile.

These networks carry application-level messages for the virtual tile located inside a physical tile, making the virtual tile unaware that it is running on physical tile. The pre-communication networks consist of a unidirectional inbound channel for application messages being received by the physical tile and a unidirectional outbound channel for application messages being sent by the physical tile.

Pre-control n (point to point), for each physical tile n: Physical tile harness to the attached physical tile. Used for passing commands to shut down the tile and read its state, and also to write the state of the tile and start the tile.

Again referring to FIG. 11, the top level component types in the hypervisor system are listed below, in the format:

Name of component type
    Network x connected to this component, facing other components of type y (type of port by which the present component is connected to network x)
. . .
Physical tile harness n, n=0, 1, . . . , N−1:
(shown as $PH_0$ . . . $PH_{N-1}$ in FIG. 11)
    Lookup network facing owner units (master),
    Communication network facing other physical tile harnesses (master and slave),
    Control network facing owner units (slave),
    Pre-controlnetwork facing the attached physical tile (master),
    Inbound pre-communication (unidirectional master) and outbound pre-communication (unidirectional slave) networks facing the attached physical tile. These are point to point networks.
Owner unit m, m=0, 1, . . . , M−1
    Lookup network facing physical tile harnesses (slave)
    Replacement tile selection network facing the monitor (master)
    Allocation deallocation network facing the owners (one master, and one slave port to this network)
    Control network facing physical tile harnesses (master)
Monitor unit
    Replacement tile selection network, facing the owners (slave)
    Statistics network facing the physical tiles (unidirectional slave)
Physical tile n, n=0, 1, . . . , N−1: (shown as $P_0$ . . . $P_{N-1}$ in FIG. 11)
    Outbound pre-communication (unidirectional master) and inbound pre-communication (unidirectional slave) point-to-point networks facing the attached physical tile harness (these networks are a pair of sending and receiving channels)
    Pre-controlnetwork facing the physical tile harness (slave)
    Statistics network facing the monitor unit (unidirectional master)
Application placeholder tiles:
    These behave exactly like a physical tile except that they only need to perform message exchanges with a software application: They exchange messages with a specific software application on the host processor through a set of PCI Express I/O pins.

Of course, the flat design described above and in FIG. 11 is likely to exceed the area of a single chip, and must be partitioned into multiple chips. A cloud building block chip, which is capable of realizing any partition of the design (based on the values in its configuration memory) is obtained by applying chip unioning [Supercomputer] to the partitioned flat design, is given in FIG. 12. In this example the union chip contains up to 4 physical tiles, up to one owner, up to one PciE connection, up to one monitor, and n hypercube links for use in a hypervisor system with up to $2^n$ cloud building block chips.

A union chip, such as the cloud building block chip in FIG. 12, contains the maximum number of components of each type in each partition. For example, if the monitor unit (of which there is only one copy in the flat design of FIG. 11) is placed in partition 0 in a hypervisor system with multiple partitions, the monitor unit will be present in all copies of the union chip, but will be connected only when the union chip is configured (via its configuration memory) to realize partition 0. When the union chip is configured to realize any partition other than 0, the monitor unit is disconnected and turned off for reducing leakage power. Creating one single union chip where possible, can reduce mask expenses as well as chip testing expenses when releasing an ASIC implementation, although each individual partition will require less area than the union chip.

Let us summarize the design partitioning and chip unioning technique of
[Supercomputer], and show with an example how a collection of union chips work together to realize the function of a flat non-partitioned design of a cloud computing data center: Assume we are given, for the sake of an example, an original flat design of a small data center, with 14 physical tiles (including 2 application placeholder tiles with PciE connections), 3 owners, and one monitor. Since only a small number of components will fit in each chip, after design partitioning and chip unioning, assume that this flat design leads to 4 cloud building block chips 0, 1, 2, and 3, each with:

Up to 4 physical tiles per chip:
    The 14 physical tiles are distributed thus: 4 physical tiles each in chips 0, 1; and 3 physical tiles each in chips 2, 3;
Up to 1 owner per chip:
    The 3 owners are in chips 0, 1, 2, respectively;
Up to 1 monitor per chip:
    The only monitor is in chip 0;
Up to 1 PciE connection per chip
    The 2 PciE connections are in chips 0 and 2, respectively.

As an example of message routing using the cloud building block chips, here is how owner unit 2 in chip 2, sends a tile_request ("give me a physical tile to pre-empt") message over the replacement tile selection network, to the monitor unit in chip 0. Gray code versions of chip numbers 0, 1, 2, and 3 are used (0=Gray 00 1=Gray 01 2=Gray 11 3=Gray 10), since Gray codes are more convenient for the purpose of deterministic hypercube routing, A scalable hypercube network connects the cloud building block chips.

Owner unit in chip 2 (Gray code 11) sends a request message over the local replacement tile selection partial network, to the local I/O controller of chip 2; The request message is routed correctly, by virtue of the routing tables on each leg of the message's journey; The routing tables are part of the configuration parameters of each union chip;

In the I/O controller of chip 2 (Gray code 11), the tile request is sent to the next chip (chip 3, Gray code 10) on the deterministic greedy hypercube routing path leading to chip 0 (Gray code 00). The deterministic greedy hypercube routing path from 11 to 00 is 11→10→00, using Gray code numbering;

The I/O controller in chip 3 (with Gray code 10) receives the message, realizes the message is not yet at its destination chip 0, and then sends the message to the next chip on the routing path, which is the final destination chip 0 (Gray code 00);

The I/O controller in chip 0 (Gray code 00) receives the message, realizes the message has reached its final destination chip, and routes the tile_request message over the local replacement tile selection partial network to the monitor unit in chip 0.

The message has thus been successfully sent from owner unit 2 in chip 2, to the monitor unit in chip 0.

The net result is that the collection of the 4 cloud building block chips displays behavior identical to the original flat design with 14 physical tiles, 3 owners, 1 monitor and 2 PCI Express connections, as described above. More details of the design partitioning and chip unioning algorithms are described in [Supercomputer].

The "hypervisor storage" for keeping the saved state of virtual tiles is realized with off-chip DRAM units. For saving and restoring tile states, it suffices for each owner unit to access the local DRAM unit closest to the chip containing the owner unit. We have not included the DRAM DDRn controllers in the figures, for simplifying the figures, although each cloud building block chip will have at least one such controller. The DDRn controllers in each chip are connected to DRAM units packaged in, e.g., DIMMs (Dual Inline Memory Modules) on the board. The physical tiles implementing the virtual supercomputers may also share different regions of the same local DRAM resources on the board.

We have used many different networks for different functions in this design as a "separation of concerns" simplification, as in software design practice. Of course, the number of networks can be reduced by resource sharing, for example, by using (optimization 5, starting on p. 145 of [Supercomputer]) repeatedly, or by creating virtual networks each with their separate input and output FIFOs, where the virtual networks are implemented on a single common physical network or bus connecting the hardware components.

Message Formats within the Hypervisor System

In this section we will describe the message formats used in the hypervisor system. We will start with an example of a message:

Send Request (lookup network): Source=(requesting physical tile=me) Tag=(t1=new tag) Dest=(owner of v=z) Opcode=access_request Vtile=(virtual tile to look up=v)

The message format first indicates whether the message is being sent or received by the present hardware unit, and whether the message is a request or a response, and further identifies the network where the message is sent or received. The remaining part of the message is sequence of field specifications of the form: Field=(explanation=variable) when the value of the variable is used for creating the message field or for checking the value of the message against an expected value, or of the form Field= (variable=explanation) when the message field (which already has a value in this case) is assigned to the variable. "me" appearing in messages identifies the number of the current hardware unit sending or receiving the message. Variable names have local scope within their message exchange description, unless otherwise specified. The Field=(explanation) form is also used, in case no variables are needed. We will explain the message fields below:

Source=(requester unit)
  The number identifying the hardware unit on the specified network which sends requests and receives responses; i.e., the requesting unit number. Notice that in a pair of messages consisting of a request and a corresponding response, the Source field of the response message is the same as the Source field of the request message. I.e., the Source field always refers to the requester. Given that a response is sent from the responder to the requester, the Source field is the "destination" of the response message.

Tag=(outstanding request id tag)
  The unique tag to identify which outstanding request this is, when software pipelining is done so that there are multiple outstanding requests, and responses can come back out of order. A tag field is not required when there is only one outstanding request at a time or when responses always come back in order. Notice that in a pair of messages consisting of a request and a corresponding response, the Tag field of the response is always the same as it is in the request. "New tag" appearing in a Tag field that is part of a request message being sent, means a tag that is not currently being used by another outstanding request.

Dest=(Responder unit)
  The number of a responder unit on the network, which receives requests and sends responses. The Dest field is present only in request messages.

Opcode=operation code
  The constant representing the operation to be performed by the request or response message.

Param1=(first parameter)
Param2=(second parameter)
. . .
  Param1, Param2, . . . constitute the optional parameters of the message.

Note that ceil($\log_2$(number of possible values of the field)) bits are needed to encode a field in a message, within the context of the messages described in the present document. In particular, when there is only one possible value for a field, 0 bits are required to encode the field, and therefore such a field will not physically appear in the message. For example, the Opcode field in the single operation code case will not be physically present in the messages; in this case, the Opcode is provided only as a convenience for the reader.

Long messages will be broken up into a sequence of words with an end-of-data bit=0, ending with a word whose end-of-data bit=1, as in [Supercomputer]; this variable length encoding does not change the meaning of the message. The order of the fields within a message, and the particular binary values for representing constant fields, are not important, as long as a precise contract for the message format is followed throughout the design.

The Reconfigurable Physical Tile

The physical tile is a hardware component that can be reconfigured to implement one or more virtual tiles of one or more virtual supercomputers within the hypervisor system.

Referring to FIG. 11 (where physical tiles are labeled $P_0$, $P_1, \ldots, P_{N-1}$), each physical tile has the following ports:

- A master port of the outbound pre-communication network, facing the attached physical tile harness. This unidirectional master ports sends requests only, it does not receive responses.
- A slave port of the inbound pre-communication network, facing the attached physical tile harness. This unidirectional slave port receives requests (originally emanating from other physical tiles) only, it does not send responses.
- A (bidirectional) slave port of the pre-control network facing the attached physical tile harness.
- A master port of the statistics network facing the monitor. This unidirectional master port sends requests only, it does not receive responses.

The physical tile's internal operation is defined mainly by the virtual tile it is currently configured to implement. The hypervisor system does not need to understand the internal operation of the virtual tile currently being implemented, as long as the virtual tile complies with the requirements described in the paragraph above beginning with the words "The present hypervisor system will work with". In this section, we will specify the following key behavior of a physical tile relevant to the operation of the hypervisor system:

- An I/O interface for stopping, reading the state of, writing the state of, and restarting a physical tile, through the physical tile's control I/O pins, in order to make the physical tile implement any one of the virtual tiles it is able to implement; and
- A message format and message I/O interface, by which a virtual tile sends messages through the enclosing physical tile's outbound pre-communication I/O pins, and receives messages through the enclosing physical tile's inbound pre-communication I/O pins.

Slave Port of Pre-Control Network Facing the Attached Physical Tile Harness

The physical tile's slave port of the pre-control network facing the physical tile harness accepts the following requests and sends back the following responses:

Receive Request (pre-control): Opcode=shutdown_and_read_state

SendResponse (pre-control): Opcode=read_state_response Tilestate=(state data)

Upon receiving the shutdown_and_read_state request, the physical tile waits until the enclosed virtual tile reaches a state where the virtual tile is expecting inboundpre-communication input but the input queue is empty (e.g., for a virtual tile which frequently reads input messages, this can be achieved if the physical tile checks for the presence of the shutdown_and_read_state request only when its inbound pre-communication input FIFO is empty). Then, the physical tile waits further if needed, until a cycle is reached where there is no outgoing message being sent by the enclosed virtual tile, and then stops the enclosed virtual tile (e.g., by simply stopping the global clock of the virtual tile, or by making the entire virtual tile enter a special reconfiguration state through an agreed-upon handshaking protocol). Then, the entire state of the virtual tile contained within the physical tile (both the execution state such as registers and memories, and the configuration SRAM bits indicating the identity of the current virtual tile), is read (e.g., shifted out through one or more scan chains while the global clock is stopped, or received from the virtual tile now in the special reconfiguration state) and returned as the response to the shutdown_and_read_state request.

Receive Request (pre-control): Opcode=write_state Tilestate=(state data)

Send Response (pre-control): Opcode=acknowledge

The physical tile should be in the stopped condition when this request is received.

This request is processed by writing both the execution state (registers and memories) and configuration SRAMs indicating the identity of the virtual tile from the "state data" (e.g., by using one or more scan chains while the global clock is stopped, or by sending state data to the virtual tile now in the special reconfiguration state), and then, once the entire state has been written, starting the enclosed virtual tile (e.g., by starting its global clock, or making it exit the reconfiguration state). Then, the physical tile exits the stopped condition, and starts running, continuing the execution and message exchanges of the new virtual tile that was just restored.

At system reset time, each physical tile is in the stopped condition, except for application placeholder tiles (described in the section below entitled "Application placeholder physical tiles") which are running and are ready for any message exchanges with their respective software applications.

Pre-conditions of shutdown_and_read_state: When the shutdown_and_read_state request is received by a physical tile p currently running virtual tile v, all local first level cache entries (v→p) within physical tile harnesses in the hypervisor system, pointing to the present physical tile p, should be already invalidated, and any remaining incoming messages should have been received by the physical tile harness attached to the present physical tile. Notice that, as it will be seen in the owner unit section below, once a local cache entry (v→p) is invalidated, further messages to virtual tile v will be blocked until the owner unit of v completes the de-allocation of (v→p) and starts processing the waiting access_request commands for v, to reallocate v in possibly a new physical tile.

Post-conditions of shutdown_and_read_state: Notice that after processing a shutdown_and_read_state request: all pending incoming messages to virtual tile v on physical tile p are consumed (no incoming messages are left in the network); and further incoming messages to v are blocked in the owner of v. But the outgoing messages sent by the virtual tile v on physical tile p may remain undelivered to their destinations; these outgoing messages may sit in the network for an arbitrary time. These outgoing messages should be delivered to their destination virtual tiles, before the virtual tile v is reallocated to a different physical tile p'≠p, to prevent re-ordering of messages coming out from virtual tile v. Note that the networks of the preferred embodiment use deterministic routing and guarantee that the messages from one given input port to one given output port will not be reordered in the network; but there is no guarantee regarding the order of delivery of messages from different input ports. Hence, when a virtual tile is migrated to a new physical tile, a drain command is required, to ensure the delivery of the pending undelivered messages that emanated from the same virtual tile, while it was allocated to its prior physical tile.

We already provided above a method for shutting down a virtual tile v (currently on physical tile p) which frequently reads its input, by simply honoring shutdown requests only when the virtual tile's normal inbound pre-communication input FIFO is empty. For shutting down a virtual tile v (currently on physical tile p) which rarely reads its input, we propose another method:

An extra "input buffer FIFO" is introduced internally between the inbound pre-communication network and the actual input FIFO interface of the virtual tile. The shutdown_and_read_state request sent to p can again be honored when the inbound pre-communication input FIFO of p is empty. But in this case, pending unprocessed input messages may be sitting in the input buffer FIFO, at the instant the shutdown request is honored. The input buffer FIFO will be saved and restored as part of virtual tile v's state. The pending unprocessed messages in the "input buffer FIFO" will then be read before the regular inbound pre-communication network input FIFO, when the virtual tile is awakened/restarted after a new message arrives at it. In case no messages arrive to wake up a virtual tile with a non-empty "input buffer FIFO" for a long time, an artificial dummy message should be sent to this virtual tile to wake it up, to ensure that any unprocessed message waiting in the input buffer FIFO is eventually processed.

Master Port of Statistics Network Facing the Monitor

A physical tile's unidirectional master port of the statistics network facing the monitor, periodically issues the following requests:

Send Request (statistics): Opcode=status_update Ptile= (my physical tile) Status=(I am working|I am not working)

Each physical tile periodically sends status update requests to the monitor unit. The monitor unit collects these statistics from all physical tiles and makes decisions on the specific tiles to pre-empt.

See the monitor unit description, regarding a hardware-efficient token-ring implementation of the statistics network.

No response is needed; statistics is a unidirectional network.

Master Port of Outbound Pre-Communication Network Facing the Attached Physical Tile Harness;
Slave Port of Inbound Pre-Communication Network Facing the Attached Physical Tile Harness A physical tile's unidirectional master port of the outbound pre-communication network, and unidirectional slave port of the inbound pre-communication network, where both networks face the attached physical tile, accomplish the inter-virtual-tile communications within the application-specific virtual supercomputer. Both outgoing and incoming messages have the same message format:

Send Request (outbound pre-communication): Opcode=communicate Vdest=(virtual destination tile) Vsource=(virtual source tile) Payload=(application message payload)

Receive Request (inbound pre-communication): Opcode=communicate Vdest=(virtual destination tile) Vsource=(virtual source tile) Payload=(application message payload)

Each virtual tile implemented on a reconfigurable physical tile is made to believe (with the help of the hypervisor infrastructure) that it is communicating natively with other virtual tiles of the same virtual supercomputer, as if the supercomputer were implemented with native, non-virtual hardware. In reality virtual tiles are allocated to physical tiles on demand, and then possibly pre-empted (de-allocated from the physical tile), for example, after the virtual tile has remained idle for a sufficiently long time. The virtual destination tile within such a message is needed, for looking up the corresponding physical destination tile number. The virtual source tile within such a message is also needed, for keeping track of any undelivered messages emanating from this virtual source tile. Therefore, a pre-communication network message for inter-virtual-tile communication, should meet the following pre-communication message format requirement:

The virtual destination tile should be located in fixed agreed-upon bit positions of the message; and
The virtual source tile should be located in fixed agreed-upon bit positions of the message;

uniformly for all virtual supercomputers.

This completes the description of the reconfigurable physical tile.

Application Placeholder Physical Tiles

Assuming the local virtual tiles of a given virtual supercomputer performing the real hardware functions are numbered 0, 1, 2, ..., n−1, it is convenient to create a new local virtual tile of the same virtual supercomputer, numbered −1, whose only job is to relay messages to and from the software application, which this virtual supercomputer accelerates. This way, messages exchanged between the local virtual tiles and the software application do not need to be treated as a special case with respect to message routing. Given a hypervisor system implementing m (software application, virtual supercomputer) pairs, using m general purpose commodity host processors each running a software application that is accelerated by a virtual supercomputer, we can create m application placeholder virtual tiles, and permanently map them to fixed physical application placeholder tiles within the hypervisor, that will not be de-allocated. Each application placeholder physical tile will communicate point-to-point with a PCI Express external communication device that leads to the correct host processor running the corresponding software application. Thus, when a host application sends a message to a local virtual tile of its virtual supercomputer, this message enters the hypervisor system at the dedicated PCI Express connection and application placeholder physical tile tied to this host processor. A message sent by the software application will appear to be coming from local virtual tile −1. When a local virtual tile numbered 0, 1, . . . of the virtual supercomputer wishes to send a message to its software application, it will send the message to its application placeholder local virtual tile −1, which will in turn forward the message to the software application over the PCI Express connection.

Physical Tile Harness Unit

Referring to the schematic in FIG. 13, in this section we will describe the physical tile harness unit, including its internal finite state machines.

Internal memory state: The internal memories and registers of a physical tile harness are:

A local first level cache, called L1, which contains mappings ($v \rightarrow p$) where v is a virtual tile and p is a physical tile that currently implements the virtual tile. I.e., the cache L1 is addressed with a virtual tile v, and a physical tile $L1[v]$ is returned as the data. If the virtual tile v is not present in the L1, $L1[v]$ is defined to be NULL.

Rapid pre-emption activities and network contention can leave messages from virtual supercomputers of more than one application in the FIFO queues of a physical tile harness. Even messages whose source virtual tile has already been deallocated/preempted can exist in the system. Therefore, for simplifying the cache coherency design and reducing the race conditions, the local first level cache of a physical tile harness is designed to be addressed by the global virtual tiles of any of the virtual supercomputers in the hypervisor system (a global virtual tile v is a pair (application id, local virtual tile number within the virtual supercomputer), as already described in the paragraph above beginning with the words "As opposed to local virtual tile numbers"). The isolation of virtual supercomputers from each other is addressed separately in the optimizations section, in optimization 6.

A set-associative cache design with high associativity is suitable for this cache, although other implementations are also possible.

A set of virtual tiles, called lockedSource: A message's virtual source tile is in lockedSource if and only if that message (originally coming from a physical tile containing that virtual source tile over the outbound pre-communication network) has entered, but has not yet exited the "outbound communication request FSM" of the physical tile harness. In case this FSM is not software pipelined, so that the lockedSource set has at most one element, a simple register which contains the locked virtual tile when the set is full, and which contains NULL when the set is empty, is sufficient for implementing this set. Otherwise, any technique for implementing a set in hardware can be used.

A set of virtual tiles, called lockedDest: A virtual destination tile is in lockedDest if and only if a message (from the outbound pre-communication network) going to that virtual destination tile has entered, but has not yet exited the "outbound communication request FSM" of the physical tile harness. In case this FSM is not software pipelined, so that the set has at most one element, a simple register is sufficient for implementing this set. Otherwise, any technique for implementing a set in hardware can be used.

A map from virtual tiles to counters, called outstandingByDest: given a virtual destination tile v1, this map returns the number of current application communication messages that have been sent out from the present physical tile harness to that virtual destination tile v1, but have not yet arrived at the corresponding physical tile harness containing v0. Each time an application communication message with virtual destination tile v is sent out, outstandingByDest[v1] is incremented. Each time an acknowledgement confirming receipt of an application communication message with virtual destination tile destination v1 comes back, outstandingByDest[v1] is decremented. Zero-valued counter entries are not stored in the map (the absence of an entry in the map signifies the entry is zero). At the time a counter entry is decremented to zero, it is deleted from the map; hence the map is self-erasing.

A map from virtual tiles to counters, called outstandingBySource: given a virtual source tile v1, this map returns the number of current application communication messages that have been sent out from that virtual source tile v1, but have not yet arrived at the corresponding physical tile harness containing the destination virtual tile of the message. Each time an application communication message with virtual source tile v1 is sent, outstandingBySource[v1] is incremented. Each time an acknowledgement arrives, confirming receipt of an application communication message with virtual source tile v1, outstandingBySource[v] is decremented.

Since manipulating outstanding message counters is not on the critical path for sending messages between virtual tiles during normal hypervisor operation, these maps can be implemented as a multi-ported and/or bank-interleaved deeply pipelined cache using SRAMs. The cache should be capable of performing in-place increment and decrement operations. When both an increment and a decrement request for the same virtual tile arrive at the same cycle, the two requests can be optimized as a no-op. A cache entry should be invalidated when it is decremented to zero. When a message needs to be sent, but no free counter is available in the addressed counter cache set, the message waits until a counter within the set is decremented to zero and becomes free. When an addressed counter is about to exceed the maximum counter value (because there are too many outstanding messages), the outgoing message also waits until enough acknowledges come back from prior messages involving the same virtual tile.

As it will be described below, the control FSM and the outbound communication request FSM of the physical tile harness both share (i) the local virtual tile to physical tile cache called L1 (ii) the lockedDest and lockedSource sets of virtual tiles. The outbound communication request FSM, the outbound communication response FSM, as well as the control FSM share the outstandingByDest and outstandingBySource counter arrays. The accesses to these shared data structures must be made to appear atomic, which can be achieved by a multi-ported design and/or a network for arbitration.

The physical tile harness includes the following internal finite state machines (FSMs), which will each be described separately.

Outbound Communication Request FSM:

Outbound Communication Response FSM:

The outbound communication request FSM has the following FIFO interfaces

The sending FIFO interface of the master port of the communication network facing the other physical tile harnesses: this FIFO interface is used for sending application communication messages to another physical tile harness unit.

Notice that the outbound communication request FSM is connected to the sending FIFO of the master port of the communication network, and the outbound communication response FSM is connected to the receiving FIFO of the same master port. Thus, each FSM is responsible for One Half of the master port of the communication network (shown as ½ M in FIG. 13).

The receiving FIFO interface of the slave port of the outboundpre-communication network facing the attached physical tile. This unidirectional slave port receives requests only; it does not send back responses.

The bidirectional master port of the lookup network facing owner units (which consists of a sending FIFO interface for requests, and a receiving FIFO interface for responses): This master port is used for sending access_request commands for the looking up the physical destination tile corresponding to a virtual destination tile, which is not present in the local first level cache of the present physical tile harness. This network is also used for abandon requests notifying the owner unit of a virtual tile v, that a local first level cache L1 entry (v→p) is being deleted/abandoned by the present physical tile harness.

The outbound communication response FSM has the following FIFO interfaces
  Receiving FIFO interface of the master port to the communication network. This is used for receiving acknowledgement messages indicating that a message reached its destination physical tile harness.
The "Outbound communication request FSM" performs the following steps repeatedly, in an unending loop:
  The FSM waits for an input message to the receiving FIFO of the unidirectional slave port of the outbound pre-communication network facing the physical tile. The input message will be of the form:
    Receive Request (outbound pre-communication): Opcode=communicate Vdest=(v=virtual destination tile) Vsource=(v_src=virtual source tile) Payload=(m=the application message payload)
  The virtual source virtual tile v_src and virtual destination tile v are locked. The virtual destination tile v is also looked up in the local first level cache, L1, mapping virtual to physical tiles:
    Atomically do: p=L1[v]; add v to LockedDest; add v_src to LockedSource; Locking the virtual destination tile v prevents an incoming invalidate v request from executing. Locking the virtual source tile v_src tells the logic to drain messages, that there is at least one unsent message from v_src.
  If v is not present in the local cache (p==NULL),
    The number of the unique owner unit z responsible for the virtual destination tile v is computed with a hash algorithm. The message
      Send Request (lookup): Source=(requesting physical tile harness=me) Tag=(t1=new tag) Dest=(owner of v=z) Opcode=access_request Vtile=(virtual tile to look up=v)
    is sent to the owner unit z over the master port of the lookup network facing owner units.
    Then, the response:
      Receive Response (lookup): Source=(same source as in the request=me) Tag=(same tag as in the request=t1) Opcode=access_response Ptile=(p=the physical tile v is now mapped to)
    is received from the owner unit of v over the lookup network again from the same master port, where p is the physical destination tile for the virtual tile v. Notice that the owner unit may have just pre-empted and reconfigured the physical tile p if necessary, to make v become mapped to p. Or alternatively, v may already be mapped top in the owner unit of v.
    Finally, the mapping (v→p) is added to the local first level cache, L1, of the present physical tile harness. Atomically do: L1[v]=p
  At this point, if there was a cache miss in the local first level cache, it has already been processed. p, the physical tile where virtual tile v is located, is now known.
  Since the message to the virtual destination tile v will now definitely go out, outstandingByDest[v] is incremented. outstandingBySource[v_src] is also incremented, where v_src is the source virtual tile of the present outbound application communication message. The destination virtual tile v and source virtual tile v_src are then unlocked (v is removed from lockedDest and v_src is removed from lockedSource), indicating that the processing for the current message is complete. All these data structure accesses are done atomically. The message is sent out from the sending FIFO of the master port of the communication network facing other physical tile harnesses as:
    Send Request (communication): Source=(requesting physical tile harness=me) Dest=(physical destination tile harness=p) Opcode=communicate Vdest=(virtual destination tile=v) Vsource=(virtual source tile=v_src) Payload=(the application message payload=m)
  An arbitrary delay after sending the outbound communication message request, an acknowledgement is received through the receiving FIFO of the master port of the communication network, by the separate outbound communication response FSM:
    Receive Response (communication): Source=(requesting physical tile harness=me) Opcode=communication_acknowledge Vdest=(virtual destination tile=v) Vsource=(virtual source tile=v_src)
  Communication acknowledgements can come back out of order, which offers latitude in designing the communication acknowledgement sub-network. The message ordering requirements of the hypervisor are not violated, since such communication acknowledgements are not visible to the virtual supercomputers, and are used only for checking if the number of outgoing communication requests is equal to the number of incoming communication acknowledgements.
  The sole action of the separate outbound communication response FSM is to atomically decrement the outstandingBySource[v_src] and outstandingByDest[v] counters. The incoming acknowledgement message is discarded.
If a cache miss occurred while searching for v in the local first level cache, L1, and the selected cache set was almost full, an abandon transaction is attempted in order to make space in this cache set, as follows:
  The following test and entry selection is done atomically: if the addressed cache set is still almost full, an entry (v'→p') in the set (where v'≠v), such that there are zero undelivered messages to v' (outstandingByDest[v'] is zero) is selected, if there is such an entry.
  If the cache set is almost full and an entry (v'→p') could be chosen,
    The following request is sent to the owner unit of v':
      Send Request (lookup): Source=(requesting physical tile harness=me) Tag=(t2=new tag) Dest=(owner of v') Opcode=abandon Vtile=(virtual tile to abandon=v') Ptile=(the present physical tile v' is mapped to=p')
    If the mapping (v'→p') exists in the owner of v', and the current physical tile (passed in the Source field of the abandon request sent to the owner) is a sharer of the (v'→p') map entry in the owner of v', a (positive) acknowledgement is sent back from the owner to the present physical tile harness.
      Receive Response (lookup): Source=(same source as in the request=me) Tag=(same tag as in the request=t2) Opcode=acknowledge
    In this case, the abandon attempt is successful. (v'→p) is (atomically) removed from the local cache L1 within the present physical tile harness.
    Otherwise, a negative acknowledgement is sent back from the owner of v' to the present physical tile harness.

Receive Response (lookup): Source=(same source as in the request=me) Tag=(same tag as in the request=t2) Opcode=negative_acknowledge In this case, the abandon attempt is unsuccessful. Nothing is done in the physical tile harness. The abandon attempt has become a no-op, and no side-effects have occurred.

If no entry to abandon could be selected because of pending outgoing messages, or if the abandon attempt is not successful, the abandon attempt is retried, until the cache set is no longer almost full or until the abandon request gets a positive acknowledge. A wait time is imposed before each retry.

Notice that while an abandon request is in progress, concurrent invalidate requests can make the L1 cache set smaller automatically, and therefore the need to abandon an entry may go away by itself.

The transactional implementation of abandon described above is required because, depending on the network contention, there may be many additional transactions in the owner regarding v' (such as deallocating v' from p', allocating v' on a different physical tile p"), while the abandon message for (v'→p') is in transit from the present physical tile to the owner of v'

The "outbound communication request FSM", written in sequential code here, can be "software pipelined" (i.e., iterations n+1, n+2, . . . can be started before iteration n is finished) by correctly respecting dependences. For example, when there are two back to back access_request commands to the same virtual tile, but the first one misses in the local first level cache, the second request must wait for the first one to update the local first level cache. However, two back-to-back access_request commands to different virtual tiles can proceed in parallel/pipelined fashion. Messages from one given virtual tile to another given virtual tile should never be re-ordered, since not reordering messages between a pair of virtual tiles is a guarantee the hypervisor gives to all virtual supercomputers.

The "outbound communication response FSM" can also be software pipelined, so that a deeply pipelined implementation of the outstandingBySource and outstandingByDest data structures can be utilized.

Inbound Communication FSM:

This FSM has the following FIFO interfaces

The slave port of the communication network facing the other physical tile harnesses: This bidirectional port is used for receiving application messages internal to the virtual supercomputer, and sending back acknowledgement responses, for confirming that the message has reached its destination.

The sending FIFO interface of the master port to the inbound pre-communication network facing the attached physical tile. This unidirectional master port sends requests only, it does not receive responses.

The inbound communication FSM executes the following steps in an unending loop:

The FSM waits for an incoming message from the receiving FIFO of the slave port of the communication network facing other physical tile harnesses, of the form Receive Request (communication): Source=(p0=sending physical tile harness) Dest=(receiving physical tile harness=me) Opcode=communicate Vdest=(v=virtual destination tile) Vsource=(v_src=virtual source tile) Payload=(m=application message payload)

The physical tile routing information is deleted from the inbound communication message. This resulting message is then sent over the sending FIFO of the master port of the inboundpre-communication network, to the attached physical tile, as follows:

Send Request (inbound pre-communication): Opcode=communicate Vdest=(virtual destination tile=v) Vsource=(Virtual source tile=v_src) Payload=(application message payload=m)

Also, an acknowledgement response is sent back from the sending FIFO of the communication network slave port:

Send Response (communication): Source=(same source as in the request=p0) Opcode=communication_acknowledge Vdest=(virtual destination tile=v) Vsource=(virtual source tile=v_src)

The inbound communication FSM, specified as sequential code here, can be software-pipelined by correctly respecting dependences.

Control FSM

This FSM has the following ports:

The slave port of the control network facing owner units: An owner can use this port to send a shutdown_and_read_state request or a write_state request to the present physical tile harness; to invalidate a mapping (virtual tile→physical tile) in the local first level cache of the present physical tile harness (called L1); and also to drain messages emanating from a particular source virtual tile and also from the present physical tile harness.

The master port of the pre-control network facing the attached physical tile: this port relays shutdown_and_read_state and write_state messages coming from an owner unit to the present physical tile harness over the control network, to the attached physical tile.

The control FSM executes the following steps in an unending loop:

The FSM waits for an incoming request message from the slave port of the control network facing owners.

If the message is of the form

Receive Request (control): Source=(o0=requesting owner unit) Tag=(t0=tag) Dest=me Opcode=shutdown_and_read_state This request is passed on to the master port of the pre-control network facing the attached physical tile, as Send Request (pre-control): Opcode=shutdown_and_read_state The Source (sending owner unit number) and Tag fields, which identify an outstanding request are saved in variables o0 and t0 respectively. When the response (state data) is received from the receiving FIFO of the master port of the pre-control network facing the attached physical tile, which will be of the form:

Receive Response (pre-control): Opcode=read_state_response Tilestate=(st=state data)

this response is then forwarded to slave port of the control network facing owner units after adding response routing information fields, as:

Send Response (control): Source=(same source (sending owner) unit as in the request=o0) Tag=(same tag as in the request=t0) Opcode=read_state_response Tilestate=(state data=st)

The transfer of the tile state from the pre-control to the control network should be implemented in pipelined fashion for large states.

Else, if the message is of the form:

Receive Request (control): Source=(o0=requesting owner) Tag=(t0=tag) Dest=me Opcode=write_state Tilestate=(st=state data)

the message is passed on to the master port of the pre-control network facing the attached physical tile after deleting the routing fields, as Send Request (pre-control): Opcode=write_state Tilestate=(state data=st)

The transfer of the tile state from the control to the pre-control network should be implemented in pipelined fashion for large states.

The source of the request (requesting owner), and the outstanding request tag are saved locally in the variables o0 and t0. The response (acknowledgement) coming from the master port of the pre-control network facing the physical tile Receive Response (pre-control): Opcode=acknowledge is forwarded to the slave port of the control network facing the owner units, after adding physical tile routing information, as:

Send Response (control): Source=(same source as in the request=o0) Tag=(same tag as in the request=t0) Opcode=acknowledge Else, if the message is of the form Receive Request (control): Source=(o0=requesting owner) Tag=(t0=tag) Dest=me Opcode=invalidate Vtile=(v=the virtual tile to invalidate)

If v is locked as a virtual destination tile (i.e., v is a member of lockedDest, meaning that there is an ongoing access_request transaction which is about to place v in the local cache L1)

A negative acknowledgement response is sent back, and the invalidate transaction ends immediately:

Send Response (control): Source=(same source as in the request=o0) Tag=(same tag as in the request=t0) Opcode=negative_acknowledge The requesting owner will then retry the invalidate request at a later time.

Otherwise,

The entry for the requested virtual tile is atomically deleted from the local first level cache The FSM waits until all outstanding messages to v have been delivered (outstandingByDest[v] is zero)

The positive acknowledgement response is sent back to the requester over the slave port of the control network facing the owner units, as follows:

Send Response (control): Source=(same source owner as in the request=o0) Tag=(same tag as in the request=t0) Opcode=acknowledge Else, if the message is of the form Receive Request (control): Source=(o0=requesting owner) Tag=(t0=tag) Dest=me Opcode=drain Vtile= (v_src=virtual source tile to drain)

The control FSM waits until one of the following is true, using atomic accesses when accessing the data structures:

outstandingBySource[v_src] is zero (there are no more pending messages sourced from virtual tile v_src and from the present physical tile harness), and the receiving FIFO of the slave port of the outbound pre-communication network facing the attached physical tile is empty, and v_src is not locked as a virtual source tile (v_src is not in lockedSource), or a time limit is exceeded.

The purpose is to wait until all messages emanating from the virtual source tile v_src have been delivered, or until a probable deadlock is detected.

If the time limit is exceeded first, the drain has failed, and a negative acknowledgement is sent back:

Send Response (control): Source=(same source as in the request=o0) Tag=(same tag as in the request=t0) Opcode=negative_acknowledge Otherwise, the drain has succeeded, and a positive acknowledgement is sent back:

Send Response (control): Source=(same source as in the request=o0) Tag=(same tag as in the request=t0) Opcode=acknowledge There are no other kinds of control requests.

The control FSM will not be software pipelined within the physical tile harness, since physical tile configuration operations cannot be easily software pipelined. But an owner unit can overlap control network requests to different physical tile harnesses when dependences permit.

Owner Unit

Referring to the schematic in FIG. 14, in this section, we will describe the owner unit, including its internal FSMs. The set of all virtual tiles is partitioned to almost equal-sized parts, using a simple hash algorithm; and each partition is assigned to a separate owner unit, which takes responsibility for managing the virtual tiles in its own partition.

Internal memory state:

ptile: An owner unit is responsible for maintaining a map ptile from each virtual tile it owns to a physical tile, in case this pair is currently mapped to a physical tile, or to NULL, in case this virtual tile is not currently mapped.

sharers: For each virtual tile v that is mapped to a physical tile p, the owner unit also keeps the set of physical tile harnesses p' ($\neq$p) that have locally cached the (v$\rightarrow$p) mapping. This set of physical tile harnesses is called the sharers of v. Maintaining this set is necessary for identifying the local first level cache entries within physical tile harnesses that should be invalidated, when a physical tile is pre-empted; i.e., when it stops running one virtual tile, and starts running another virtual tile. Each set in the sharers map can be represented as a bit string. One of the known directory entry compression techniques can be used, when the number of physical tiles is so large that a bit string representation is impractical.

priorPtile: In addition, each owner maintains a map from each virtual tile to the previous physical tile this virtual tile was allocated to, if any. Initially this map priorPtile is empty (all entries are NULL). Each time a virtual tile v is de-allocated, its last physical tile is written into priorPtile[v].

A multi-level cache hierarchy (whose lowest level is in local off-chip DRAM near the present owner unit), addressed by a virtual tile, is appropriate for the combined implementation of ptile, sharers and priorPtile. These data structures are shared by both the lookup FSM and the allocation/deallocation FSM within the owner unit. The accesses to these data structures must be made to appear atomic, which can be achieved by a multi-ported design, and/or a 2 to 1 network for arbitration.

tileState: In addition, each owner has a map from virtual tiles to tile states called tileState. The state of a virtual tile is saved in this map. "Hypervisor storage," mentioned earlier in this document, is implemented as the tileState maps of each owner. Assuming that the states of virtual tiles are large, it is best to implement both the tags and the data part of the tileState map in off-chip DRAM near the present owner unit, without using any on-chip caches. The tileState data structure is accessed only by the allocation/deallocation FSM of the owner unit, hence atomic access to tileState within the owner unit is not required.

The owner unit has the following internal FSMs:

The Lookup FSM

The lookup FSM has the following ports

A slave port of the lookup network facing the physical tile harnesses: This port is used for receiving an access_request, to look up the physical tile corresponding to a given virtual tile, and to respond to the requester with this physical tile. This port is also used for receiving an abandon request indicating that a particular physical tile harness wishes to stop sharing a (v→p) mapping in its local cache, where virtual tile v is among the responsibilities of the present owner.

A master port of the replacement tile selection network facing the monitor: This master port is used to send a tile_request to the monitor, which will respond with a physical tile to pre-empt, using the pre-decided tile replacement algorithm. It is also used to send a tile_unlock request for a physical tile to the monitor unit, informing the monitor unit that the deallocation/allocation activities on that physical tile are complete.

A master port of the allocation deallocation network facing owners, in particular the local allocation deallocation FSM of the present owner. This master port is used to allocate a virtual tile to a physical tile or to deallocate a virtual tile from a physical tile. A request to drain the communication network of the remaining pending messages emanating from a given virtual tile is also sent across this network.

The lookup FSM executes the following steps in an unending loop:

The lookup FSM waits for a request from the slave port of the lookup network facing physical tile harnesses.

Access Request

If the incoming message is an access request of the form:
Receive Request (lookup): Source=(p0=requesting physical tile harness) Tag=(t0=tag) Dest=me Opcode=access_request Vtile=(v=virtual tile)
Atomically do: read p=ptile[v]; if(p!=NULL) add p0 to sharers[v]; p'=priorPtile[v].
If the virtual tile v whose physical tile is requested, is not mapped to a physical tile in the present owner (p==NULL),
If there was a prior physical tile p' that v was mapped to (p'!=NULL)
Attempt to ensure that all messages from v at the time when v was on p', reach their destination, by sending a drain request to my own allocation/deallocation FSM:
Send Request (allocation deallocation): Source=(requesting owner=me) Tag=(t1=new tag) Dest=me Opcode=drain Vtile=(virtual tile=v) Ptile=(last physical tile of v=p')
where the drain operation will: either succeed and return a positive acknowledgement to the present owner Receive Response (allocation deallocation): Source=(same source as the request=me) Tag= (same tag as the request=t1) Opcode=acknowledge or, the drain operation will fail (e.g., due to a deadlock in high contention conditions) and will return a negative acknowledgement after a timeout.

Receive Response (allocation deallocation): Source=(same source as the request=me) Tag= (same tag as the request=t1) Opcode=negative_acknowledge If there is a prior physical tile p' that v was allocated to (p'!=NULL), and the attempt to drain the messages from v on p' failed:
The required physical tile parameter (Required_ptile) p" to be sent to the monitor unit, is set to p'; doing so forces the physical tile returned by the monitor to be identical to the old physical tile p'
otherwise
The required physical tile parameter (Required_ptile) p" is set to NULL, so that the monitor unit is free to return an arbitrary new physical tile.

The lookup FSM then sends the request
Send Request (replacement tile selection): Source= (requesting owner=me) Tag=(t2=new tag) Dest=Monitor Opcode=tile_request Vtile=(virtual tile=v) Required_ptile=p",
to the monitor unit over the master port of the replacement tile selection network, and then receives a response of the form
Receive Response (replacement tile selection): Source=(same source as in the request=me) Tag= (same tag as in the request=t2) Opcode=tile_response Vtile=(v'=Previous virtual tile allocated to p) Ptile=(p=Physical tile to preempt)
from the same master port of the replacement tile selection network. The monitor can also respond with a negative_acknowledge to a tile_request when all eligible physical tiles are locked (i.e., are currently being reconfigured). In this case the tile_request is resent by the present owner after a delay time, until a valid physical tile is received.

Here, v' is the virtual tile that is currently mapped to the selected physical tile p, which will be pre-empted. The monitor maintains an accurate map from each physical tile to the virtual tile it contains, if any. If nothing is currently mapped to the physical tile p, v'=NULL is returned by the monitor.

If v' is not NULL (there is an occupant virtual tile v' on p)
The lookup FSM sends a
Send Request (allocation deallocation): Source= (requesting owner=me) Tag=(t3=new tag) Dest=(o3=owner of v') Opcode=deallocate Vtile=(virtual tile to deallocate=v') Ptile= (physical tile v' is presently mapped to=p)
to the owner o3 of v' (determined by computing a hash function of v'), over the master port of the allocation/deallocation network. Note that the owner of v' may be different from the present owner, or it could be the same as the present owner.

The lookup FSM waits for an acknowledgement response from o3, from the same master port.

Receive Response (allocation deallocation):
Source=(same source as in the request=me)
Tag=(same tag as in the request=t3)
Opcode=acknowledge At this point p is an empty physical tile. The lookup FSM sends a Send Request (allocation deallocation): Source=(requesting owner=me) Tag=(t4=new tag) Dest=me Opcode=allocate Vtile=(virtual tile=v) Ptile=(physical tile=p) Sharer=(sharer physical tile=p0)

to its own allocation/deallocation FSM, over the master port of the allocation/deallocation network (the request asks that v be allocated to p, and that p0 be made a sharer of the (v→p) mapping)

The lookup FSM waits for an acknowledgement response from the same master port

Receive Response (allocation deallocation): Source=(same source as in the request=me) Tag=(same tag as in the request=t4) Opcode=acknowledge At this point, the requested mapping v→p is already in the map of this present owner unit, and p is known, and the requester physical tile p0 has already been added to the sharers list for v.

Then, the lookup FSM returns the physical tile p as the response to the requesting physical tile harness p0, over the slave port of the lookup network:

Send Response (lookup): Source=(same source as in the request=p0) Tag=(same tag as in the request=t0) Opcode=access_response Ptile=(physical tile=p)

Finally the physical tile p being pre-empted is unlocked in the monitor, to signal that deallocation/allocation activities on p are complete, by sending the following request and receiving its acknowledgement:

Send Request (replacement tile selection): Source=(requesting owner=me) Tag=(t5=new tag) Dest=Monitor Opcode=unlock tile Ptile=(physical tile=p)

Receive Response (replacement tile selection): Source=(same source as in the request=me) Tag=(same tag as in the request=t5) Opcode=acknowledge Abandon Request If the request is an abandon request of the form:

Receive Request (lookup): Source=(p0=source physical tile harness) Tag=(t0=tag) Opcode=abandon Vtile=(v=virtual tile) Ptile=(p=physical tile)

Atomically do:

If v is mapped to p (ptile[v]=p), and p0 is a sharer of this mapping (p0 is among sharers[v]):

Remove the physical tile p0 from the sharer list of virtual tile v (sharers[v])

Else

Do nothing

If the sharer p0 was removed

Send back the response:

Send Response (lookup): Source=(same source as in the request=p0) Tag=(same tag as in the request=t0) Opcode=acknowledge Else Send back a negative acknowledgement response Send Response (lookup): Source=(same source as in the request=p0) Tag=(same tag as in the request=t0) Opcode=negative_acknowledge The lookup FSM can be software-pipelined subject to normal sequential execution constraints. For example, if a first access_request to a virtual tile results in a miss in the ptile map, a second access_request to the same virtual tile must wait until the first request is processed and the ptile data structure is updated. However, a second request to a different virtual tile can proceed independently of the first request.

Allocation/Deallocation FSM

The allocation/deallocation FSM has the following ports:

A master port of the control network facing physical tile harnesses: This port is used to send shutdown_and_read_state and write_state requests to a physical tile harness, invalidate a local first level cache entry within a physical tile harness, and also drain the pending messages emanating from a particular virtual tile and particular physical tile.

A slave port of the allocation deallocation network facing owner units (including the present owner unit). Requests to allocate a virtual tile to a physical tile, or to deallocate a virtual tile from a physical tile, or to drain the pending messages emanating from a particular virtual tile, where the virtual tile is owned by the present owner unit, are serviced at this port.

The allocation deallocation FSM shares the ptile, priorPtile and the sharers data structures with the lookup FSM. The accesses to these data structures should be atomic.

The allocation/deallocation FSM performs the following steps in an unending loop Deallocate Request If there is a deallocate request of the form:

Receive Request (allocation deallocation): Source=(o0=requesting owner) Tag=(t0=tag) Dest=me Opcode=deallocate Vtile=(v'=virtual tile to deallocate) Ptile=(p=physical tile v' is now allocated to)

Atomically do: A mapping (v' →p) should be present in the present owner unit (i.e., ptile[v']=p). Save the sharers list of v', s=sharers[v']. Remember the old mapping of v', by setting priorPtile[v']=ptile[v']. Delete the map entries ptile[v'] and sharers[v'].

For each p' in the saved sharers list s of the mapping (v'→p),

Send an invalidate v' request to physical tile harness p' over the master port of the control network and receive an acknowledgement over the same master port.

Send Request (control): Source=(requesting owner=me) Tag=(t1=new tag) Dest=(physical tile harness=p') Opcode=invalidate Vtile=(virtual tile to invalidate=v')

Response (control): Source=(same source as in the request=me) Tag=(same tag as in the request=t1) Opcode=(w=invalidate response)

Retry the invalidate request while the response w is a negative_acknowledge (i.e., there is an ongoing access request for v' in p'), until a (positive) acknowledge response comes back The iterations of this last for loop for the invalidate requests can be executed in parallel; the invalidation requests sent to multiple sharers can be overlapped.

Send the physical tile harness p a shutdown_and_read_state request over the master port of the control network facing the physical tile harnesses Send Request (control): Source=(requesting owner=me) Tag=(t2=new tag) Dest=(physical tile harness=p) Opcode=shutdown_and_read_state Receive the tile state data as the response.

Receive Response (control): Source=(same source as in the request=me) Tag=(same tag as in the request=t2) Opcode=read_state_response Tilestate=(st=state data)

Then, write the tile state data into this owner's local tileState map
tileState[v]=st
The receiving and writing of the tile state data should be pipelined, for large states.
Finally, as the response to the deallocate request, send an acknowledgement
Send Response (allocation deallocation): Source=(same source as in the request=o0), Tag=(same tag as in the request=t0) Opcode=acknowledge back to the requesting owner unit, over the slave port of the allocation/deallocation network.

Allocate Request
Otherwise, if there is an allocate request of the form:
Receive Request (allocation deallocation): Source=(o0=requesting owner) Tag=(t0=tag) Dest=me Opcode=allocate Vtile=(v=virtual tile) Ptile=(p=physical tile) Sharer=(p0=sharer physical tile)
Atomically do:
//ptile[v] must be NULL
set ptile[v]=p; sharers[v]{p0}
Read the state data for the virtual tile from the local storage of this owner
st=tileState[v]
Write the new state of physical tile p, by sending
Send Request (control): Source=(requesting owner=me) Tag=(t1=new tag) Dest=(physical tile to reconfigure=p) Opcode=write_state Tilestate=(state data=st)
to the physical tile harness p over the master port of the control network. The reading and sending of the tile state should be pipelined for large states.
Wait for the acknowledgement response for the write_state message
Receive Response (control): Source=(same source as in the request=me) Tag=(same tag as in the request=t1) Opcode=acknowledge
After this response is received, the virtual tile v must be running on p.
Send back the response
Send Response (allocate-deallocate): Source=(same source as in the request=o0) Tag=(same tag as in the request=t0) Opcode=acknowledge over the slave port of the allocate/deallocate network.

Drain Request
If there is a drain request of the form:
Receive Request (allocation deallocation): Source=(o0=requesting owner) Tag=(t0=tag) Dest=me Opcode=drain Vtile=(v_src=virtual source tile) Ptile=(p=physical tile)
Send a
Send Request (control): Source=(requesting owner=me) Tag=(t1=new tag) Dest=(physical tile to drain=p) Opcode=drain Vtile=(virtual source tile=v_src)
message to the physical tile harnessp over the master port of the control network
Wait for the response for the drain message
Receive Response (control): Source=(same source as in the request=me) Tag=(same tag as in the request=t1) Opcode=(w=response opcode)
where the response opcode w is either acknowledge or negative_acknowledge
Send back the response
Send Response (allocate-deallocate): Source=(same source as in the request=o0) Tag=(same tag as in the request=t0) Opcode=w over the slave port of the allocate/deallocate network.

The allocation/deallocation FSM can be software pipelined, subject to sequential dependencies.

Monitor Unit

Referring to the schematic in FIG. 15, in this section, we will describe the internal organization of the monitor unit, including its internal FSM.

The monitor unit is used to detect the activity within each of the physical tiles, analyze the activity and suggest the best physical tile to pre-empt to owners who request a new physical tile to pre-empt. Each physical tile periodically sends its state to the monitor unit. In a system with N physical tiles, this can be done by an ordinary N to 1 incomplete butterfly sub-network as described in [Supercomputer], which can also cross chips in the usual way. But creating a customized pipelined token-ring network to achieve the N to 1 unidirectional communication requires less hardware. The customized pipelined token ring network can be implemented by a ID torus (or ring) network which also passes through the monitor unit. Immediately after system reset time, for each physical tile p in the system, a packet that shall be owned and updated by p is injected into the ring, initially indicating that this tile p is nor working (i.e., idle). Normally, each physical tile forwards each incoming packet to the next node in the ring. However, when the physical tile's own packet (a packet whose id field is equal to the present physical tile) is passing by, the packet is updated with the present physical tile's current status, before being forwarded to the next node in the ring. The monitor is located between the last physical tile and the first physical tile in the ring. The monitor unit gets a packet from the last physical tile, updates its data structures as the packet from each physical tile passes by, and forwards the packet to the first physical tile. When asked for a tile to pre-empt, the monitor unit analyzes the data from all the physical tiles and returns the best tile to pre-empt, according to its replacement algorithm.

A simple scalable implementation of the Least Recently Used policy: We begin with a scalable baseline algorithm for true LRU replacement of tiles. Let us call the time from the point where a physical tile's own packet passes the physical tile and the point where its own packet passes the physical tile again, a time interval of the physical tile. Assuming that each time interval where the physical tile was active at least for one cycle, is considered a "reference" to the physical tile (as if in a reference to a data page in a virtual memory system), the least recently used algorithm can be simply implemented by mimicking the following software algorithm for LRU insertion in a doubly-linked list, as shown in the code below. Two sentinel list elements called "back" and "front" are placed at the back and front of a doubly linked list. A "reference" to a physical tile i consists of a deletion of node i from its current location (loads fromflink[i] and blink[i], and stores intoflink[blink[i]] and blink[flink[i]]) and a re-insertion of physical tile i just before front sentinel element (stores into flink[blink[front]], where blink[front] is cached in a register, and intoflink[i] and blink[i]). The number of loads/stores is as follows: 1 load from the flink array, 1 load from blink array, 2 stores into the blink array, and 3 stores into the flink array. The 2 loads can be done in parallel in step 1, and then the 5 stores can be done in parallel in step 2, if memory port resources permit. Depending on the number of ports in the available memory arrays and the total number of tiles, the entire "reference" operation will require only a few cycles. The number of ports of the memory arrays can be increased in known ways, e.g., by bank-interleaving and/or by using multi-ported arrays.

```
//A doubly-linked list
//specification of
//the Least Recently Used replacement policy
typedef Int12 TileIndex;
//up to (2**12)-2 tiles in this example
class LRU {
public:
    static const TileIndex front=N, back=N+1;
    TileIndex blink[N+2];//backward link
    TileIndex flink[N+2];//forward link
    LRU( ) { //initialization
        TileIndex prev=back;
        for(TileIndex i=0;i<=front; ++i) {
            blink[i]=prev;
            flink[prev]=i;
            prev=i;
        }
        //blink[back], flink[front] not used
    }
    void reference(const TileIndex i) {
        //place the referenced tile i in MRU position
        //delete i from its current place
        flink[blink[i]]=flink[i];
        blink[flink[i]]=blink[i];
        //add it just before the front element
        //blink[front] can be cached in a register
        flink[blink[front]]=i;
        flink[i]=front;
        blink[i]=blink[front];
        blink[front]=i;
    }
}
```

The Internal Data Structures

The internal data structures of the monitor unit are as follows flink and blink arrays for implementing the LRU doubly linked list, as described above.

vtile: an array mapping each physical tile to the virtual tile it contains, or to NULL, in case this physical tile does not contain any virtual tile working: an array mapping each physical tile to a Boolean value indicating that the physical tile was still working (was not idle) in the last time interval. The working attribute of a physical tile is updated with an incoming message from the statistics network, only when the physical tile is not locked.

isfree: an array mapping each physical tile to Boolean value, where isfree[p] is true if and only if p is currently not locked (i.e. not currently being configured).

At initialization time: the LRU doubly linked list is initialized to a default order, e.g., the sequential order of the physical tiles as shown above. For all physical tiles p, vtile[p] is set to NULL and working[p] is set to false, and isfree[p] is set to true. But, for pinned physical tiles p representing the application placeholder tiles, vtile[p] is set to virtual tile −1 of the respective application and working[p] is true, and isfree[p] is set to false (so that p will never be pre-empted).

The Monitor FSM

The monitor FSM has the following ports:

A slave port to the tile replacement network facing owner units.

A slave port of the statistics network described above facing the physical tiles. This unidirectional slave port only accepts requests; it does not send back responses.

The monitor FSM repeatedly performs the following in an unending loop:

```
If there is a tile_request in the slave port of the replacement tile selection
network, of the form:
    Receive Request (replacement tile selection):
    Source=(o0=requesting owner) Tag=(t0=tag) Dest=me
    Opcode=tile_request Vtile=(v=virtual tile the owner is trying to
    map) Required_ptile=(p'-required physical tile)
    If the required physical tile p' is not NULL
        Set eligible={p'} //The monitor must respond with p'.
    Else
        Set eligible= the set of all physical tiles except placeholder tiles
    Starting from the LRU element (flink[back]), follow the linked list in the
    forward link direction until a physical tile p that satisfies (isfree[p] and
    eligible[p]) if any, is found.
        Optionally apply additional heuristics to choose p among multiple
        free and eligible candidates
    If no such tile p could be found (all eligible physical tiles are locked),
        Send back the response
            Send Response (replacement tile selection): Source=(same
            source as in the request=o0) Tag=(same tag as in the
            request=t0) Opcode=negative_acknowledge
    Else // p is the physical tile satisfying the desired properties
        Using the physical tile p that was found, send back the response
            Send Response (replacement tile selection): Source=(same
            source as in the request=o0) Tag=(same tag as in the
            request=t0) Opcode=tile_response Vtile=(previous virtual
            tile mapped to p=vtile[p]) Ptile=(physical tile to return to
            owner=p)
        Set vtile[p]=v to remember the new virtual tile v now on p. Set
        working[p]=true. Set isfree[p]=false (lock the tile)
        Simulate a reference to p so it moves to the front (Most Recently
        Used) position of the LRU list
Else if there is a request in the slave port of the replacement tile selection network:
    Receive Request (replacement tile selection):
    Source=(o0=requestingowner) Tag=(t0=tag) Dest=me
    Opcode=tile_unlock Ptile=(p=physical tile to unlock)
```

```
Set isfree[p]=true (unlock tile p)
Send back the acknowledgement response
    Send Response (replacement tile selection): Source=(same source
    as in the request=o0) Tag=(same tag as in the request=t0)
    Opcode=acknowledge
Else if there is a request in the slave port of the statistics network:
    Receive Request (statistics network): Dest=me
    Opcode=status_update Ptile=(p=sending physical tile)
    Working=(b=Boolean value)
If the physical tile p is not locked (isfree[p] is true)
    Set working[p]=b
    If b is true (the physical tile was not idle in its time interval),
    update the LRU data structure (flink, blink) with a reference to p.
A response is not required for the statistics request.
Else
    Do nothing in this loop iteration
```

The monitor should answer requests sufficiently faster than the average tile replacement rate in the entire hypervisor system. Otherwise, the monitor will become a bottleneck in the hypervisor system. The optimization described in the section below entitled "4. Alternative physical tile replacement algorithms for the monitor unit" describes ways to accomplish this scalability requirement.

Solutions to Race Conditions

In this section, we will summarize five important potential race condition errors within a highly parallel implementation of a hypervisor, and show how these errors are eliminated by the present design. These race conditions will also help explain the design choices made in the present preferred embodiment.

Access Request Followed by Invalidate Causes Invalidate to be Lost

Desired logical sequence of events:
  Initially, physical tile p1's local cache does not contain virtual tile v
  Initially, virtual tile v is mapped to physical tile p in the owner o1 of v; physical tile p1 is not a sharer of this mapping.
  Physical tile p1 sends an access_request for v, to o1, and gets p back. p1 is established as a sharer of the (v→p) mapping within o1 The entry (v→p) is added to the local cache of p1.
  o1 then sends "invalidate v" to p1, causing the local cache entry (v→p) to be deleted in p1.
An actual sequence of events with a race condition error is shown below
  p1 sends "access_request v" to o1
  o1 receives "access_request v" from p1
  o1 sends "access_response p" t op1
  o1 sends "invalidate v" request t op1 (o1 is de-allocating v from p)
  p1 receives "invalidate v" request from o1 (incorrect, v is not present in the local cache of p1). Notice that the networks may have different latencies, causing the "access_responsep" message to be delayed.
  p1 receives "access_response p" from o1, and places (v→p) in its local cache (incorrect, v should not be in p1's local cache at the end)
Solution: the "invalidate v" request from o1 to p1 will find v locked in p1 (by virtue of the lockedDest data structure of a physical tile harness which is checked by invalidation requests). o1 will get a negative acknowledgement for the invalidation request. The failing invalidation request will then be retried by o1.

Superfluous Abandon

Since the local cache is not instantly updated after changes to the owner data structures because of network delays, an abandon request for (v→p) can potentially be sent out by p1 and can then spend a lot of time in the network, even though the (v→p) mapping has already been deleted at the owner of v, p1 has been removed as a sharer of this mapping, and further changes have been done for v at the owner, during the transit time of the abandon message. Here an sequence of events showing the incorrect race condition:
  Initially: (v→p) is present in p1's local cache
  Initially: o1 is v's owner and has a (v→p) mapping
  p1 sends "abandon v" to o1,
  o1 sends "invalidate v" t op1; o1 deallocates v in p, v is deleted from o1's map, p1 ceases to be a sharer of v.
  o1 allocates v in p', (v→p') is added to o1's map
  o1 receives "abandon v" (incorrect, "abandon v" from p1 is now a stale request)
Solution: abandon is made transactional; it is either committed or aborted. If o1 does not still have v mapped top or p1 is not a sharer of the (v→p) mapping, abandon v will get a negative acknowledgement and the abandon request will become a no-op. Another abandon (possibly to a different virtual tile) can be retried by p1, if needed for making space in the local cache of p1.

Incoming Message Destined to Virtual Tile v Arrives Late, after v has been Deallocated Obviously, we do not want a message going to virtual tile v to arrive at a physical tile p, after the destination virtual tile v has been deallocated from p. This is solved by ensuring, with extra quiescence detection hardware (outstandingByDest outstanding message counter array and an additional reverse subnetwork where acknowledgements flow in the reverse direction of the regular communication messages), that all pending messages going to v at p have arrived at v at p, before v gets deallocated from p.

Incorrect Message Reordering Due to Migrating a Virtual Tile

Here is a sequence of events demonstrating an incorrect message reordering
  Initially virtual tile v is on physical tile p1, virtual tile v2 is on physical tile p2
  v1 on p1 sends message number 1 to v2 on p2
  Message 1 gets delayed in the network
  v1 gets deallocated from p1
  v gets allocated to p3
  v on p3 sends message number 2 to v2 on p2
  Message 2 arrives at v2 before message 1 (incorrect, since messages from v0 to v2 have been reordered)

Solution: With extra quiescence detection hardware (outstandingBySource counters, acknowledgement paths in communication network), messages from v on p1 are drained from the network, i.e., messages are made to reach their destination before v0 is reallocated on a different physical tile. In case draining the messages from v on p1 is not possible (because for example, of a circular wait/deadlock condition), v is again allocated to its old physical tile p1 without draining its old pending messages, in which case message reordering will not occur.

A circular wait/deadlock condition can occur when attempting to drain messages, for example, when an access request no. 2 for a message from v1, is waiting in the same owner's input FIFO for an access request no. 1 for a message to v1, where v is currently not allocated in any physical tile. We have chosen the present simple way to solve this deadlock problem (reallocate v1 in its old physical tile if unable to drain its pending outgoing messages). Reordering the access requests in the owner access request queue may be another way to avoid this kind of deadlock.

Physical tile gets preempted for a second time while a logically earlier preemption is in progress Here is a sequence of events demonstrating a preemption race condition:

Owner unit o1 asks monitor for a tile to preempt, to place virtual tile v1.

Monitor returns empty physical tile p1 to o1

Owner unit o2 asks monitor for a physical tile to preempt, to place virtual tile v2, Monitor returns physical tile p1 (now presumed by the monitor to contain v1) again to o2 o2 attempts to allocate v2 on p1, by first asking o1 to deallocate v1 from p1 (incorrect; o1 has not yet allocated v1 on p1)

Solution: at the time the physical tile p1 is returned by the monitor to o1, the physical tile p1 becomes locked. It will be unlocked only when o1 has finished all reconfiguration activities and sends a "tile_unlock" request for this physical tile p1 to the monitor. When all eligible tiles are locked, the monitor returns a negative acknowledge to tile requests, so the request will be retried.

Without locking, repeated choice of the same physical tile by the monitor is quite possible, for example, when the eligible physical tiles satisfying a tile request are few in number.

Optimizations

Apart from the baseline hypervisor described above, various optimizations of a hypervisor are possible. We list these optimizations and additional features below.

1. Obtaining a Virtual Supercomputer Automatically from a Single-Threaded Software Application This optimization is facilitated because a method to obtain a non-virtual (real) supercomputer from a single-threaded software application is already described in the co-pending, co-owned US patent application [Supercomputer], which has already been incorporated by reference herein, around the paragraph above beginning with the words "At this point we incorporate by reference". Here, we will provide the enhancements to [Supercomputer] in order to:

Create a virtual supercomputer instead of a real one from a single-threaded software application, and Run the resulting (software application, virtual supercomputer) pair within the present hypervisor system environment.

Much of the technology described in [Supercomputer] can be used verbatim in the present hypervisor system, once a one-to-one correspondence between the concepts of [Supercomputer] and the concepts of the present hypervisor system is established. Here is the required one-to-one correspondence:

The single-threaded software application/program mentioned in [Supercomputer], from which a (non-virtual) supercomputer is obtained, corresponds to:

The software application part of a (software application, virtual supercomputer) pair in the present hypervisor system;

The (non-virtual) supercomputer obtained from a program fragment of a software application in [Supercomputer], corresponds to:

The virtual supercomputer within a (software application, virtual supercomputer) pair within the present hypervisor system;

Each partition of the (non-virtual) supercomputer in [Supercomputer], obtained by final design partitioning, corresponds to:

a virtual tile of a virtual supercomputer within a (software application, virtual supercomputer) pair in the present hypervisor system;

A union chip capable of realizing each partition of the (non-virtual) supercomputer in [Supercomputer], corresponds to:

a physical tile, capable of realizing any of the virtual tiles of the virtual supercomputer within a (software application, virtual supercomputer) pair in the present hypervisor system.

The union chip hardware produced by the method of [Supercomputer] is adapted with slight modifications for use as a physical tile of the present hypervisor system, as follows:

For construction of a physical tile, the chip unioning technique described in paragraphs [00169]-[00190] and Appendix K of [Supercomputer], is used. The union chips of [Supercomputer] are configured once during system initialization time, by initializing the configuration memory in each chip. The configuration memory identifies the particular partition which will be realized by the union chip. But in the hypervisor system, each physical tile (union chip of [Supercomputer]) will be reconfigured multiple times, on demand. Therefore, not only the configuration memory but also the normal (execution state) memory and registers of the physical tile need to be read out and written. Assuming the simple method of stopping the clock is used to stop a virtual tile, reconfiguring a physical tile will consist of writing the configuration memory as well as the normal execution memory and registers, through one or more scan chains. Circuitry will be added to stop the clock, read out the registers and memories (including the configuration memory), write the registers and memories (including the configuration memory), and finally restart the clock.

A union chip of [Supercomputer] with n hypercube links will support a real supercomputer system having $(2^{n-1})+1$ to $2^n$ chips, and will also include an incomplete hypercube deterministic router within it. But for the physical tile of the hypervisor, the partitioned communication network among physical tiles will already have such incomplete hypercube deterministic routing; therefore, it is not necessary to have n links, nor is it necessary to do internal hypercube routing within the physical tile. The physical tile will thus be simplified, and its internal I/O controller will have only one external communication I/O link (a sending FIFO interface (outbound pre-communication) and a receiving FIFO interface (inbound pre-communication)), as if it were part of only a 1-cube.

Based on the techniques described in detail in the specification and claims of [Supercomputer] and also in the present section, here are then the steps of a method for automatically converting an arbitrary single-threaded software application to the pair (modified version of said application, virtual supercomputer that accelerates the said application), which can then be integrated and deployed within a hypervisor system. The first four steps below are taken directly from [Supercomputer]. In the method below, the term "union chip" used in [Supercomputer] has been changed below to "union module," since now it is not by itself a chip; it instead has become a physical tile that is part of a larger chip (the cloud building block).

a) Converting an arbitrary code fragment from the single-threaded software application into customized non-virtual supercomputer hardware whose execution is functionally equivalent to the software execution of the code fragment;

b) Generating interfaces on the hardware and software parts of the application, which:
  i. Perform a software-to-hardware program state transfer at the entries of the code fragment;
  ii. Perform a hardware-to-software program state transfer at the exits of the code fragment; and
  iii. Maintain memory coherence between the software and hardware memories.

c) Partitioning the non-virtual supercomputer obtained in steps a) and b) into multiple modules;

d) Creating a union module which is capable of realizing any of the modules created by step c) depending on the configuration parameters provided to the union module;

e) Creating an (application, virtual supercomputer) pair wherein:
  i. The application part of the said pair is the single-threaded software application as modified in step b);
  ii. The virtual supercomputer part of the said pair consists of virtual tiles, each of which is a module obtained in step c);

f) Adding the functionality to stop, start, read the internal state, and write the internal state of the union module of step d); to create the physical tile capable of realizing any among the set of virtual tiles of step e); and g) Integrating at least one copy of the physical tile obtained in step f) within the hypervisor system, to realize the said (application, virtual supercomputer) pair within the hypervisor.

2. Semi-Reconfigurable ASIC Physical Tiles

In our preferred embodiment of the hypervisor system, multiple versions of the physical tiles can be created in ASIC technology, each one customized for an important customer application. Also, another physical tile version in ASIC technology can realize a virtual tile of the "compiler-friendly general purpose supercomputer" (as described in at least the optimization 5 starting on p. 144, paragraphs [00274]-[00275] and FIGS. 60 and 61 of [Supercomputer]). Then, the physical tiles can be distributed within the data center, based on the expected percentage of computational resource usage by customer applications. For example, a cloud building block chip containing the physical tiles of a given less frequently used application A can be assigned to only one rack module, while cloud building block chips containing the physical tiles of a more frequently used application B can be placed in an entire rack. The remaining rack modules can consist of physical tiles implementing the "compiler-friendly general-purpose supercomputer union chip" [Supercomputer]. Physical tiles built out of FPGA technology can also be included in the data center, for new virtual supercomputer development (before an ASIC version of the physical tile is released). Either "compiler friendly general purpose supercomputer union chip" [Supercomputer] physical tiles, or FPGA physical tiles can be used for applications for which there is no ASIC physical tile yet, or for applications which do not warrant the development of an ASIC physical tile.

When sufficient customer demand has accumulated for particular applications, multi-project wafer (MPW) service [22] can be used to reduce the costs of low volume production of new ASIC physical tiles for implementing a virtual supercomputer for these applications. I.e., at each periodic run of the MPW service new popular customer applications collected and analyzed during the last time period can be included in the run.

The availability of
(i) An automatic process for converting a single threaded application into a virtual supercomputer which can share the resources of a data center, as described in the present document and [Supercomputer], and
(ii) At least one means for low-volume production of ASIC physical tiles at a reasonable cost;
(iii) Recent advances in RTL to GDS-II conversion technologies for automated ASIC design;

Together open up new possibilities for creating energy efficient, high performance data centers based on ASIC physical tiles. Following this train of thought, an adaptive application-specific hardware lifetime management policy can be created, for allocating space to application-specific hardware in a data center, wherein the policy comprises the following steps:

a) Determining the frequency of use of each (application, virtual supercomputer) pair over a recent time interval;

b) Searching for an (application, virtual supercomputer) pair that has the greatest frequency of use as determined in step a), such that
  The pair is not already mapped to an ASIC physical tile; and
  The frequency of use of the said pair exceeds a threshold;

c) If such a pair could be found in step a), creating a new ASIC physical tile for this pair;

d) For each ASIC physical tile in the hypervisor system:
  Increasing or decreasing the resources allocated to this ASIC physical tile, in order to make the allocated resources proportional to the average frequency of use of the (application, virtual supercomputer) implemented by this ASIC physical tile;

e) Repeating all of the steps above, periodically.

The frequency of use of an (application, virtual supercomputer) pair can be measured, for example, as the ratio of the cumulative time spent in the virtual tiles of the said pair divided by the cumulative time spent in all applications in the last time period). The number of ASIC physical tiles installed in the data center should be proportional to the average frequency of use of the ASIC physical tile. But for important applications, the number of the physical tiles should be slightly higher than the average working set, in order to accommodate peak demand as well.

Of course, the data center cannot keep expanding with new hardware forever. Through time, the frequency of use of applications will change. To rebalance the allocation of data center space to different kinds of applications, less frequently used ASIC physical tiles can be periodically replaced by more frequently used ASIC physical tiles, according to the policy given above.

It is more practical to make the "field replacement unit" a rack module containing cloud building block chips, which in turn contain copies of a particular application-specific physical tile. Obsolete application-specific rack modules in the data center, which are no longer being used, will therefore be replaced over time, by application-specific rack modules for new customer applications.

Another way to distribute the physical tiles, which reduces the number of ASIC chips being released but increases the chip size, is to create a single chip kind, namely, a larger cloud building block chip that has, for example, a few physical tiles implementing A, some other physical tiles implementing B, some physical tiles realizing FPGA technology, and the remaining physical tiles implementing the "compiler-friendly general purpose supercomputer union chip"

[Supercomputer]. In this case, the space on this large cloud building block chip can be allocated to applications using a similar application-specific hardware lifetime management policy over the generations of the chip. Each generation of the cloud building block will thus be tailored for applications currently considered important for the target customer community, as older generations of the cloud building block chip become obsolete.

3. Virtualizing Operating Systems

It suffices to make only a few changes to the baseline hypervisor system, in order to virtualize an entire operating system (OS) accelerated by a supercomputer, as opposed to just a user application accelerated by a supercomputer.

The local virtual tile 0 within a virtual supercomputer for an OS will be reserved: it will contain a general purpose commodity microprocessor which will run the OS. The microprocessor of local virtual tile 0 may share its access path to DRAM units with other hardware units in the system, or may have its own memory. Local virtual tile 0 communicates with its environment only with standard inter virtual-tile messages previously described in the hypervisor system in this document; thus the OS will implement a simplified I/O system using fast network access only.

The application placeholder local virtual tile −1 (originally with a PCI Express connection to the host processor system), is replaced by a OS placeholder local virtual tile also numbered −1, with a high speed Ethernet connection to the internet. The OS placeholder virtual tile is initially allocated to a suitable physical tile with an Ethernet connection, and pinned at system reset time to that physical tile: it will not be de-allocated.

The Ethernet connection will be responsive to a main IP address reserved for the particular operating system instance, which be used for exchanging messages with the OS running in local virtual tile 0;

The Ethernet connection will also be responsive to a secondary IP address reserved for exchanging messages with a selected virtual tile of the virtual supercomputer other than local virtual tile 0, to achieve hardware-accelerated, fast internet communication without going through the legacy OS software layers. This direct internet access capability is critical for creating fast pipelined customized hardware engines for web services, for example.

One can also keep the standard PCI express connection, and let the software application on the host computer attached to PCI Express simulate the primary and secondary internet connections. This will make the virtual hardware-accelerated OS appear to be an ordinary software application, encapsulated within a commodity host computer and commodity OS.

Here are some examples of the operation of the virtual hardware-accelerated OS: At the Ethernet connection of the OS placeholder tile, an inbound IP packet destined to the main IP address will be converted to a standard inter virtual-tile message from local virtual tile −1 to local virtual tile 0. The payload of a standard message sent from local virtual tile 0 to local virtual tile −1 will be sent out as an outbound IP packet by the OS placeholder tile, using the main IP address. A designated local virtual tile different from 0 can also communicate with the internet directly, by exchanging messages with local virtual tile −1. Local virtual tile −1 will forward inbound messages received using the secondary IP address of the Ethernet connection, to the designated local virtual tile different from 0. Also, an outbound message arriving from the designated local virtual tile different from 0, will be sent to the internet by local virtual tile −1, using the secondary IP address of the Ethernet connection.

At system initialization time, the saved initial state of local virtual tile 0 can represent an OS that has just been booted up, waiting for input from a remote main console, and the saved initial state of every other virtual tile can be idle, waiting for a message from the OS software to get started. When the microprocessor in local virtual tile 0 running the OS, arrives at an accelerated code fragment either in a user application or in kernel code, virtual tile 0 exchanges messages with other virtual tiles (e.g., virtual tile 1), thus initiating the actual hardware acceleration.

As an example of using the system, the performance critical parts a web service (such as a stock quote service) can be accelerated in this manner. The accelerated web service will appear as a user program within the virtual OS, where the user program has exclusive use of the secondary internet connection, and therefore all legacy software overheads of the OS for network accesses will be bypassed and replaced by parallel pipelined hardware serving to accelerate the complete web service as a whole. The frequent serializations due to user/kernel mode changes will be eliminated. Hardware resources of the virtual supercomputer implementing the web service can be incrementally increased or decreased over time at a virtual tile granularity, thus meeting cloud computing requirements.

This approach can boost performance through hardware acceleration of critical kernel and application code fragments, using a virtual supercomputer.

Some relevant difficulties of application-specific hardware acceleration of operating systems (e.g., precise exceptions including page faults, external and timer interrupts, privileged kernel code) were addressed in optimization 12 starting on p. 161, and optimization 13 starting on p. 166 of [Supercomputer]. I.e., it is possible to achieve hardware acceleration and yet retain binary compatibility with the original commodity OS software.

4. Alternative Physical Tile Replacement Algorithms for the Monitor Unit

The baseline version of the monitor unit runs a relatively simple physical tile replacement algorithm (the Least Recently Used algorithm). It is possible for the monitor unit to boost system performance, if it deploys a more advanced physical tile replacement algorithm.

As a more general replacement policy, each physical tile can be assigned a heuristic evaluation which is the weighted sum of a number of attributes of the physical tile, the virtual tile to be allocated to the physical tile, and several other system attributes. The physical tile which gets the highest heuristic evaluation is defined to be the best physical tile to replace.

An example of a monitoring algorithm is shown below. Upon a request for a replacement tile, The heuristic evaluation for each physical tile is computed in parallel, as resources permit.

The index of the monitored physical tile with the best evaluation is computed. This can be done within $O(\log_2(N))$ stages for N physical tiles, with an "index of maximum element" tree circuit where each tree node computes the function $f$  $f((i1,val1),(i2,val2))=$ (val1<val2? (i2,val2): (i1,val1)). The tree computation will yield the final pair (i,val) where i is the index of an physical tile with the highest heuristic evaluation, equal to val.

The index of a physical tile which gave the highest heuristic evaluation in the previous step is returned as the tile to be replaced/preempted.

Several alternatives for speeding up the parallel implementation exist. For example:

To handle requests for tiles to pre-empt that occur very frequently, the calculation of the heuristic values can be shared by k back to back requests. The first request causes the indices of the un-monitored physical tiles to be sorted by their heuristic evaluation. The first request among k requests can return the tile with the highest evaluation, the next request can the return the next best, and so on. After k requests are received or after a time interval has elapsed, whichever occurs earlier, the heuristic evaluations are re-computed and the next set of k requests are serviced in the same manner.

To cut the network latency to reach the monitor unit, multiple redundant copies of the monitor unit can be distributed in the system.

With certain virtual tiles, such as those requiring an ASIC, given a virtual tile v, only a subset of the physical tiles is eligible to accommodate it. In this case, the heuristic evaluations should be limited to the eligible physical tiles only.

The physical tiles can be partitioned, and different monitor units can be restricted to choose a physical tile only among one partition of the physical tiles. This will allow the monitor unit for each partition to work independently and in parallel.

The heuristic evaluations of each potential replacement tile can be based on the weighted sum of numerical measurements representative of the following features:

Reducing the communication latency among the virtual tiles of hardware accelerated applications: Every (application, virtual supercomputer) pair has a working set of one or more virtual tiles. In order to decrease the communication latency among the virtual tiles in a working set, the following rules should be applied. (i) Allocation of the first virtual tile: A set of physical tiles which are close together, with about the size of the working set (obtained by profiling earlier executions of the same application) will be reserved for this (application, virtual supercomputer) pair, if possible. The first virtual tile will preferably be allocated to a physical tile within the reserved set. (ii) Allocation of a virtual tile during normal operation: The virtual tile will preferably be assigned to a physical tile within the reserved set, which is close to the physical tiles presently belonging to the same virtual supercomputer.

Implementation of more advanced replacement policies: Based on the status update messages coming from the physical tiles, the monitor unit should continue to use the true LRU replacement policy when it works well. With dedicated hardware support the monitor unit can also use alternative replacement policies such as Least Frequently Used, and can switch to defensive replacement policies resilient to low reuse, when tile thrashing/low reuse is detected.

Re-using of physical tiles: It is possible to avoid the reconfiguration overhead of physical tiles. A virtual tile's state is composed of the configuration state (which specifies the function of the virtual tile) and the memory state (which is the current execution state including registers and SRAMs). Whenever a new virtual tile needs to be allocated, the Monitor unit should choose a physical tile that has already been configured with the configuration state of the new virtual tile.

Honoring service level agreements (SLAs): The monitor can differentiate the hardware accelerated applications based on their service level agreements. A physical tile that has been allocated to a virtual tile of an application with a "gold customer" SLA should have a less chance of being deallocated when it compares to the one that has been used by a virtual tile of an application with a "silver customer" or "bronze customer" SLA. More complex SLA rules, such as one involving monetary penalties for various levels of performance degradation can also be factored into the heuristic evaluation calculation, in an attempt to minimize losses to the data center operator.

Other optimizations, such as:

Stopping physical tiles that have exceeded an energy budget and allowing them to cool off before being eligible to run a virtual tile again;

Stopping an entire virtual supercomputer to reduce contention and restarting it later when the contention has subsided;

as well as several other operating system or hypervisor scheduling techniques can be implemented with parallel hardware, with appropriate design changes in the monitor unit and owner units.

5. Avoiding Data Copying During Virtual Tile Migration

Notice that, following the non-virtual supercomputer design within

[Supercomputer], the DRAM memory accesses done by a virtual tile (i.e., a design partition of the original non-virtual supercomputer) are always sent to the local DRAM unit near that virtual tile. A virtual supercomputer thus handles its own low-level DRAM data sharing among virtual tiles, e.g., memory coherence, through application communication messages sent between the virtual tiles. It is clear that the virtual tile state to be saved includes registers and SRAMs of the virtual tile, defining the current execution state of the virtual tile, and the configuration memory, defining the function of the virtual tile. The virtual tile execution state also includes the data structures in the local DRAM unit of the virtual tile. Local data structures can be read from an area within the local DRAM near the old physical tile where the virtual tile was, saved in hypervisor storage, and later restored from hypervisor storage to an area within the local DRAM near the new physical tile. Appropriate memory protection of one virtual supercomputer from another (such as a memory area range check) must be enforced. This approach will accurately reproduce the behavior of the original non-virtual supercomputer on a hypervisor system. When tile migrations occur infrequently, this state copying approach is simple and has high performance as well, since the physical tile will always remain near the DRAM unit it needs to access.

But, if state saving and restoring is too slow for data structures in DRAM, the DRAM resources in the hypervisor system can be consolidated as a single system-wide bank-interleaved shared memory. In this case, when a virtual tile v accesses DRAM, it will access the fixed memory area within the entire hypervisor system reserved for "the local DRAM of v0" (preferably in the DRAM unit near the first physical tile where v is allocated). When v0 is deallocated from a physical tile and later allocated to a different physical tile, the state of the "local DRAM of v1" memory altered by the first physical tile must be made available to the second physical tile where v1 is migrated, but the DRAM state need not be copied. The virtual tile will continue to access the same DRAM memory area from its new physical tile. In this case, reducing the distance between a physical tile and the DRAM units it needs to access, will be one of the heuristics used by the monitor.

6. Isolation Between Different (Application, Virtual Supercomputer) Pairs

In the main design of this document, we always treated a virtual tile as a pair (application id, local virtual tile number within this application's virtual supercomputer) so that messages from all virtual supercomputers could be routed in a uniform way. In order to enhance security, the application id part of the pair forming a virtual tile should not be written or read by the virtual supercomputer at all. The virtual supercomputer must communicate only with the virtual tiles of the same virtual supercomputer. This can be done by creating a wrapper module called an inner physical tile harness around the virtual tile within the physical tile, which cannot be accessed by the virtual tile except by pre-communication messages. The inner physical tile harness contains the application id register. Upon reset, the application id register of a normal physical tile is set to NULL. When a write_state request arrives at the physical tile, the application id register is also written from the "application id" part inside the state data being written. When an inbound pre-communication message arrives at the physical tile, the application id part of each global virtual tile field is verified to be equal to the application id register, and then removed to leave only the local virtual tile number. For outbound pre-communication messages, the application id is prepended to each of the local virtual tile number fields of the message coming out of the virtual tile.

Actually, to implement an inner physical tile harness, only a map from local virtual tile numbers within a virtual supercomputer to global virtual tile numbers encompassing all virtual tiles of all virtual supercomputers, and an inverse map for the same, is sufficient.

For example, alternatively, assuming the local virtual tiles of a virtual supercomputer are mapped to a contiguous area of the global virtual tile space, where the areas of different virtual supercomputers do not overlap, a unique virtual tile base register can be used in lieu of the application id register, where the virtual tile base is subtracted from the global virtual tile to obtain the corresponding local virtual tile when receiving an inbound pre-communication message, and where the virtual tile base is added to a local virtual tile to obtain a global virtual tile when sending an outbound pre-communication message. The virtual tile base register will be rewritten during each write_state request.

Please also see the next section, regarding how each user-level software application running on a host machine can be constrained by its OS, to exchange messages only with the local virtual tiles of its own virtual supercomputer.

7. Starting and Ending Virtual Supercomputer Execution

Notice that we did not mention how to insert a (software application, virtual supercomputer) pair into the hypervisor system, or how to remove a (software application, virtual supercomputer) pair from the hypervisor system. Thus, the system so far described is suitable for a continuously running cloud computing system with a fixed set of "approved" (application, virtual supercomputer) pairs.

Here, will describe a method for the creation of new (application, virtual supercomputer) pairs in the hypervisor system, and the destruction of such pairs.

For reducing the security risks in hardware designs (see, e.g., [23]) we recommend creating cryptographically signed initial states of virtual tiles that are generated using authorized tools, and registering the initial states of all virtual tiles of all virtual supercomputers before they are used. Registering a virtual tile means: checking the signature validity of the initial state of a virtual tile and moving that initial state to the hypervisor storage.

A distinguished application and its virtual supercomputer called the supervisor will be introduced here. The supervisor application is privileged: the supervisor application does not have virtual tiles in its virtual supercomputer other the virtual tile −1, but can exchange messages with any virtual tile of any virtual supercomputer. The inner tile harness protection is disabled for the supervisor. The registration of a new virtual supercomputer is done using a dedicated PCI Express connection to a secure host computer, or an encrypted Internet connection to a trusted remote server. Registration consists of inserting the clean initial state of each virtual tile v of each newly introduced virtual supercomputer in the hypervisor storage, by sending the following messages from tile −1 of the supervisor virtual supercomputer, over the outbound pre-communication network:

Send Request (outbound pre-communication): Opcode=communicate Vdest=(virtual destination tile=v) Vsource=(supervisor virtual tile −1) Payload=(Opcode=register Tilestate=(virtual tile v's initial contents))

At system initialization time, virtual tile −1 of the supervisor supercomputer, pinned in a physical tile and serving as a message exchange gateway with the trusted server, will attempt to send a message to virtual tile v of the application. Since the destination virtual tile is initially not allocated in a physical tile, a local first level cache miss will occur in the supervisor virtual tile −1's physical tile harness. In this case, the physical tile harness of supervisor virtual tile −1 will recognize that (i) it is running the supervisor and that (ii) the "register" opcode is present in the message payload, and will forward the entire "register" message over the lookup network to the correct owner of virtual tile v, as follows:

Send Request (lookup): Source=(p0=physical tile of supervisor virtual tile −1) Tag=(t0=new tag) Dest=(owner of virtual tile v) Opcode=register Tilestate=(virtual tile v's initial state)

Virtual tile v's owner unit will respond to the register request by:

Writing the given virtual tile contents to storage (using the allocation/deallocation FSM within the same owner unit) as the clean read-only copy of the initial state of the virtual tile; and Sending back an acknowledgment to the physical tile harness of supervisor virtual tile −1:
Send Response (lookup): Source=(same source as in the request=p0) Tag=(same tag as in the request=t0) Opcode=acknowledge without further action.

Upon receiving the acknowledgement from the owner of v, the supervisor physical tile harness will have completed the registration operation. Then, an acknowledgement message is looped back to the physical tile containing the supervisor virtual −1 from its physical tile harness as follows:
Send Request (inbound pre-communication): Opcode=communicate Vdest=(supervisor virtual tile −1) Vsource=(supervisor virtual tile −1) Payload=(Opcode=acknowledge)

The supervisor can consider the registration complete if and when it receives acknowledgements for each register request. As a result of registering, clean read-only copies of the initial state of virtual tiles will already exist in the hypervisor storage when any (application, virtual supercomputer) pair is started for the first time. The initial contents of a virtual tile implemented through a union chip ASIC physical tile, will be the configuration memory contents of the physical tile. If the physical tile is implemented with an FPGA, the initial state will be an FPGA configuration bitstream.

It makes sense to store only one copy of the initial state of virtual tiles of a given application, even though there may be multiple instances of the application running in the hypervisor system at a given time. For this purpose, it suffices to create a simple function to extract the application id for instance 0 of a given application, given the application id of any instance n of the same application. For example, the instance id may be the low order bits of the application id; therefore, the low order bits will be 0 for the case of instance 0. The application code should not have the privileges to read or write the application id field directly, it should exchange messages only with its locally numbered virtual tiles. To implement this constraint securely, the application id of the application is pre-pended to each message going from the application to the hypervisor system, automatically by a lightweight system call for message exchanges with the attached hypervisor system. In this manner, an instance of an application will be constrained to exchange messages only with the virtual tiles of its own virtual supercomputer and will not be able see or change its own application id.

The first time a virtual tile of a given (application, virtual supercomputer) is allocated in a physical tile, the writable state of the virtual tile will be missing. In this case, the allocation/deallocation FSM within the owner unit will create the initial writable state for this virtual tile of this instance of the application, by copying the configuration information from the clean read-only state of this virtual tile for instance 0 of the same application, and setting the writable part (registers, memories) of the virtual tile state to default initial values. Therefore, no special action is needed for initializing the virtual tiles when an (application, virtual supercomputer) pair starts.

However, as an (application, virtual supercomputer) pair ends, the hypervisor resources allocated to it (physical tiles that are still running, writable states of virtual tiles that were saved in hypervisor storage) must be released. This can be accomplished by issuing the following (user-level, non-privileged) message from the software application, for each virtual tile v of the virtual supercomputer:

Send Request (outbound pre-communication): Opcode=communicate Vdest=(virtual tile=v) Vsource=(application virtual tile −1) Payload=(Opcode=terminate)

From virtual tile −1 of the same application, just before the software application ends (e.g., these messages can be triggered in the software application by using an atexit call in a UNIX™-like system).

The physical tile harness of the application placeholder tile for the application understands the message contains a terminate request, and behaves as if a local first level cache miss occurred, for mapping virtual tile v to a physical tile, forwarding the terminate message to the owner of virtual tile v of the present application and instance, over the lookup network. The owner in turn forwards the terminate request to the allocation/deallocation FSM, which in turn checks if the virtual tile v is allocated in a physical tile p, and if so, issues a shutdown_and_read_state command to the physical tile p, but discards the state. Regardless of whether virtual tile v is allocated or not, the allocation/deallocation FSM also deletes the writable state for the virtual tile v from hypervisor storage, in case such a writable state record exists. As a result, all virtual tiles of this virtual supercomputer will be de-allocated, and all writable tile states of this virtual supercomputer will be deleted from hypervisor storage; thus achieving the termination of the virtual supercomputer.

The physical tile harness of local virtual tile −1 finally sends back an acknowledgement message corresponding to the terminate message back to the application, in order to assure that the software application can confirm completion of the virtual supercomputer activities before exiting from its process.

8. Heterogeneous Physical Tiles

The idea of application placeholder physical tiles can be easily generalized to N PCI Express connections supporting M>N applications. For example, when both a couple of instances of application A and an instance of application B are running on the same host processor and are communicating with their three respective virtual supercomputers with the same PCI Express connection, application placeholder virtual tiles −1 for the two instances of application A and also the application placeholder virtual tile −1 for application B may be implemented on the single physical tile attached to this single PCI Express connection. The system will behave as if three application placeholder sub-tiles have been implemented inside one single physical tile.

More generally, more than one virtual tile can be allocated inside sub-tiles within a single physical tile.

In a hypervisor system that includes sub-tiles, the following changes are required.

The owner data structures for mapping virtual tiles to physical tiles, and local caches within physical tile harnesses, will become mappings from virtual tiles to (physical tile, sub-tile) pairs. The monitor will supply (physical tile, sub-tile) pairs to preempt. The physical tile source and destination fields within messages will also be changed to pairs of the form (physical tile, sub-tile). However, routing from physical tile harnesses and to physical tile harnesses (e.g. within the communication, control and lookup networks) routing will still be done based on the physical tile portion of the (physical tile, sub-tile) pairs. Once an inbound message going to a (physical tile, sub-tile) enters the physical tile harness, and then reaches the inbound pre-communication channel, or the pre-control channel, the sub-tile part of the destination must be retained in the message for internal routing purposes within the physical tile, until the specified destination sub-tile within the physical tile is reached. Inner tile harnesses for hiding the application id register from the virtual tile are still needed for each sub-tile for security, but will now be called inner sub-tile harnesses.

Sub-tile addressing allows flexible allocation of virtual tiles to hardware resources if, for example, sub-tiles are composed of one or more contiguous hardware blocks of minimum size. For example, assuming a physical tile has 8 minimal sized blocks and sufficient reconfiguration capability, 8 sub-tiles of 1 block each (starting at blocks 0, 1, 2, 3, 4, 5, 6, 7), 4 sub-tiles of 2 blocks each (starting at blocks 0, 2, 4, 6), 2 sub-tiles of 4 blocks each (starting at blocks 0 and 4), or 1 sub-tile of 8 blocks (starting at 0), are some possibilities which can be implemented within this physical tile, using algorithms resembling the dynamic allocation of memory blocks.

Having heterogeneous physical sub-tiles in the platform requires that the monitor unit be modified to apply a matching filter to all physical sub-tiles before they are evaluated in terms of other possible criteria. That is, the matching filter shall mark a physical sub-tile as feasible if and only if it has the required resources to contain the virtual tile. Then, the monitor unit shall use only the feasible physical sub-tiles in the physical sub-tile replacement algorithm.

9. Increased Reliability

Hardware reliability is becoming an increasingly important issue, due to increased vulnerability to particle-induced soft errors and intermittent timing faults due to aging effects and voltage droop. Similarly, persistent timing faults caused by manufacturing variability and hard errors due to wear-out are becoming increasingly common. The proposed approach for virtualizing application-specific supercomputers provides numerous opportunities for improved fault detection and fault recovery.

The hypervisor system itself is a mainly manual hardware design consisting of components (mostly FSMs) and networks (such as butterfly and hypercube networks). The physical tile is not a simple FSM, it is in fact the most complex component of the hypervisor. Each physical tile in turn contains internal components and networks; but the physical tile will usually be generated by a compiler from sequential code [Supercomputer]. In both the compiler-generated and manual hardware designs, the techniques to achieve reliability are similar. We will review some of the techniques for achieving reliability here, with a sufficient level of detail, so that the integration of each of these reliability techniques in a compiler algorithm for generating hardware from sequential code, also becomes clear.

First, to achieve the detection of and recovery from soft errors, it is desirable to have a checkpoint-restart mechanism to be able to retry the hardware execution of a code fragment, when a potential soft error is detected in the code fragment. Here is a speculation/retry model for an operation (x,MEM)=(x,MEM) (where $f$ is either a simple operation, or a complex function call, or an inner loop nest in the region hierarchy of the program), which reads a memory MEM and a register x, and then writes the same memory MEM and register x. To be able to retry $f$, we must first identify the memories and registers that are live at the retry point at the beginning of the invocation of $f$ (register x and memory MEM in this case), and revise $f$ to make it $f$_speculative, to ensure the only the new versions of such memories and registers are written, so that the original memory and register inputs to $f$ are not clobbered when a soft error is detected and a retry occurs. When a soft error is detected (e.g. a mismatch is detected during a dual modular redundancy run of $f$_speculative, or an unrecoverable ECC error occurs during $f$_speculative) the $f$_speculative invocation immediately returns with a condition code cc that is false, otherwise it returns with a condition code cc that is true, with the results in x' and MEA'. If there is any error (cc is false), the speculative code fragment should be retried, if not, the results of the speculative code fragment should be committed, while still checking them for integrity/ECC errors.

```
//SPECULATION/RETRY MODEL FOR SOFT ERRORS
//original code:
//x,MEM=f(x,MEM)
errCnt=MAX_ERRORS;
retry:
//x live here
//MEM live here
link MEM'=MEM; //acquire a new memory
cc,x',MEM'=f_speculative(x,MEM');
//cc is false if soft error detected
if(cc)) {
    //no soft errors detected
    //commit results
    x=x'; unlink MEM=MEM';
} else {
    if(--errCnt >=0)
        //discard the state and retry
        {unlink NULL=MEM';goto retry;}
    else
        //too many failures, die
        {unlink NULL=MEM'; error( );}
}
```

The baseline hardware acceleration of a software application in [Supercomputer] already works like the speculation/retry model given above at a very coarse grain, where the function $f$ is the entire accelerated code fragment. The application-specific supercomputer has a large DRAM memory serving as a last level cache (the application address space is the root of the memory hierarchy). The modified lines of this last level cache are not written back to the software application memory until the end of the accelerated program fragment, at which point a "flush all dirty lines" request is issued by the accelerator. For an accelerator with dual modular redundancy and ECC in its last level cache, if a comparison mismatch or an unrecoverable ECC error is detected before reaching the point of flushing the dirty lines in the last level cache, it is possible to recover from the potential soft error by just discarding the accelerator state and restarting the entire accelerated code fragment from the beginning. The final commit operation (since it is not inside yet another checking harness) can be implemented with triple modular redundancy. The ECC of the results being committed to the application memory address space can be checked, and the data can be corrected if possible. If an unrecoverable ECC error occurs during the final committing of results, or if there are too many unsuccessful retries, the result will be a fatal error that should be reported from the virtual supercomputer to the software application, which should revert to software-only execution (the original software code will still be around). However, the offending physical tile and offending DRAM resources should be avoided in future runs.

In case a soft error is highly probable during a long-running accelerated code fragment, sub-regions smaller than the entire accelerated code fragment in the program region hierarchy can be speculatively executed by following the recipe in the speculation/retry model for soft errors given above.

The conventional approach for fault detection is to replicate hardware and compare the results (dual-modular redundancy). This approach can be realized by building redundancy into the FSM when creating the FSM. While a register to register operation is executed in duplicate, the two copies of each of the input operands should be verified to be equal. The FSM state transition logic should similarly be duplicated and at the beginning of each cycle/state the two copies of condition codes and state registers should be verified to be equal. ECC or parity should be generated and checked during memory operations. Checksums or other redundancy techniques can be used during network message transmissions.

A cheaper alternative technique is to use modulo N arithmetic (for a small N) for checking individual operations instead of full dual modular redundancy. If profiling data from a soft error simulation is available, checking logic can be implemented for the registers, functional units and FSM state transitions that are most prone to soft errors until an area budget reserved for reliability is exceeded.

Since the virtualized hardware is usually generated automatically from a high-level specification such as sequential code, further optimizations to reduce checking logic are also possible. Simplified versions of the hardware can be instantiated to check certain invariant properties of the physical tile's operation. These invariants can be explicitly provided by the programmer in the original code (programmer assertions often offer an independent check for results), or that can be inferred from the sequential code, for example by selecting a few among the assertions automatically generated by symbolic execution [Supercomputer]. For example, in the above speculation/retry model example, the $f$ computation can be a sorting algorithm (without dual modular redundancy), and the verification computation can be a check that a random subsequence of the array is ordered. If this simple check fails, the sorting routine is retried; but if it succeeds, the state changes produced by the sorting routine are committed.

The probability of failure throughout the system can also be minimized by conventional circuit-level hardening (for soft errors), and wear-leveling (for aging-induced transient and permanent failures).

An end-to-end checksum is often a more hardware-efficient technique for networks. When a message with a wrong checksum arrives into any FSM, a speculation failure action may be performed.

Permanent failures in the network can also be detected, and can be rectified by disabling failed nodes and reconfiguring the packet routing logic to avoid such nodes. This is only possible with network topologies that provide path redundancy (i.e., more than one possible route from each source to each destination).

The invention has been shown and described with reference to a particular preferred embodiment. However, it is to be understood that the invention is not limited to that particular embodiment, and that various modifications, additions and alterations may be made to the invention by one skilled in the art without departing from the spirit and scope of the invention.

What is claimed is:

1. A hypervisor system for virtualizing application-specific supercomputers, the hypervisor system comprising:
   (a) at least one software-virtual hardware pair consisting of a software application, and an application-specific virtual supercomputer for accelerating the software application, where:
   i. the application-specific virtual supercomputer comprises a plurality of virtual tiles; and
   ii. communication messages are sent and received between both the software application and the plurality of virtual tiles;
   (b) a plurality of reconfigurable physical tiles, where each virtual tile of the plurality of virtual tiles of the application-specific virtual supercomputer can be implemented on at least one reconfigurable physical tile, by configuring the reconfigurable physical tile to perform a function of the virtual tile; and
   (c) a scheduler implemented in hardware, for parallel pre-emptive scheduling of the plurality of virtual tiles on the reconfigurable physical tiles; where the scheduler is separate from the reconfigurable physical tiles; and where the scheduler simultaneously performs a plurality of pre-emptive scheduling actions, where a pre-emptive scheduling action of the plurality of pre-emptive scheduling actions comprises pre-empting a virtual tile operating on a reconfigurable physical tile, letting the pre-empted virtual tile remain pre-empted for a period of time, and then resuming operation of the pre-empted virtual tile on a possibly different reconfigurable physical tile; and where the virtual tile retains ability to receive a message when pre-empted; and
   where in at least one software-virtual hardware pair of (a), consisting of the software application and the application-specific virtual supercomputer for accelerating the software application:
   the software application is an entire operating system, including user applications; and the virtual tiles of the application-specific virtual supercomputer comprises:
   special-purpose hardware for accelerating critical kernel and user code fragments of the entire operating system; and
   a general-purpose processor for accelerating remaining, non-critical code fragments of the entire operating system.

2. The hypervisor system of claim 1, where the application-specific virtual supercomputer for accelerating the entire operating system has at least one additional interface to an internet, to enable a user application within the entire operating system to access the internet directly, without going through layers of the entire operating system, therefore eliminating serializations resulting from user/kernel mode changes.

3. The hypervisor system of claim 1, where the entire operating system is a commodity operating system, and where the application-specific virtual supercomputer for accelerating the entire operating system supports precise exceptions and retains full binary compatibility with the commodity operating system.

* * * * *